United States Patent [19]

Tanaka et al.

[11] Patent Number: 5,290,167
[45] Date of Patent: Mar. 1, 1994

[54] METHOD OF MANUFACTURING THREE-DIMENSIONAL PARTS USING SHEETS OF THERMOPLASTIC RESIN HIGH-PERFORMANCE FIBER-REINFORCED COMPOSITE MATERIAL AND APPARATUS THEREFOR

[75] Inventors: Toshihiro Tanaka; Yuji Chiba; Yuji Ashibe, all of Niihama, Japan

[73] Assignee: Sumitomo Heavy Industries, Ltd., Japan

[21] Appl. No.: 770,463

[22] Filed: Oct. 3, 1991

[30] Foreign Application Priority Data

Oct. 8, 1990 [JP] Japan .................................. 2-268302
Nov. 10, 1990 [JP] Japan .................................. 2-305584
Nov. 10, 1990 [JP] Japan .................................. 2-305585
May 16, 1991 [JP] Japan .................................. 3-111883

[51] Int. Cl.⁵ ........................................... B29C 51/00
[52] U.S. Cl. ..................... 425/397; 156/494; 156/538; 425/398; 425/400; 425/422; 425/DIG. 48
[58] Field of Search ............... 156/163, 229, 494, 538; 264/241, 248, 258; 425/394, 397, 398, 400, 412, 416, 422, DIG. 48

[56] References Cited

U.S. PATENT DOCUMENTS

| | | | |
|---|---|---|---|
| 2,759,217 | 8/1956 | Peterson | 156/494 |
| 3,025,566 | 3/1962 | Kostur | 425/397 |
| 3,466,706 | 9/1969 | Asano | 425/398 |
| 3,600,746 | 8/1971 | Kostur et al. | 18/1 |
| 3,664,791 | 5/1972 | Gaylord | 425/156 |
| 3,827,683 | 8/1974 | Seborg et al. | 269/9 |
| 3,880,561 | 4/1975 | Ferro | 425/398 |
| 3,910,747 | 10/1975 | Dean et al. | 425/DIG. 48 |
| 4,124,434 | 11/1978 | Wommelsdorf et al. | 264/269 |
| 4,137,030 | 1/1979 | Sanson | 425/DIG. 48 |
| 4,162,885 | 7/1979 | Asel | 425/DIG. 48 |
| 4,190,408 | 2/1980 | Bronkema et al. | 425/DIG. 48 |
| 4,475,881 | 10/1984 | Borst et al. | 425/397 |
| 4,581,192 | 4/1986 | Malen | 264/322 |
| 4,944,668 | 7/1990 | Asano et al. | 425/397 |

FOREIGN PATENT DOCUMENTS

| | | |
|---|---|---|
| 2627379 | 12/1977 | Fed. Rep. of Germany . |
| 3445292 | 6/1986 | Fed. Rep. of Germany . |
| 60-154033 | 8/1985 | Japan . |
| 62-212124 | 9/1987 | Japan . |
| WO8910253 | 2/1989 | PCT Int'l Appl. . |

OTHER PUBLICATIONS

Texxes Features and Application of Hybrid Fabric, Industrial Material, vol. 37, No. 1981.1.
Technological Trends on Stampable Sheets Plasticity and Processing, vol. 29, No. 333.
Newest Composite Technological List, Mar. 1990.

*Primary Examiner*—Scott Bushey
*Attorney, Agent, or Firm*—Lorusso & Loud

[57] ABSTRACT

An apparatus for manufacturing three-dimensional parts using sheets of a thermoplastic resin high-performance fiber-reinforced composite material. The apparatus includes a sheet clamping device for clamping an end portion of the sheet and conveying the sheet to a heating/forming zone, a heater for heating the sheet to a predetermined temperature, upper and lower frames driven by cylinders for clamping the sheet and a male mold member for forming the three-dimensional part by deep drawing the clamped sheet inwardly through a stroke of the mold member.

29 Claims, 46 Drawing Sheets

FIG. 1

| VOLMETRIC REINFORCING MATERIAL CONTENTS % | BASE MATRIX | |
|---|---|---|
| | THERMOPLASTIC RESIN | THERMOSET RESIN |
| 50 ≦ | PREPREG FORMING (60)<br>PULTRUSION (60) | FILAMENT WINDING (70)<br>PULTRUSION (70)<br>HAND LAY-UP<br>　FORMING (55) |
| 50 ≧ | INJECTION FORMING (30)<br>STAMPABLE SHEET<br>　FORMING (40) | SMC FORMING (30)<br>BMC FORMING (40)<br>SPRAY-UP<br>　FORMING (25) |

FIG. 2

| | | COMPRESSION FORMED PART | | INJECTED PART | ADVANCED COMPOSITE MATERIAL | |
|---|---|---|---|---|---|---|
| | | STAMPABLE SHEET | SMC | | | |
| RESIN | | *1 POLYPROPYLENE | *1 POLYESTER | *1 POLYPROPYLENE | *2 PEEK | *2 PEI |
| REINFORCING MATERIAL | | GLASS LONG FIBER | GLASS SHORT AND LONG FIBER | GLASS SHORT FIBER | CARBON FIBER/ PLAIN WEAVE CLOTH | GLASS FIBER/ PLAIN WEAVE CLOTH |
| SPECIFIC GRAVITY | | 1.2 | 1.8 | 1.12 | 1.59 | 1.94 |
| TENSILE STRENGTH | Kgf/cm² | 800 | 900 | 800 | 6,500 | 6,000 |
| TENSILE MODULUS | | 45,000 | — | 40,000 | 650,000 | 290,000 |
| BENDING STRENGTH | | 1,400 | 1,800 | 1,350 | 9,500 | 8,000 |
| BENDING MODULUS | | 53,000 | 105,000 | 45,000 | 620,000 | 250,000 |
| Izod | Kgf·cm/cm | 90 | 40 | 12 | 80 | 110 |
| HEAT DEFORMATION TEMPERATURE | °C | 157 | — | 145 | 340 | 210 |
| FIBER CONTENTS | % | (40) | (30) | (30) | 60 | 55 |

PLAIN WEAVE

TWILL WEAVE

SATIN WEAVE

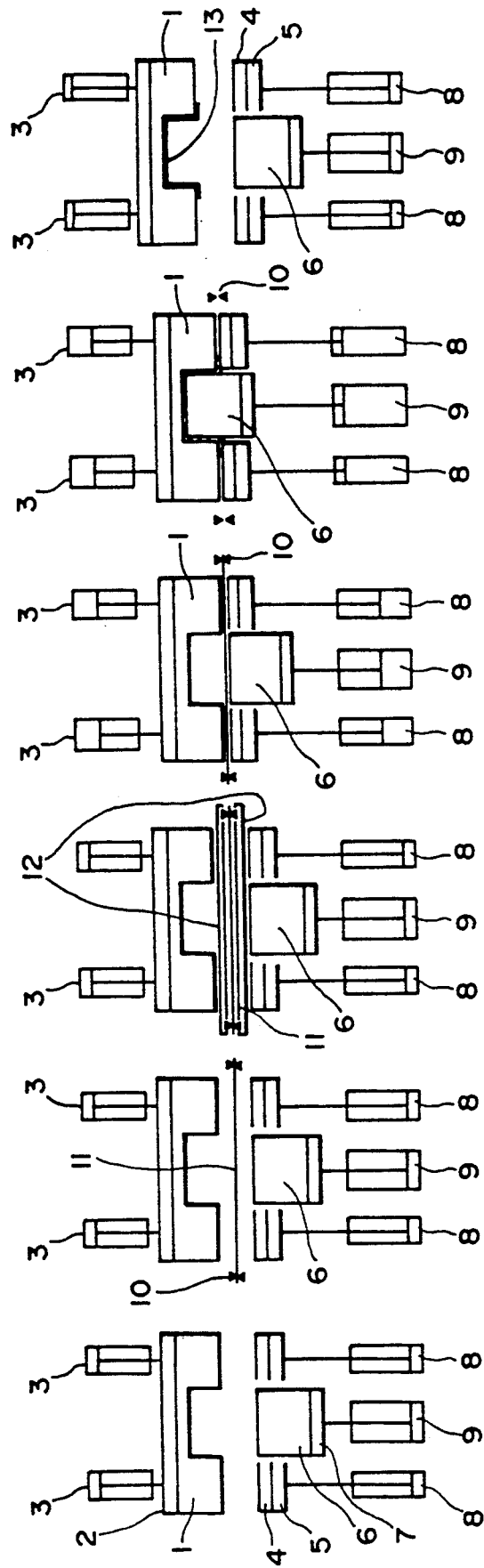

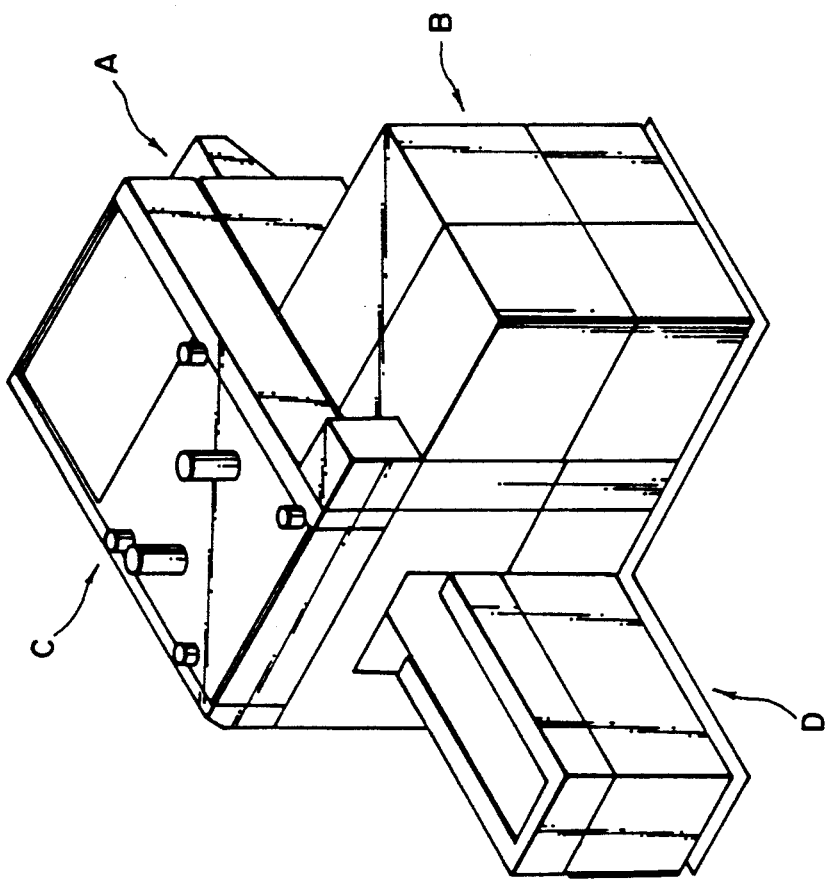
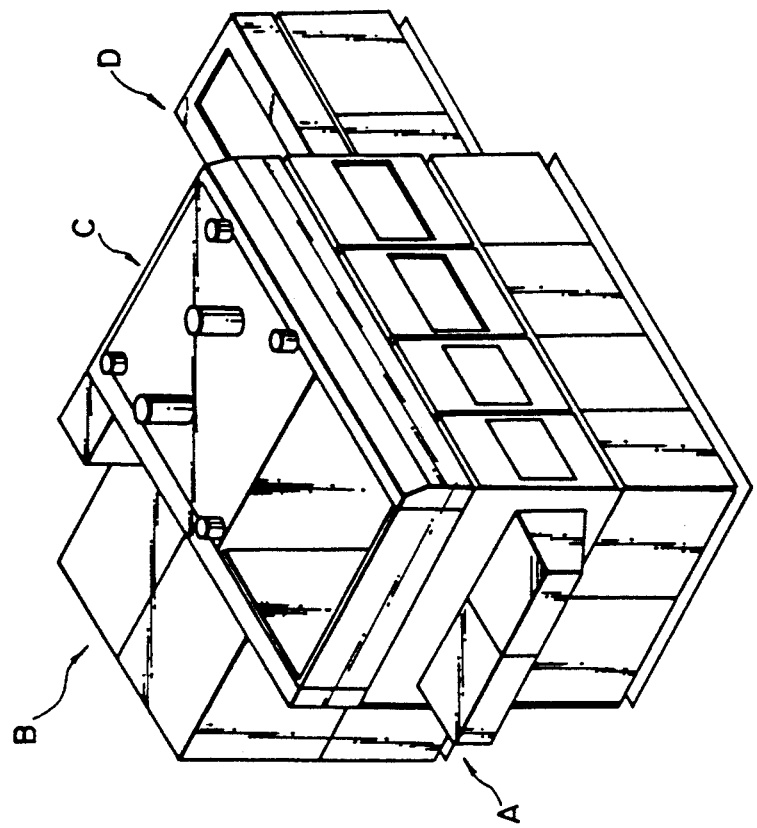

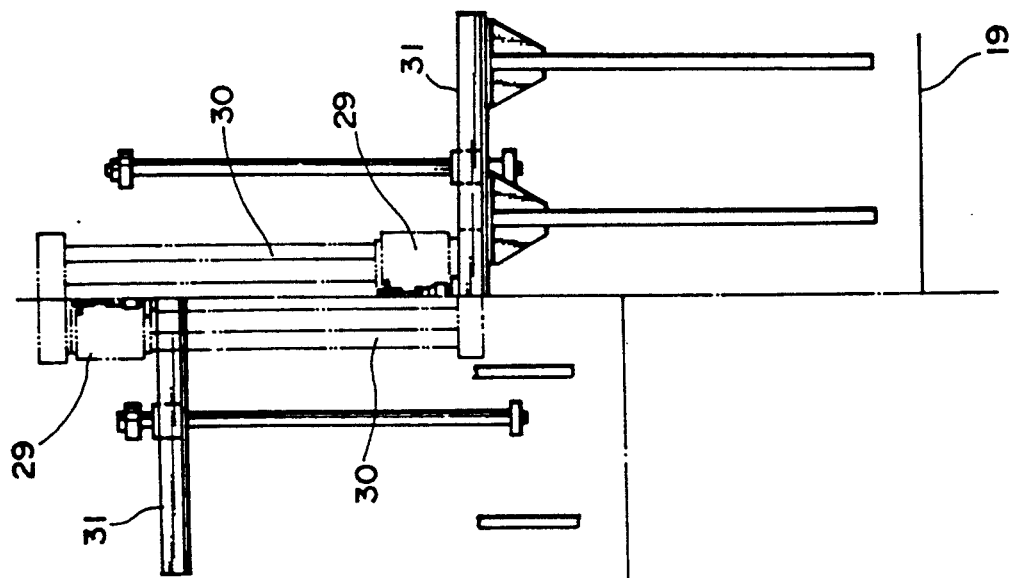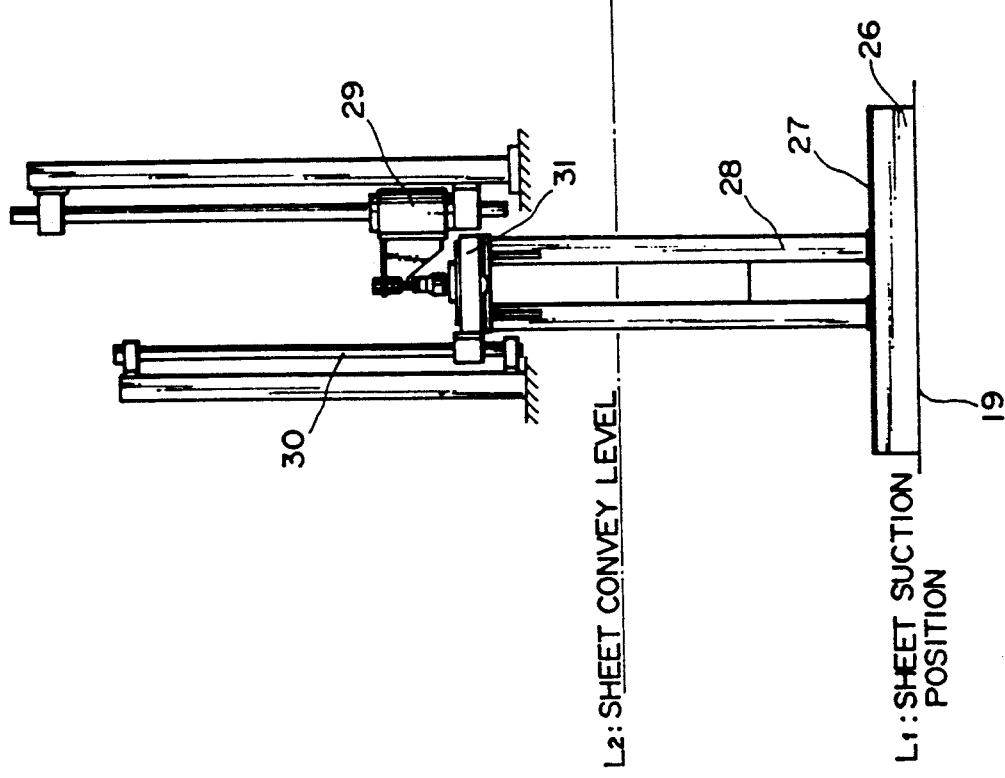

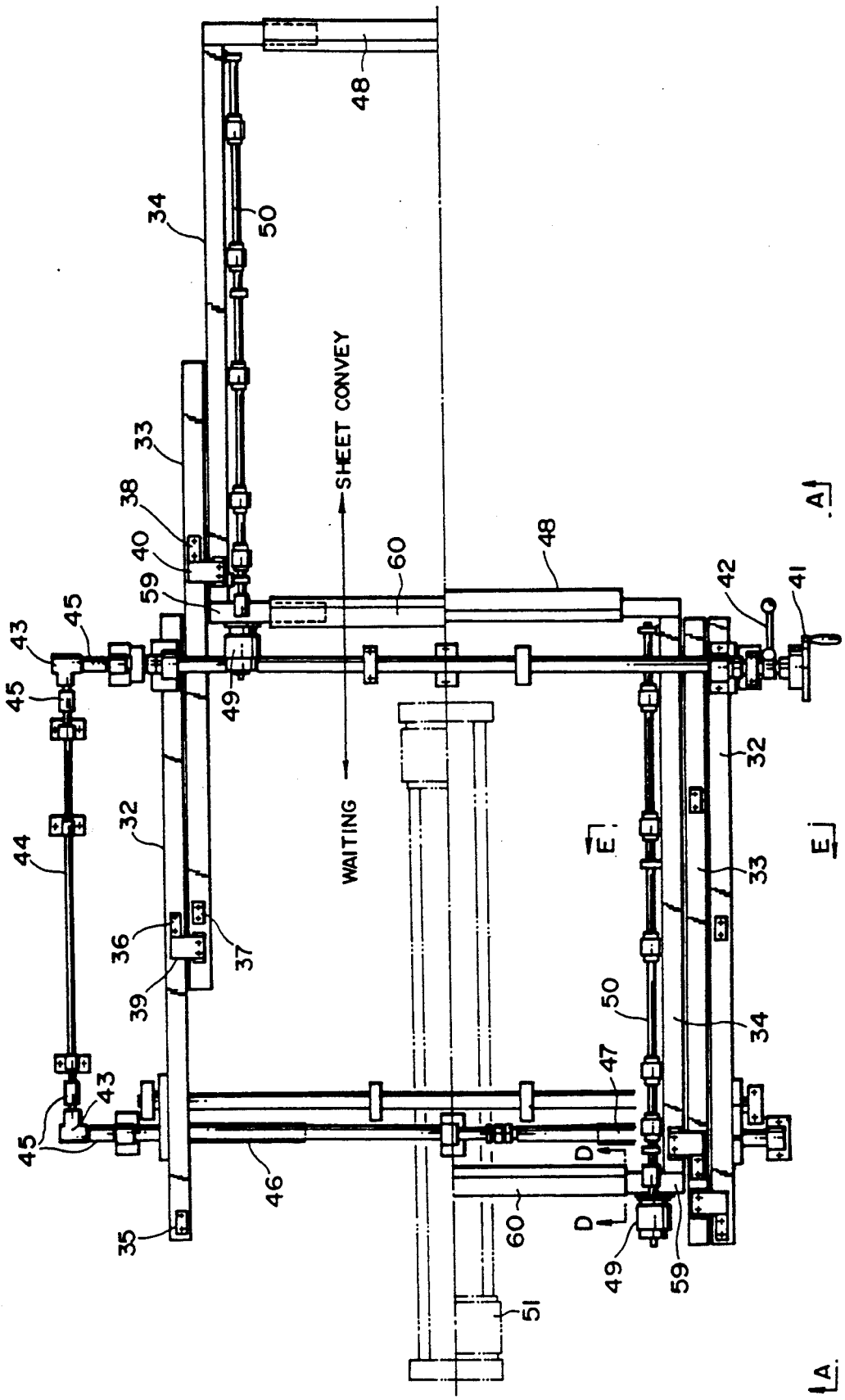

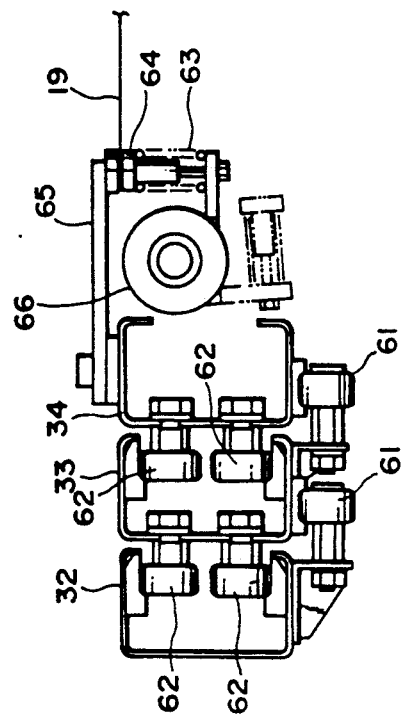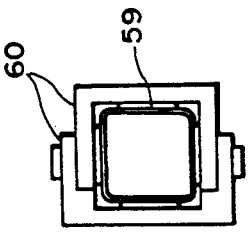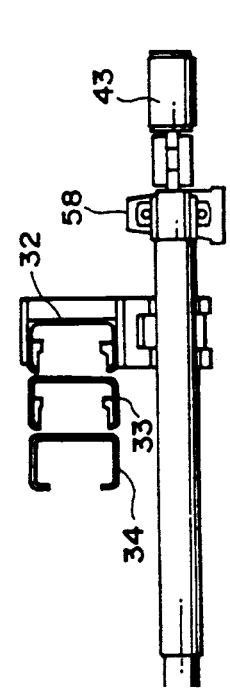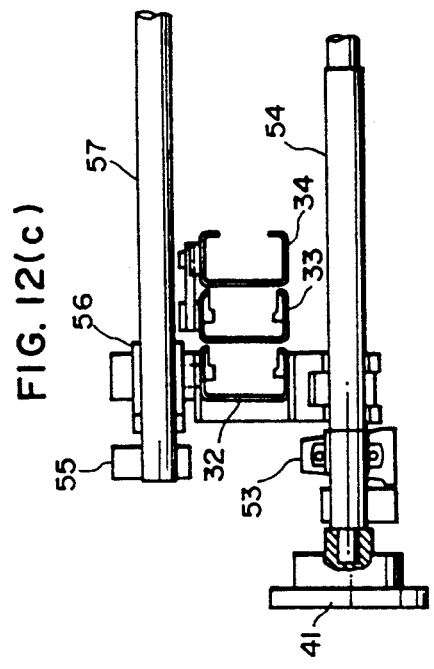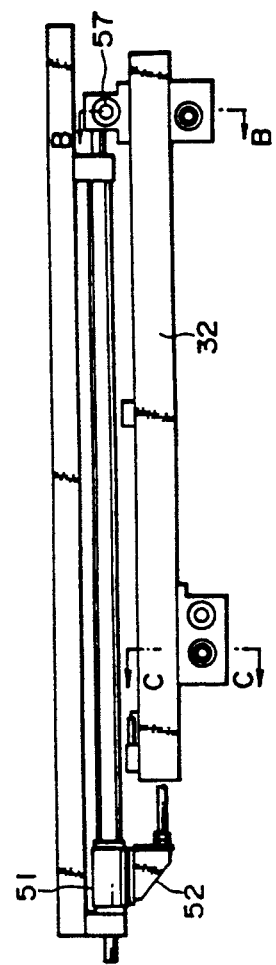

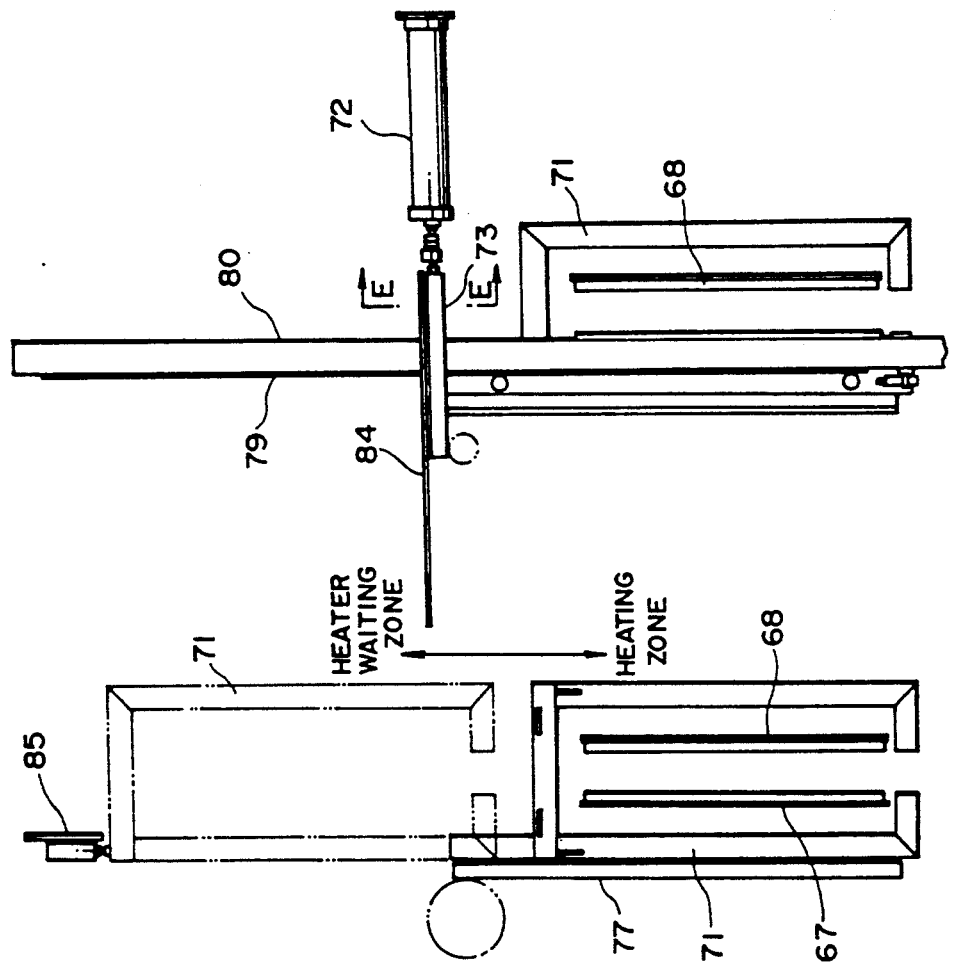
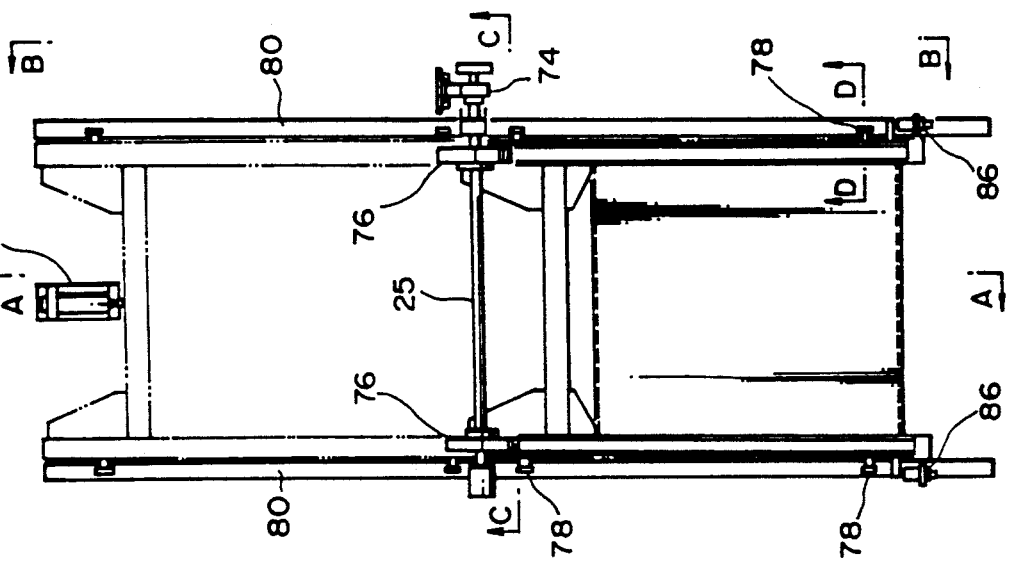

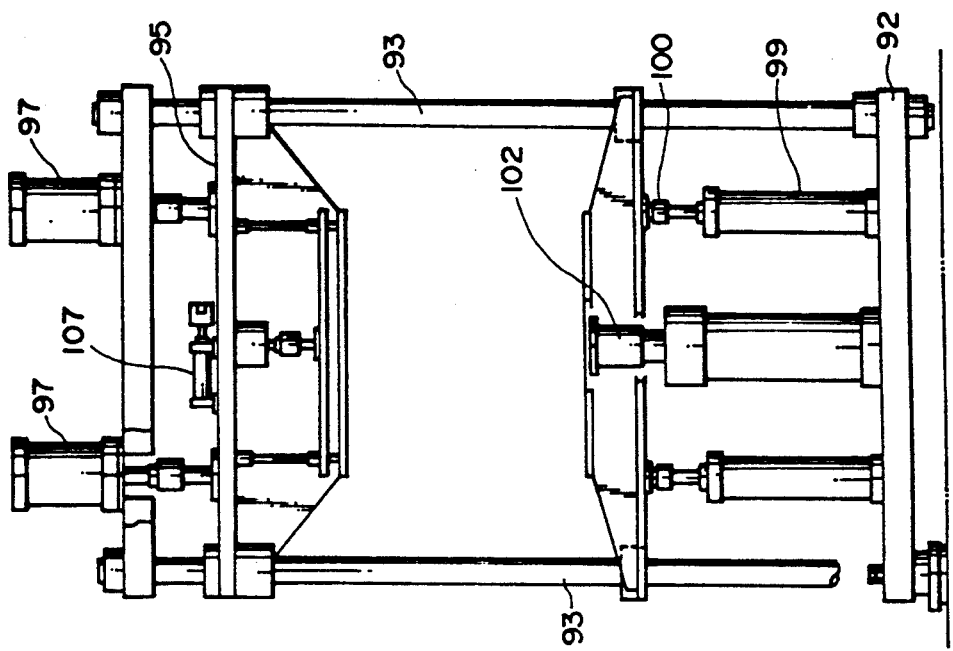
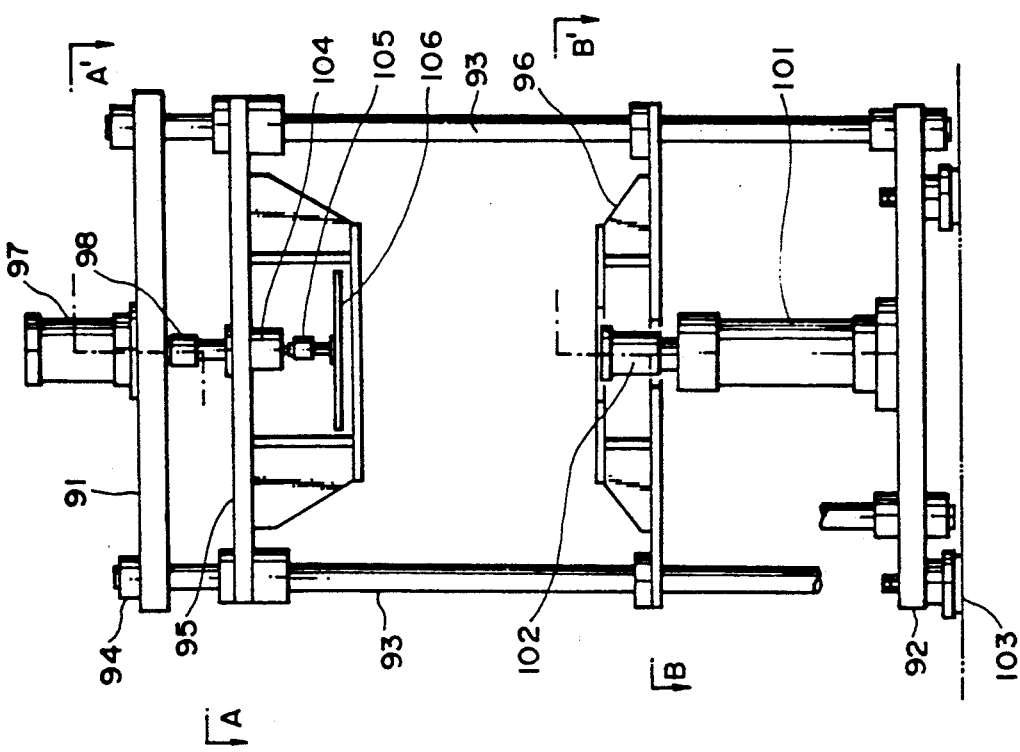

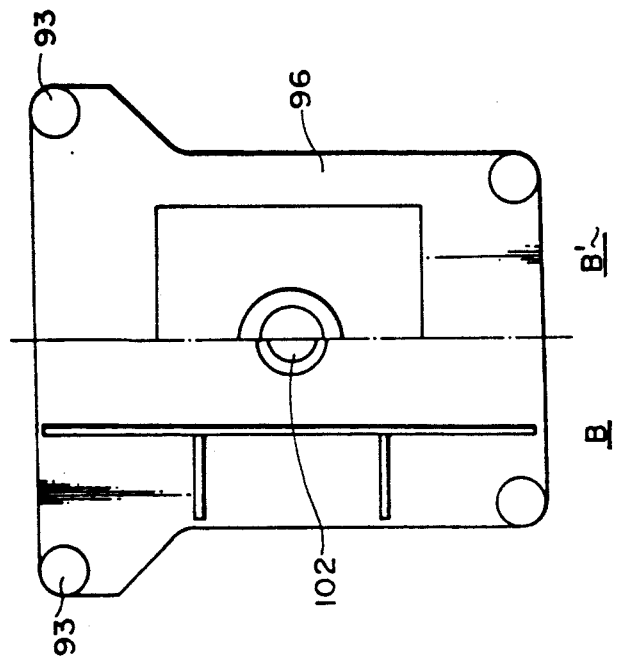
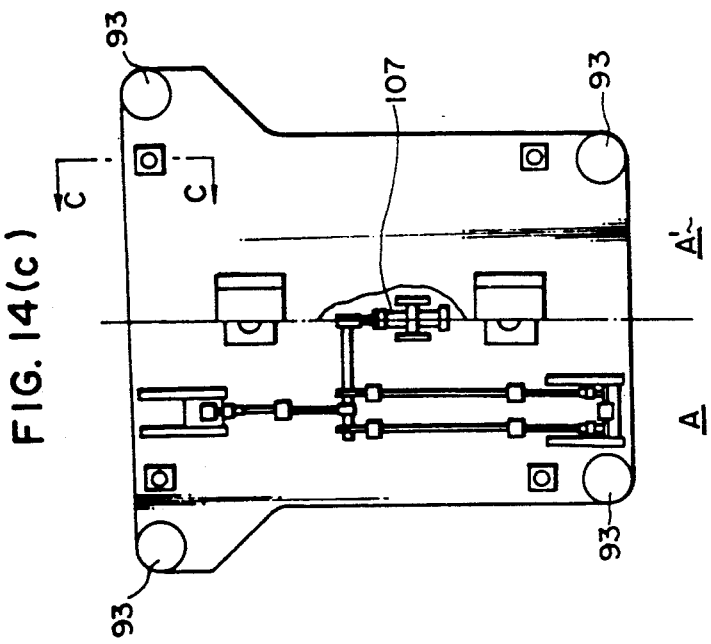
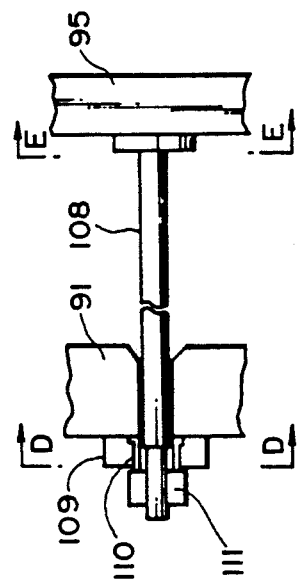

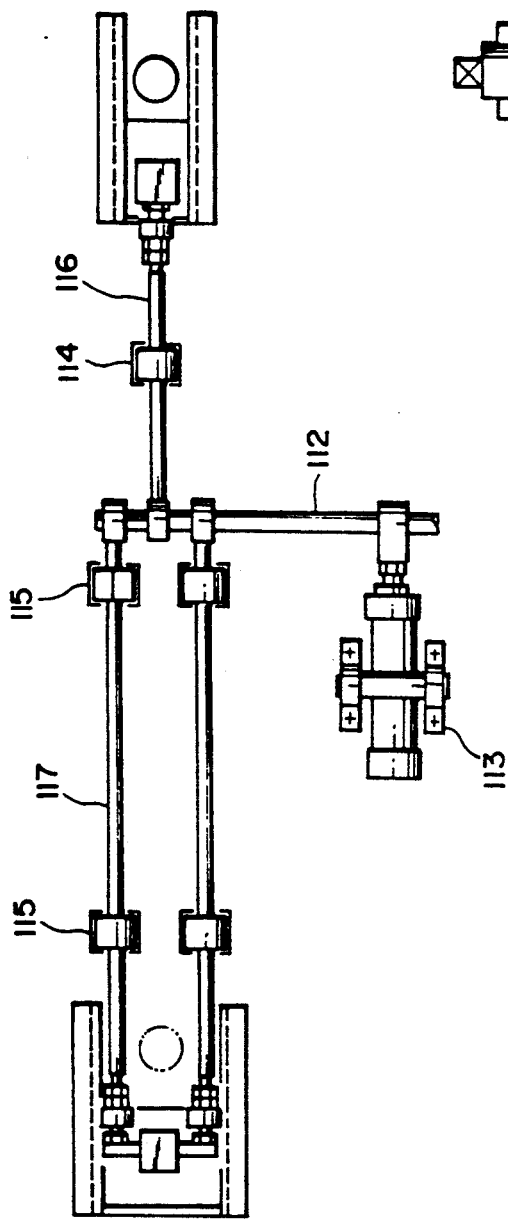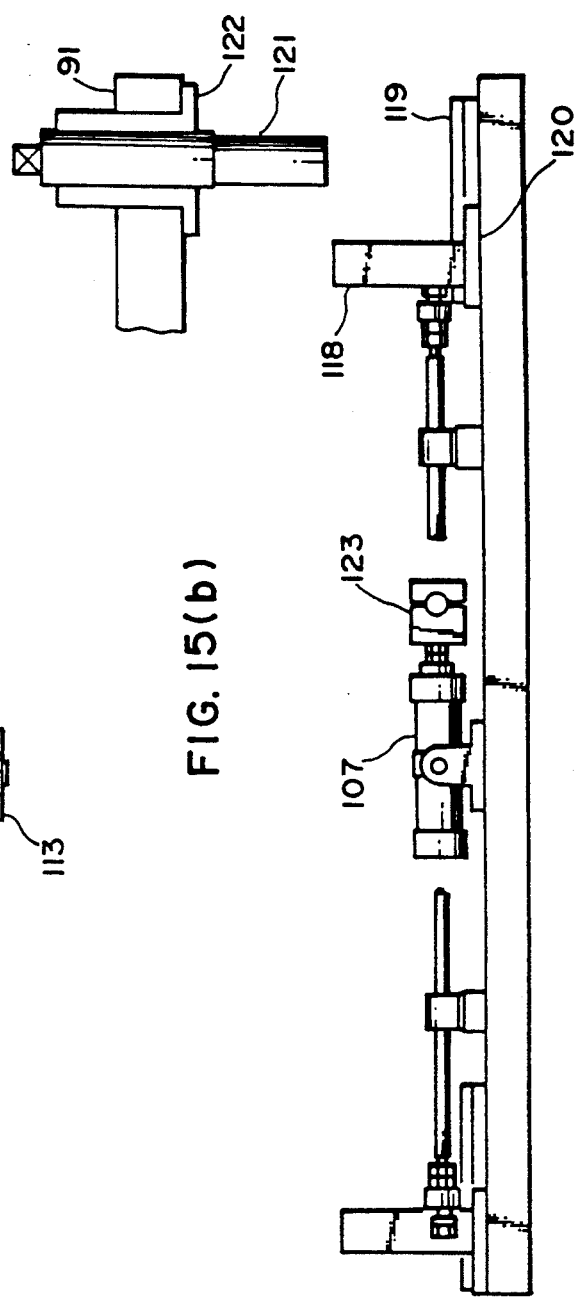
FIG. 15(a)
FIG. 15(b)

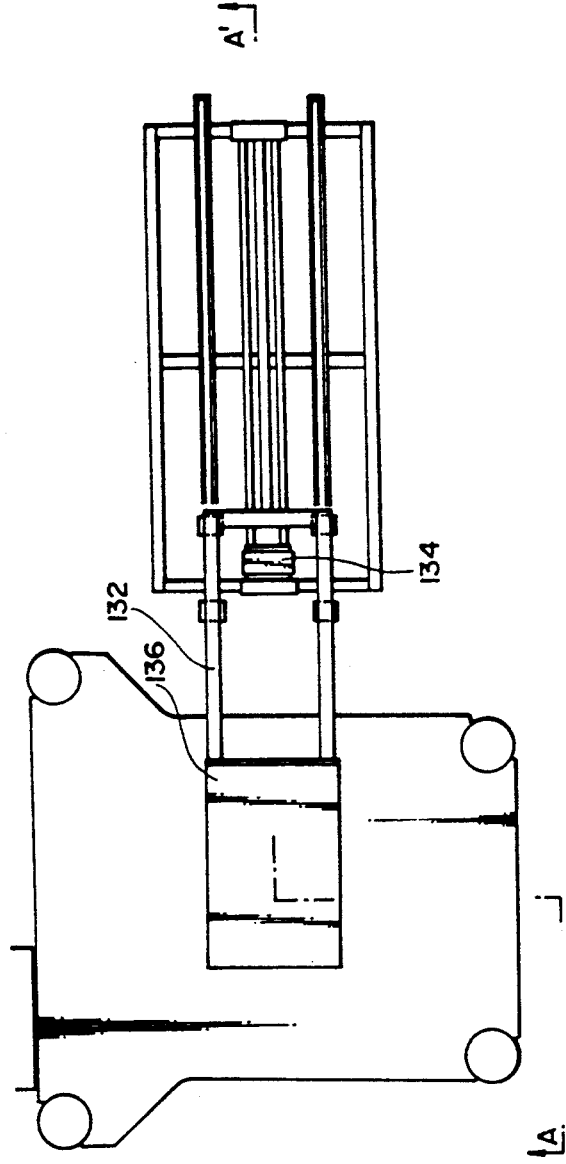
FIG. 16(a)
FIG. 16(b)
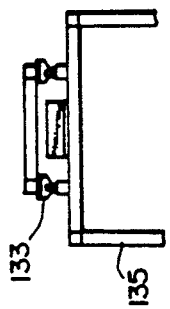
FIG. 16(c)

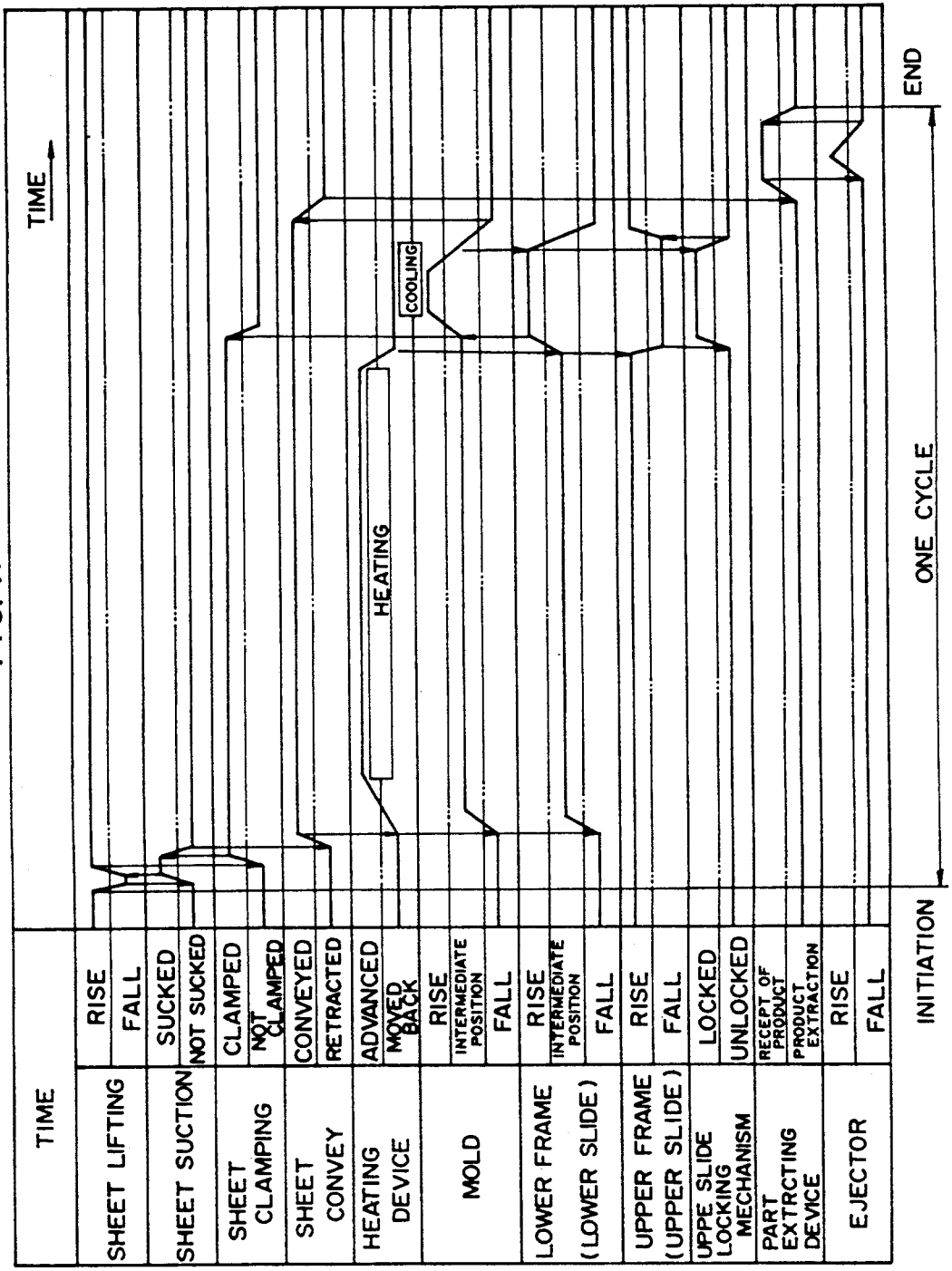

FIG. 20(a)
FIG. 20(b)
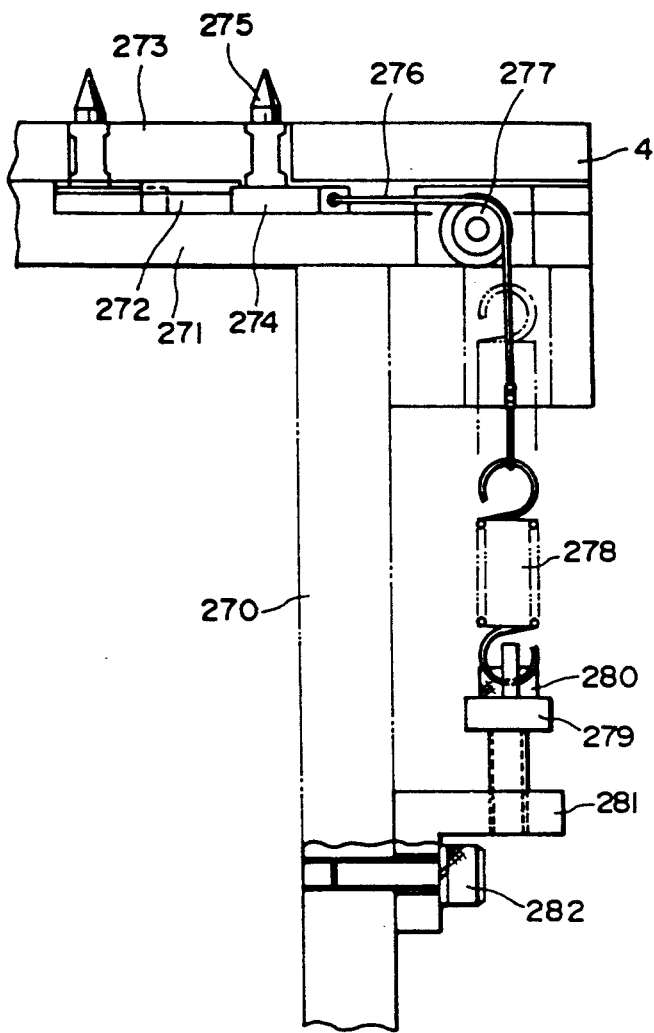
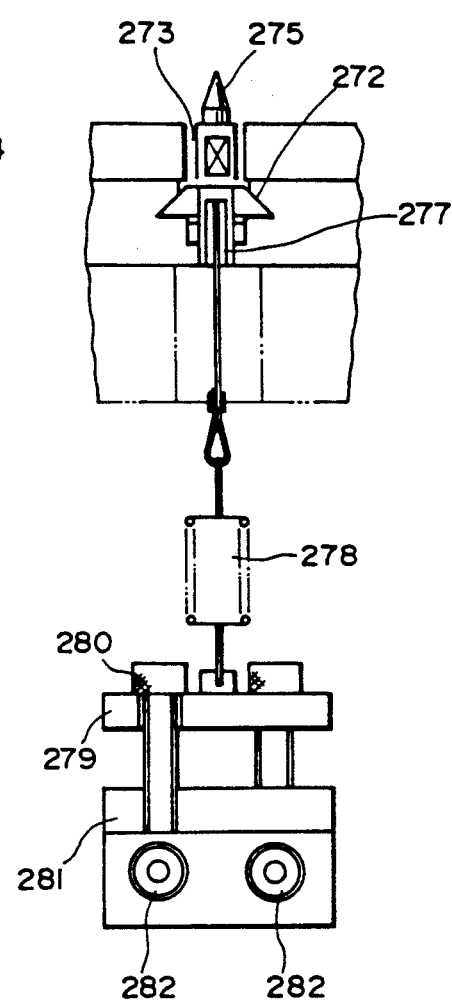

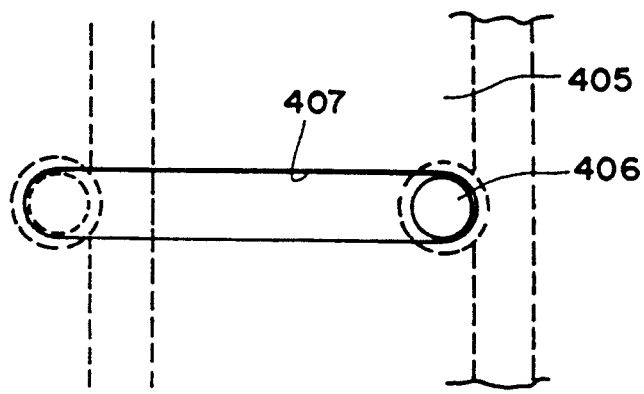
FIG. 26(a)
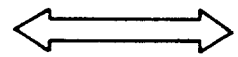
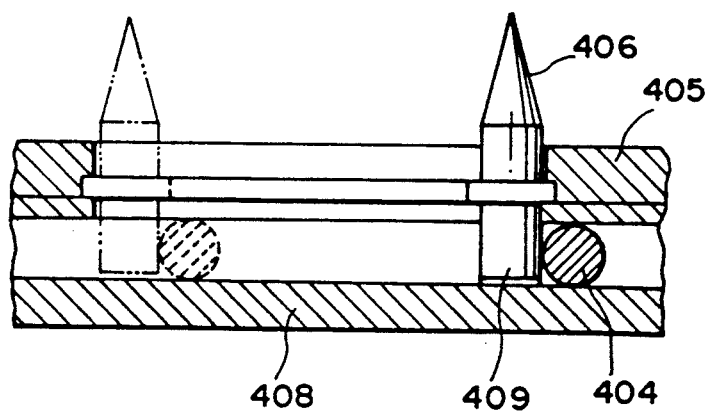
FIG. 26(b)

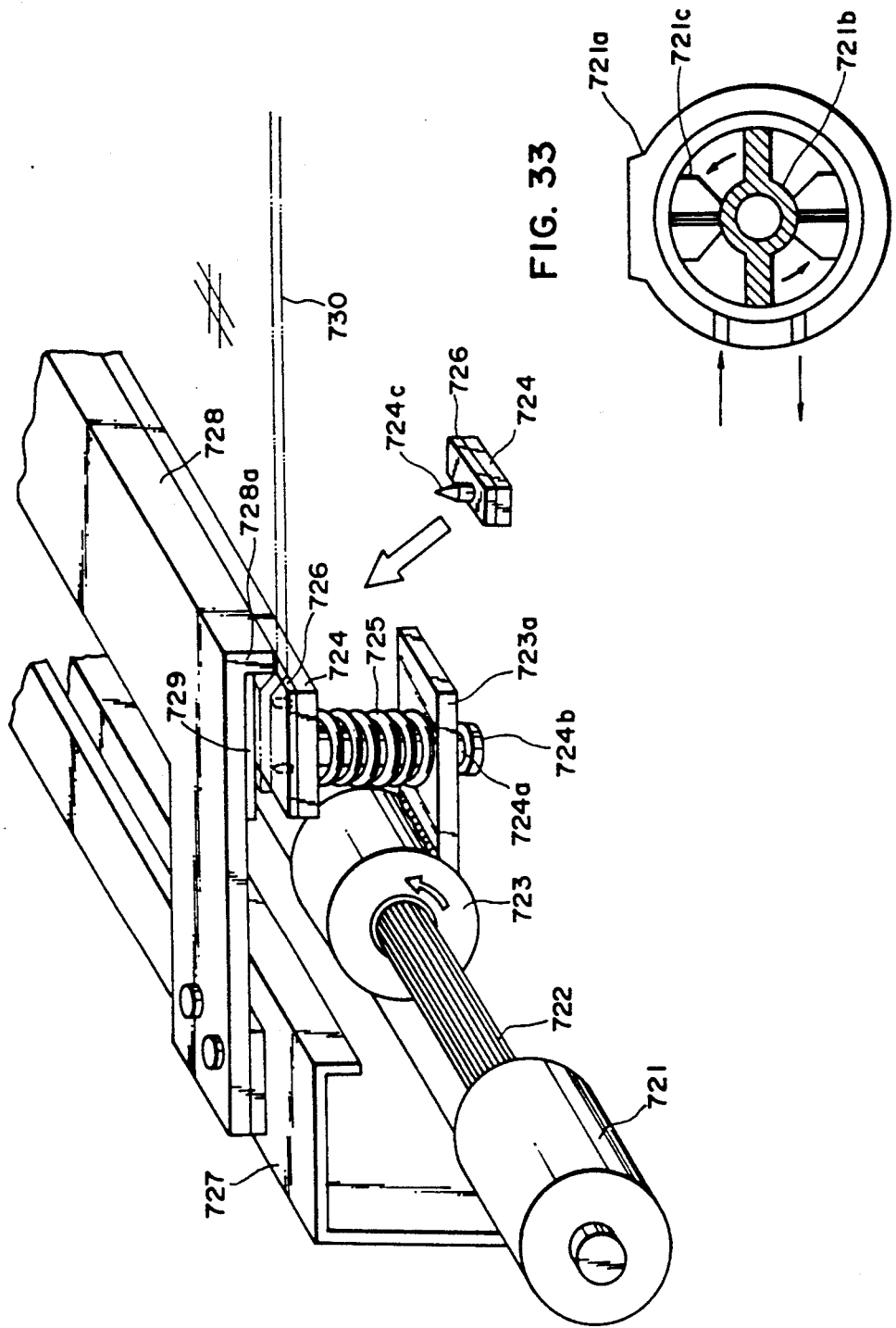

METHOD OF MANUFACTURING THREE-DIMENSIONAL PARTS USING SHEETS OF THERMOPLASTIC RESIN HIGH-PERFORMANCE FIBER-REINFORCED COMPOSITE MATERIAL AND APPARATUS THEREFOR

BACKGROUND OF THE INVENTION

The present invention relates to a method of continuously forming three-dimensional parts by heating and stamping using sheets of a high-performance fiber-reinforced composite material which employs as a matrix a thermoplastic resin and in which the reinforcing fiber is oriented, and an apparatus therefor.

The conventional methods of forming resin composite materials are classified by the contents of the reinforcing material and type of resin as shown in FIG. 1.

More specifically, to form a composite material of a thermoplastic resin and a reinforcing material which is 50% or more of the contents by volume, prepreg molding or pultrusion is used. When the contents of the reinforcing material are 50% or less by volume, injection molding or stampable sheet forming is employed. When a composite material is composed of a thermoset resin and a reinforcing material which is 50% or more of the contents by volume, filament winding, pultrusion or hand lay-up molding is used. When the contents of the reinforcing material are 50% or less, SMC, BMC or spraying is used. In FIG. 1, the numerals in parentheses are percentages representing typical contents [See TEXXES Features and Application of Hybrid Fabric By Hiroichi Inoguchi, Industrial Material Vol. 37, No. 1981.1].

FIG. 2 shows the strength of the parts manufactured by various forming methods. The numerals in parentheses are estimated values [see Technological Trends on Stampable Sheets by Suguru Koshimoto, Plasticity and Processing, Vol 29, No. 333 (1988-10) and TEXXES Features and Application of Hybrid Fabric, Hiroichi Inoguchi, Industrial Material, Vol. 37, No. 1 (1989.1)].

The present invention is directed to forming high-strength parts from a composite material which employs as a matrix a thermoplastic resin used in the prepreg forming and pultrusion shown in FIG. 1, and in which reinforcing fiber is oriented.

In both the aforementioned high-strength parts forming method and the conventional fiber reinforced plastic forming methods, stamping is used as one method of forming a resin type composite material. This stamping method is commonly used to produce mass-market consumer products. The stampable sheet forming and SMC shown in FIG. 1 are examples of this stamping method.

Stampable sheet stamping consists of the steps of preheating a blank of a sufficient length and of placing the blank into a mold to form it under pressure, the mold being heated to a temperature at which the resin sets or below.

In this forming method, flow of the resin preheated to its melting point or above is utilized to form the sheet. With some types of resins, the thickness of the parts can be changed by changing the number of preheated sheets piled on one another.

This conventional stamping method employs a material in which a material, a thermoset or thermoplastic resin, is reinforced by glass or carbon fiber (short fiber, long fiber or long fiber mat), and utilizes flow of the material which occurs within the closed mold during forming. To ensure excellent flow, a material whose fiber contents are 50% or less is generally used.

The reinforcing fiber conventionally used in the resin type composite materials formed by stamping is either short or long chopped strands or chopped or continuous strand mat. Since such fibers can be relatively freely deformed in the base matrix during forming, they are suited to stamping.

On the other hand, the present invention is aimed at a method of stamping sheets of a high-performance fiber reinforced composite material (one type of so-called advanced composites) which employs as a matrix a thermoplastic resin and in which the reinforcing fiber is oriented. Fibers (cloths) having various orientations, typical examples of which are shown in FIG. 3, can be used as the reinforcing fiber in the high-performance fiber reinforced composite material (See Newest Composite Technological List, Newest Composite Technological Survey Editing Committee, published in March 1990 by Sangyo Gijutsu Service Center). Reinforcing fiber of a volume of 50% or more may be achieved. Also, since the strength of the fiber, stronger than a resin, dominates the strength level of the entire material, the resultant composite material has a high strength, as compared with the conventional reinforced plastic parts, as shown in FIG. 2.

The advanced composite material (ACM) forming method will be described in detail below.

Since thermoplastic resins, such as polyether etherketone (PEEK), exhibit high heat and shock resistance and can be repaired, their application to the aerospace field has been researched for a long time. However, since a sheet (prepreg) made of a carbon or glass fiber impregnated with a thermoplastic resin is hard at room temperatures, it is considered difficult to form such sheets laminated in a mold with a complicated shape.

On the other hand, a conventional prepreg made using a thermoset resin is soft and viscous and hence ensures easy forming. However, productivity of such a prepreg is not good.

Hence, to allow thermoplastic resins to be used in a composite material in place of thermoset resins, a forming method which is technically easy and reduces production costs has been desired.

As a means of achieving this objective, much attention has therefore been directed to co-woven fabrics of fiber of a thermoplastic resin and reinforcing glass or carbon fiber. Since such fabrics are flexible, they can be formed into a complex shape. Furthermore, the reinforcing fiber and the resin fiber are intermingled in these co-woven fabrics, they can be uniformly intermingled in a resultant composite material made by heating.

However, forming such co-woven fabrics are soft and hence cannot be handled easily. This makes stable high speed production difficult.

Furthermore, because the resin fiber must be melted again and be uniformly intermingled in the reinforcing fiber, impregnating it into the reinforcing fiber takes a long time.

Many high-speed metal forming methods have been developed over the years. Among the most common high-speed forming methods is sheet metal forming (one type of stamping), including deep draw forming. This forming method has much to offer with regard to mass production of resin type composite materials. Applying the concepts of this metal forming method to the forming of semi-finished products of sheets (prepregs) made of carbon or glass fiber impregnated with thermoplastic resin leads to a method which assures the highest productivity, because it eliminates the impregnation process required in forming of co-woven fabrics.

The semi-finished products which can be used in the above method, shown in FIGS. 3 (a) to 3 (c), are sheets in which oriented reinforcing fiber are impregnated with a thermoplastic resin.

In FIG. 3, (1), (2) .. indicate warps, and ①②... indicate wefts.

These semi-finished products undergo any of the following deformations when they are formed by a combination of stamping and deep drawing: (1) fiber stretching, (2) fiber straightening, (3) shear slip and (4) caused by the trellis effect.

(1) Fiber stretching is deformation of fiber caused by tension acting on the fiber during formation, as shown in FIG. 4 (a). The maximum strain is as small as about 1%.

(2) Fiber straightening is deformation caused by loosening of warps and wefts of a fabric during forming, as shown in FIG. 4 (b).

To enhance the strength of a sheet, loosening of warps and wefts is controlled as little as possible during sheet weaving, and hence affects all of the deformations less.

(3) Shear slip is generated at a position where rapid deformation occurs, such as a corner, as shown in FIG. 4 (c).

(4) The deformation caused by the trellis effect is similar to the shear strain of metals, as shown in FIG. 4 (d), and is caused by changes in the direction of orientation of fiber, not by fiber straightening. A relatively small force produces a large deformation.

The aforementioned deformations have deformation limiting angles according to the type of fabric. When the sheet is deformed at an angle larger than this deformation limiting angle, local buckling occurs in the sheet, deteriorating the surface property of the finished product. During sheet forming, most portions of deformations are caused by the trellis effect shown in FIG. 4 (d).

Hence, it is necessary to control the trellis effect deforming angle within a predetermined angle during forming in order to eliminate local sheet buckling at that time and to obtain products having excellent properties (see PCT/EPC89/00428: WO89/10253).

In continuously manufacturing three-dimensional parts by heating and stamping from sheets of a fiber reinforced composite material which employs as a matrix a thermoplastic resin and in which the reinforcing fiber is oriented, the following factors must be overcome or improved.

(1) The sheet of the fiber reinforced composite material must be formed within the optimum temperature range determined by the type of composite material. Heating and forming the sheet at a temperature which is not within the optimum range (a) deteriorates the sheet flow during forming and thereby generates wrinkles or cracks in the finished products when the temperature is low; the temperature being maintained at Tg (glass transition temperature) or above during forming, and (b) deterioration occurs due to thermal decomposition of resin molecules when the temperature is high. In addition to these problems, color change may occur due to oxidation caused during heating.

This stamping method developed for mass production includes step 1: heating period; step 2: termination of heating and initiation of the forming (initiation of the mold contact); step 3: forming period (from initiation of the mold contact to termination of the mold operation; and step 4: cooling period. In these steps, the temperature of the sheet of the fiber reinforced composite material must be controlled as follows for the above-described reasons: (1) at the allowable heating temperature (for example, 210 ±10° C. in the case of PA6 [polyamide: nylon]) or less when heating is terminated, (2) at Tg (glass transition temperature) or above (for example, 80° C. in the case of PA6) when forming is terminated, (3) since the temperature of the sheet of the fiber reinforced composite material drops during steps 2 and 3, the forming device must be able to uniformly heat the sheet of the fiber reinforced composite material to the highest possible temperature within the allowable temperature range when heating is terminated.

In experiments conducted by the present inventors, when the sheet of the fiber reinforced composite material hangs by 40 mm during heating and the distance between the heater and the sheet of the fiber reinforced composite material thus becomes non-uniform, temperature difference of about 50° C. occurs in the sheet. With 50° C. temperature difference generated at the end of heating, the formable temperature range is narrowed, and the formable shape of products is thus limited.

Hence, a function of holding the sheet of the fiber reinforced composite material during heating is necessary in order to eliminate hanging.

(2) In the forming process according to the present invention, since an oriented semi-finished product (generally, V≧50%) in which, unlike the conventional sheet thermal forming proceccess, reinforcing fiber is woven in is used, generation of wrinkles in the finished product must be prevented by controlling the fiber placement during forming. When the ends of the oriented material are clamped and heated, the force for maintaining the relative distance between the warps and wefts in the woven fabric weakens and hence the relative distance changes slightly due to the weight of the semi-finished product, which causes it to hang. Generation of hanging deteriorates control of the fiber flow and hence generates the following problems. (a) When the hanging sheet is clamped by the upper and lower frames, wrinkles are generated in the clamped portions, deteriorating the surface property of the finished product. (b) Controllability deteriorates because play commensurate with the loosening of the fiber is generated.

SUMMARY OF THE INVENTION

A primary object of the present invention is to provide a method of continuously manufacturing three-dimensional products using sheets of a high-performance fiber reinforced composite material which uses as a matrix a thermoplastic resin and in which the reinforcing fiber is oriented by heating and stamping which enables the time from completion of the heating to initiation of the forming to be reduced and which enables the temperature drop during forming to be minimized to obtain reliable products.

A second object of the present invention is to provide a continuous forming method for forming sheets without generating wrinkles by retaining the necessary portions of a sheet by protruding fiber placing pins at the frame portion for clamping the sheet during forming so that the deformation angle caused by the trellis effect can be within a predetermined angle during forming and by automatically returning the fiber placing pins to their original positions when the part is extracted.

A third object of the present invention is to provide a method of continuously forming sheets of a high-performance fiber-reinforced composite material in which a reinforcing fiber flow is controlled without requiring special driving mechanism and a control device, and without limiting the design of the frames.

A fourth object of the present invention is to provide a method of continuously manufacturing three-dimensional products using sheets of a high-performance fiber reinforced composite material composed of a thermoplastic resin matrix and an oriented reinforcing fiber by heating and stamping in which the sheet is clamped and pulled while the fiber is retained so as to prevent wrinkles from being rolled into the upper and lower frames when the sheet is hung during heating and so as to prevent wrinkles from being generated by loosening when the fiber is placed during forming.

To achieve the aforementioned primary object, the present invention provides a method of forming sheets of a thermoplastic resin high-performance fiber-reinforced composite material, which comprises the step of supplying the sheet of the high-performance resin-reinforced composite material which uses as a matrix a thermoplastic resin and in which the reinforcing fiber is oriented, the step of clamping an end portion of the sheet by a sheet clamping device, the step of conveying the sheet to a heating/forming zone, the step of heating the sheet to a predetermined temperature, the step of clamping the sheet by upper and lower frames by driving cylinders, the step of forming a three-dimensional part by operating a mold and thereby deep drawing the clamped sheet inwardly according to a stroke of the mold, and repeating the aforementioned series of steps continuously.

The present invention further provides an apparatus for manufacturing three-dimensional parts using sheets of a thermoplastic resin high-performance resin-reinforced composite material, which comprises a device for supplying the sheet of the high-performance resin-reinforced composite material which uses a thermoplastic resin as a matrix and in which reinforcing fiber is oriented, a sheet clamping device for clamping an end portion of the sheet, a conveying device for conveying the sheet into a heating/forming zone, a heating device for heating the sheet to a predetermined temperature, upper and lower frames driven by cylinders for clamping the sheet, a forming device having a mold, the forming device forming the three-dimensional part by operating the mold and thereby deep drawing the clamped sheet inwardly according to a stroke of the mold, and an ejecting device for extracting the three-dimensional part.

To achieve the second object of the present invention, there is provided such a method in which a fiber placing pin pierces into the sheet at the frame portion for clamping the sheet during forming, in which a retaining force is applied to the fiber placing pin so that a deformation angle caused by the trellis effect can be within a predetermined angle during forming, and in which the fiber placing pin is returned to an original position thereof.

To achieve the third object of the present invention, there is provided such a method in which fiber flow is restricted during forming by a pin which protrudes from the opposed frames, and in which amount and time at which the pin protrudes are controlled.

To achieve the fourth object of the present invention, there is provided such a method in which the sheet is clamped and pulled by the sheet clamping device and the fiber is retained so as to prevent the sheet from being hung when heated.

The present invention further provides such a method in which a tension applying mechanism for concurrently clamping and pulling the sheet and a fiber placement control mechanism are provided.

According to the present invention, the sheet is conveyed to the forming zone from the original position of the device by the conveying device. The ends of the sheet are clamped by the sheet clamping device. Next, the heater enters the forming zone to heat the sheet to a predetermined temperature. After the heater is retracted, the cylinders are driven to clamp the sheet by the upper and lower frames. At that time, the mold is also moved toward the sheet by driving the cylinder. The mold moves up at the optimum speed and thereby forms the sheet. After the mold is moved down by driving the cylinder, the upper and lower frames are opened by driving the cylinders, and the part is extracted.

At the frame portion for clamping the sheet during forming, the necessary portions of the sheet are retained by protruding the fiber placing pins so that the deformation angle caused by the trellis effect can be within a predetermined angle. After forming, the fiber placing pins are quickly returned to their original positions, thereby enabling sheets to be continuously formed without generating wrinkles.

More practically, (1) reaction is generated in the fiber placing pin using a spiral spring, a coil spring, a plate spring, an air pressure or an electric servo motor so as to retain the pin inserted portion of the sheet during forming and thereby control fiber orientation. When the part is extracted, the fiber placing pin is automatically returned to its original position so as to allow continuous forming to be conducted. (2) When the guide body having a fixed end serving as the center of rotation and means for applying the retaining force to the fiber placing pin and for returning the fiber placing pin is provided on the surface of the frame, the fiber placing pin pulls the fiber and undergoes linear motion during forming against the reaction of the coil spring which rotates about the fixed end. That is, the fiber placing pin undergoes not only linear motion but also rotational motion about the fixed end. The stroke of the fiber placing pin can be freely set by exchanging the cover or using adjusting shafts. (3) When the large number of fiber placing pins provided on the surface of the frame are controlled at the same time by a control mechanism for controlling the fiber placing pins, the individual fiber placing pins can be reliably returned to their original positions.

Furthermore, according to the present invention, an independent driving mechanism is provided within the frame so that the fiber placing pin can be protruded and returned at a desired timing in the series of forming operations.

Furthermore, in the present invention, the part ejecting mechanism is utilized so as to mechanically synchronize the part ejecting operation and the fiber placing pin removing operation.

Furthermore, the fiber placing pin pierces into the sheet clamped by the frames synchronously with the drive of the part ejecting device having the ejecting plate which can enter and retract from the frames so as to retain the sheet. Also, the amount with which the fiber placing pin protrudes is adjustable.

Since the sheet handling device for conveying the sheet to the heating/forming zone is incorporated, the sheet can be located accurately for heating and forming. That is, the sheet lifted by the sheet lifting device (not shown) is clamped at the two or four sides thereof by the sheet clamping device, and then the sheet is conveyed to the forming zone. Concurrently with this, the upper and lower heaters supported by the heater frame enter the forming zone to heat the sheet.

At that time, the sheet is clamped and pulled by any of the various types of sheet clamping devices so as to prevent from the sheet from being hung.

Tension is applied to the sheet until the upper and lower frames are closed or until forming is completed so as to restrain flow of the fiber.

BRIEF DESCRIPTION OF THE DRAWINGS

FIG. 1 shows conventional forming methods and the relation between the matrix and the contents of a reinforcing material;

FIG. 2 shows the strength of the parts manufactured by various conventional forming methods;

FIG. 3 (b) shows the structure of a twill woven sheet made of a thermoplastic resin high-performance fiber reinforced composite material;

FIG. 3 (c) shows the structure of a satin woven sheet made of a thermoplastic resin high-performance fiber reinforced composite material;

FIG. 4 (b) shows deformation caused by loosening of warps and wefts of a fabric during forming;

FIG. 4 (c) shows shear slip generated at a position where rapid deformation occurs, such as the corner of a fabric;

FIG. 4 (d) shows deformation caused by the trellis effect;

FIG. 6 (a) shows the first step of the fundamental forming process for the sheet of a thermoplastic resin high-performance fiber-reinforced composite material;

FIG. 6 (b) shows the second step of the fundamental forming process for the sheet of a thermoplastic resin high-performance fiber-reinforced composite material;

FIG. 6 (c) shows the third step of the fundamental forming process for the sheet of a thermoplastic resin high-performance fiber-reinforced composite material;

FIG. 6 (d) shows the fourth step of the fundamental forming process for the sheet of a thermoplastic resin high-performance fiber-reinforced composite material;

FIG. 6 (e) shows the fifth step of the fundamental forming process for the sheet of a thermoplastic resin high-performance fiber-reinforced composite material;

FIG. 6 (f) shows the sixth step of the fundamental forming process for the sheet of a thermoplastic resin high-performance fiber-reinforced composite material;

FIG. 7 (a) is a perspective view of a manufacturing apparatus according to the present invention, as viewed from the front side thereof;

FIG. 7 (b) is a perspective view of the manufacturing apparatus according to the present invention, as viewed from the rear side thereof;

FIG. 9 (b) is a front view of the manufacturing apparatus according to the present invention;

FIG. 9 (c) is a side elevational view of the manufacturing apparatus according to the present invention;

FIG. 10 (b) shows a sheet loading car of the sheet loading device of the manufacturing apparatus according to the present invention;

FIG. 10 (c) shows stoppers of the sheet loading car of the sheet loading device of the manufacturing apparatus according to the present invention;

FIG. 10 (d) shows the portion of FIG. 10 (b) indicated by B;

FIG. 10 (e) is a front view of the portion of FIG. 10 (b) indicated by A;

FIG. 10 (f) is a side elevational view of the portion of FIG. 10 (b) indicated by A;

FIG. 11 (a) is a front view of a sheet lifting device of the manufacturing apparatus according to the present invention;

FIG. 11 (b) is a side elevational view of the sheet lifting device of the manufacturing apparatus according to the present invention;

FIG. 12 (a) shows the configuration of a sheet clamping/conveying (sheet handling) device;

FIG. 12 (b) is a view taken in the direction of the arrow along the line A—A of FIG. 12 (a);

FIG. 12 (c) is a view taken in the direction of the arrow along the line B—B of FIG. 12 (b);

FIG. 12 (d) is a view taken in the direction of the arrow along the line C—C of FIG. 12 (b);

FIG. 12 (e) is a view taken in the direction of the arrow along the line D—D of FIG. 12 (a);

FIG. 12 (f) is a view taken in the direction of the arrow along the line E—E of FIG. 12 (a);

FIG. 13 (b) is a view taken in the direction of the arrow along the line A—A of FIG. 13 (a);

FIG. 13 (c) is a view taken in the direction of the arrow along the line B—B of FIG. 13 (a);

FIG. 13 (d) is a view taken in the direction of the arrow along the line C—C of FIG. 13 (a);

FIG. 13 (e) is a view taken in the direction of the arrow along the line D—D of FIG. 13 (a);

FIG. 13 (f) is a view taken in the direction of the arrow along the line E—E of FIG. 13 (c);

FIG. 14 (a) is a front view of a forming device of the manufacturing apparatus according to the present invention;

FIG. 14 (b) is a side elevational view of the forming device of the manufacturing apparatus according to the present invention;

FIG. 14 (c) is a view taken in the direction of the arrow along the line A—A' of FIG. 14 (a);

FIG. 14 (d) is a view taken in the direction of the arrow along the line B—B' of FIG. 14 (a);

FIG. 14 (e) is a view taken in the direction of the arrow along the line C—C of FIG. 14 (c);

FIG. 14 (f) is a view taken in the direction of the arrow along the line D—D of FIG. 14 (e);

FIG. 14 (g) is a view taken in the direction of the arrow along the line E—E of FIG. 14 (e);

FIG. 15 (a) is a plan view of a slide locking device of the manufacturing apparatus according to the present invention;

FIG. 15 (b) is a side elevational view of the slide locking device of the manufacturing apparatus according to the present invention;

FIG. 16 (a) is a plan view of a part extracting device of the manufacturing apparatus according to the present invention;

FIG. 16 (b) is a view taken in the direction of the arrow along the line A—A' of FIG. 16 (a);

FIG. 16 (c) is a side elevational view of FIG. 16 (b);

FIG. 17 is a timing chart of the manufacturing apparatus according to the present invention;

FIG. 18 (b) is a perspective view of a coil spring type mechanism for generating a retaining force of a fiber placing pin and for returning the fiber placing pin for continuous forming in the manufacturing apparatus according to the present invention;

FIG. 18 (c) is a perspective view of a plate spring type mechanism for generating a retaining force of a fiber placing pin and for returning the fiber placing pin for continuous forming in the manufacturing apparatus according to the present invention;

FIG. 18 (d) is a perspective view of a pneumatic mechanism for generating a retaining force of a fiber placing pin and for returning the fiber placing pin for continuous forming in the manufacturing apparatus according to the present invention;

FIG. 19 (b) is a front view of the mechanism of FIG. 19 (a);

FIG. 19 (c) is a section taken along the line A—A of FIG. 19 (a);

FIG. 20 (a) is a front view of a second example of a mechanism for generating a retaining force of a fiber placing pin and for returning the fiber placing pin for continuous forming;

FIG. 20 (b) is a side elevational view of the mechanism of FIG. 20 (a);

FIG. 21 (b) is a perspective view of a first cover of the third example of the mechanism;

FIG. 21 (c) is a perspective view of a body portion of the third example of the mechanism;

FIG. 22 (b) is a section taken along the line A—A of FIG. 22 (a);

FIG. 23 (b) is a section taken along the line A—A of FIG. 23 (a);

FIG. 24 (b) is a cross-sectional view of the mechanism of FIG. 24 (a);

FIG. 26 (a) is a plan view showing a state in which a fiber placing pin and a cam rod are incorporated in a frame;

FIG. 26 (b) is a cross-sectional view of a state in which the fiber placing pin and the cam rod are incorporated in the frame;

FIG. 29 (b) shows a second step of the reinforcing fiber flow control operation according to the present invention;

FIG. 29 (c) shows a third step of the reinforcing fiber flow control operation according to the present invention;

FIG. 29 (d) shows a fourth step of the reinforcing fiber flow control operation according to the present invention;

FIG. 29 (e) shows a fifth step of the reinforcing fiber flow control operation according to the present invention;

FIG. 31 (b) is a cross-sectional view of the fiber placing pin supporting position adjusting portion;

FIG. 32 is a perspective view of part of a first example of a sheet clamping device according to the present invention;

FIG. 33 shows an oscillating actuator of the sheet clamping device of FIG. 32;

FIG. 42 (b) is a cross-sectional view of the chuck of the sheet clamping device of FIG. 41 which is closed;

DETAILED DESCRIPTION OF THE PREFERRED EMBODIMENTS

Figure 3A:
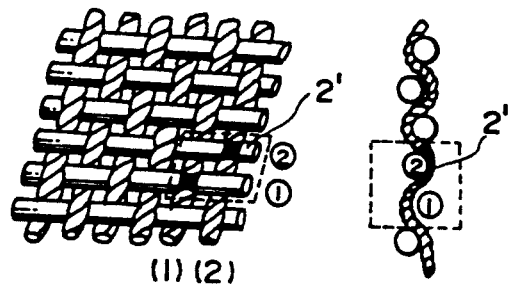
FIG. 3 (a) shows the structure of a plain woven sheet made of a thermoplastic resin high-performance fiber reinforced composite material.
Figure 3B:
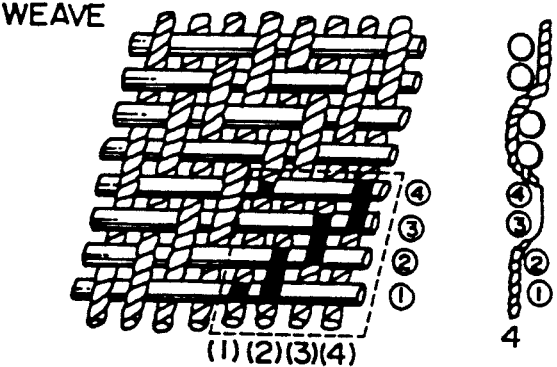
Figure 3C:
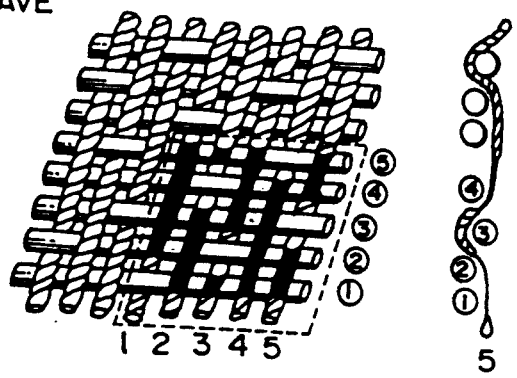
Figure 4A:
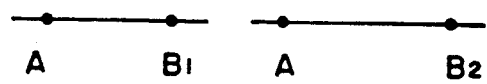
FIG. 4 (a) shows deformation caused by fiber stretching.
Figure 4B:
Figure 4C:
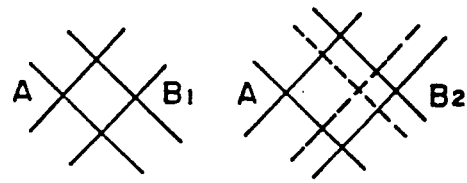
Figure 4D:
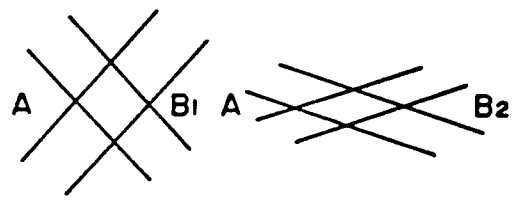
Figure 5:
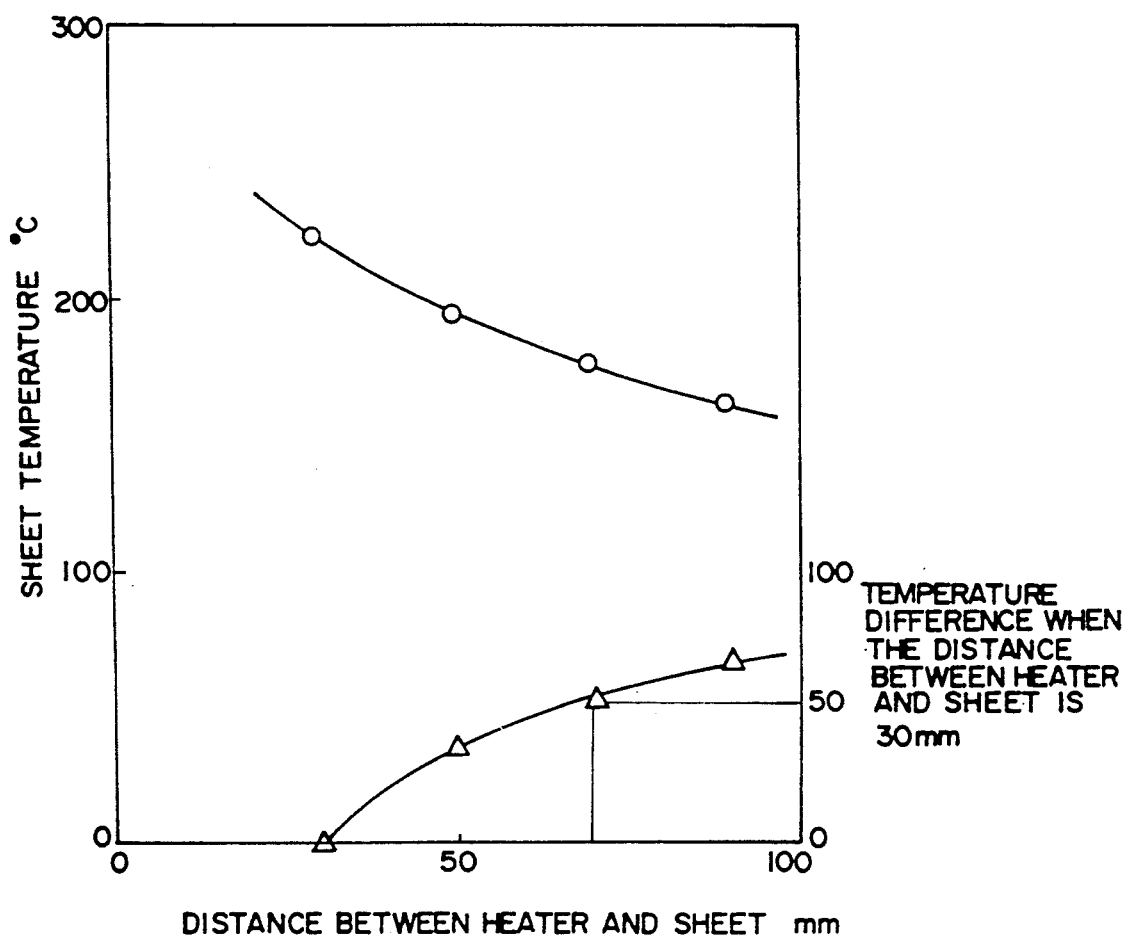
FIG. 5 shows the relation between the distance between a conventional heater and a sheet and the sheet temperature.

An embodiment of the present invention will be described below with reference to the accompanying drawings.

First, the basic forming process of an embodiment according to the present invention will be described with reference to FIGS. 6 (a) to 6 (f).

First, the forming apparatus is set to its starting position, as shown in FIG. 6 (a).

Next, the two ends of a sheet 11 are clamped by a sheet clamping device 10, and the sheet is conveyed to a heating/forming zone (see FIG. 8) in that state by a conveying device (see FIG. 12), as shown in FIG. 6 (b).

Thereafter, a heater 12 is moved into the heating-/forming zone (see FIG. 8) by a heating/driving device (see FIG. 13) to heat the sheet 11 to a predetermined temperature, as shown in FIG. 6 (c).

After the sheet is heated, the heater 12 is retracted, and the sheet 11 is then clamped by upper and lower frames 1 and 4 which are respectively driven by cylinders 3 and 8 through upper and lower slides 2 and 5, as shown in FIG. 6 (d). At this time, a cylinder 9 is also driven to move a mold 6 toward the sheet 11 through a mold base 7. The sheet 11 may be clamped by the upper and lower frames 1 and 4 and then heated by the upper and lower frames 1 and 4. After the sheet is clamped, the distal ends of pins protruding from the surface of the frame pierce into the sheet 11.

In that state, the mold 6 is moved up at an optimum speed to deep draw the sheet, as shown in FIG. 6 (e). During deep drawing, the clamped sheet 11 is deep drawn inwardly to an extent determined by the stroke of the mold 6 and thereby formed.

At that time, behavior of the sheet 11 is restricted by the pins and the sheet 11 is thereby deformed in accordance with the positions of the pins.

Next, the cylinder 9 is driven to withdraw the mold 6, and the cylinders 3 and 8 are then driven to open the upper and lower frames 1 and 4 so that a part 13 can be extracted.

The fundamental structure of the forming apparatus shown in FIG. 6 will be described with reference to FIGS. 7 (a) to 9 (c).

As shown in these figures, the forming apparatus is made up of a first zone A where a sheet loading device, a sheet lifting device and a sheet clamping/conveying (sheet handling) device are provided, a second zone B where a heating device is awaited, a third zone C which is the heating/forming zone, and a fourth zone D which is a product extracting zone.

As shown in FIGS. 10 (a) to 10 (f), the sheet loading device has a function of charging sheets 19 to be formed into the forming apparatus. The required number of sheets 19 are placed on a sheet loading car 17. On the car 17, the sheets 19 are positioned by a sheet positioning guide 18. The sheet loading car 17 with handles 20 attached thereto slides on frames 16 through slide rails 23. On each frame 16, the advancing and retracting ends of the sheet loading car 17 are respectively determined by an advancing end stopper 22 and a retracting end stopper 21. At each end position, backlash of the sheet loading car 17 in the longitudinal direction is prevented by a spring plunger 24 which serves as a locking mechanism. Shock generated when the sheet loading car 17 is positioned is absorbed by shock absorbing cushion rubbers 25 mounted on the advancing and retracting ends.

As shown in FIGS. 11 (a) to 11 (b), the sheet lifting device supplies the sheets 19 set on the sheet loading device to the conveying device one by one. More specifically, the sheet 19 is sucked by a vacuum pad 26 and then lifted from a sheet sucking position $L_1$ to a sheet conveying level $L_2$ by a sheet lifting cylinder 29. The vacuum pad 26 is fixed to brackets 28 through a vacuum pad mounting plate 27. The brackets 28 are fixed to an optimum position of a slide plate 31 which is determined by the size of the sheet. The slide plate 31 is connected to the sheet lifting cylinder 29 through a joint and is moved up and down while being guided by a lift guide 30.

Figure 8:
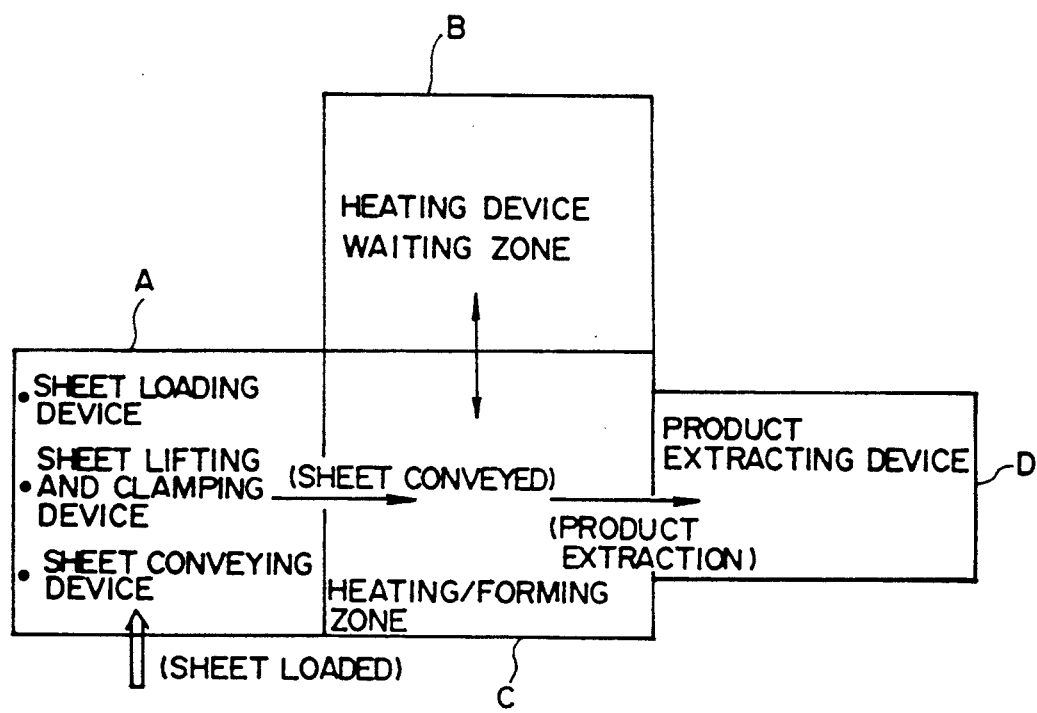
FIG. 8 shows the basic arrangement of the manufacturing apparatus according to the present invention.
Figure 9C:
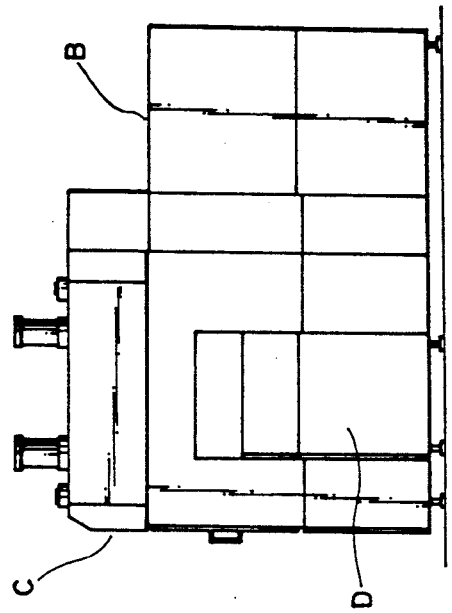
FIG. 9 (a) is a plan view of the manufacturing apparatus according to the present invention.
Figure 9A:
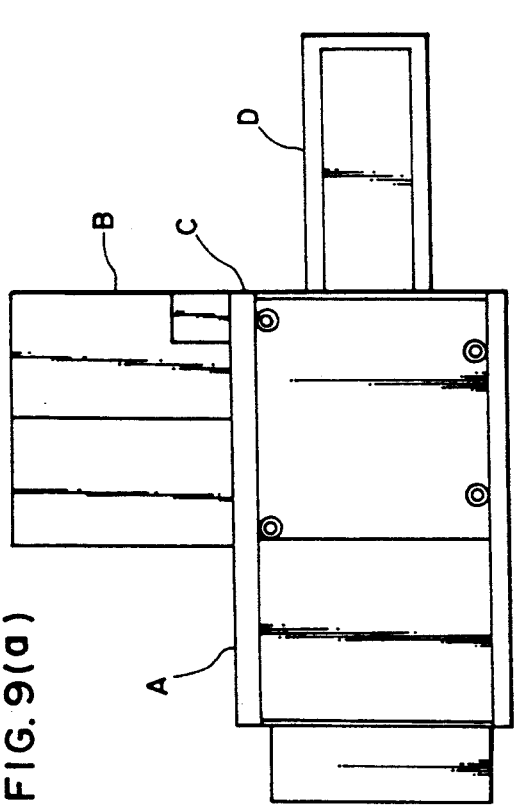
Figure 9B:
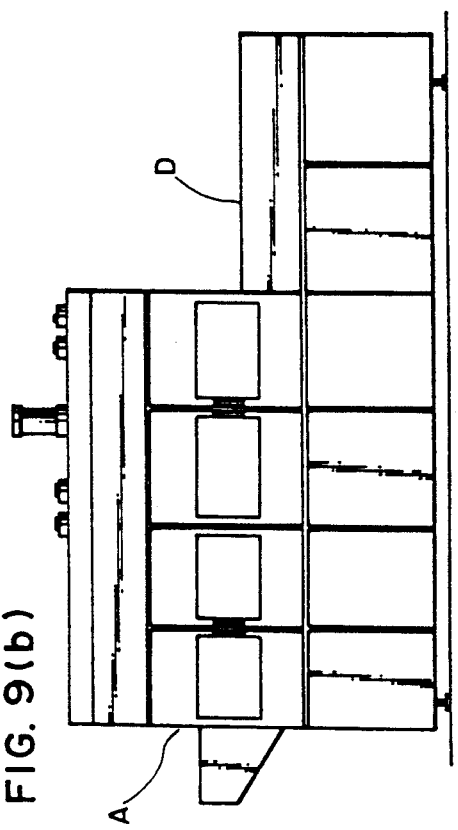
Figure 10A:
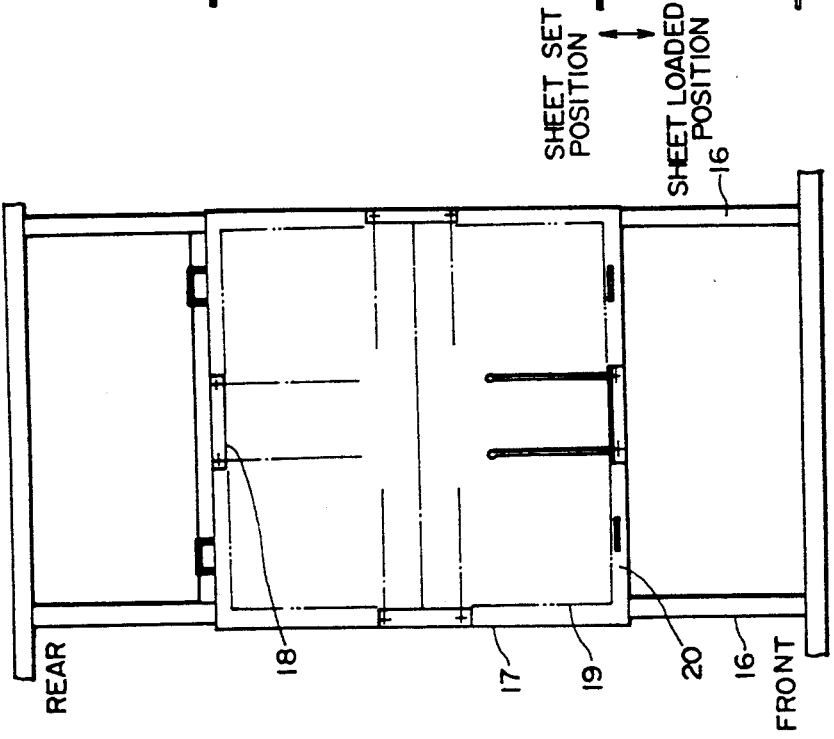
FIG. 10 (a) is a plan view of a sheet loading device of the manufacturing apparatus according to the present invention.
Figure 10C:
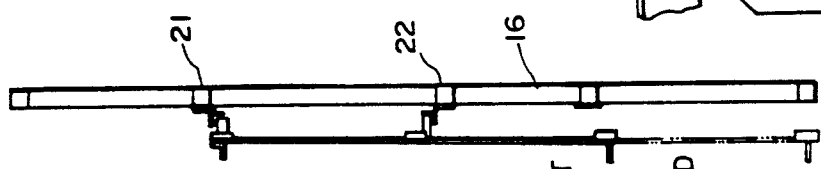
Figure 10D:
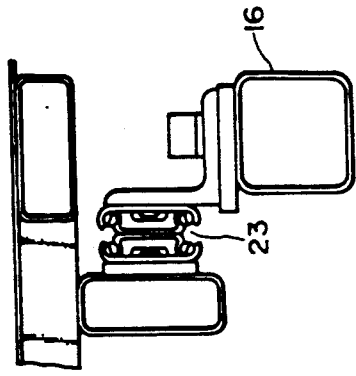
Figure 10F:
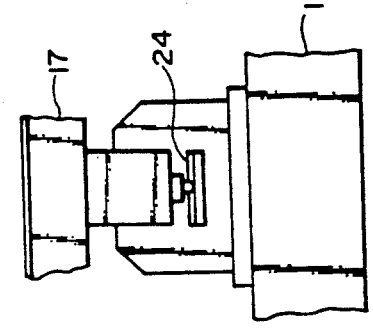
Figure 10E:
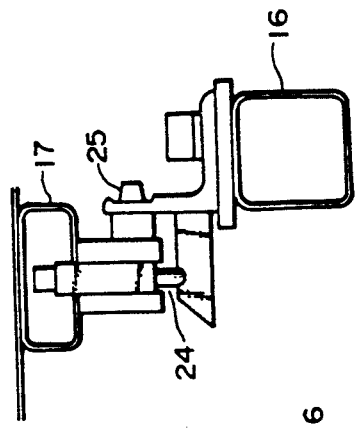
Figure 10B:

As shown in FIGS. 12 (a) to 12 (f), the sheet clamping/conveying device is located above the sheet loading device for clamping the sheet 19 lifted by the sheet lifting device and for conveying the clamped sheet 19 to the heating/forming zone C (see FIGS. 8 and 9). The sheet clamping/conveying device contains a mechanism for adjusting the clamping width and position according to the sheet size.

The clamping mechanism is provided within a three-stage expansion rail consisting of a first stage rail 32, a second stage rail 33 and a third stage rail 34. The rails which are constructed at a waiting position are coupled with each other through a sheet conveying cylinder 51 and a bracket 52 to convey the sheet 19 to the heating-/forming zone. The clamping mechanism (see FIG. (f)) clamps the sheet 19 by a sheet clamping arm 65 and a clamping rod 64 which are provided at each side, as viewed in the direction of conveyance. The clamping rod 64 is mounted on a clamping boss 66 through a compression coil spring 63, and is turned by a clamping rod rotating rotary actuator 49. The clamping boss 66 is slidable along a spline shaft 50 which is rotated by the clamping rod. This allows the clamping mechanism to be fixed at any clamping position. The sheet clamping arm 65 is fixed on the rail. The position of the sheet clamping arm 65 relative to the clamping rod 64 can be adjusted. The three-stage expansion rail, consisting of the first stage rail 32, the second stage rail 33, the third stage rail 34 and a rail 59, is guided by eccentric cam followers 62 and roller followers 61. Hang of the rail in the central direction is prevented by joints 48 and 60. Stoppers 35, 36, 37, and 38 and stopper plates 39 and 40 are fixed to the first stage rail 32, the second stage rail 33 and the third stage rail 34 to position the rail in the direction in which the sheet is conveyed. The first stage rail 32 slides along a shaft 57 through a linear bushing 56. The shaft 57 is fixed to the apparatus body through a shaft support 55. The width of the first stage rails 32 can be adjusted by a width adjusting shaft (right handed screw) 46 and a width adjusting shaft (left handed screw) 47 through a coupling rod 54, a gear box 43, a coupling rod 44 and then a coupling 45. The coupling rod 54 is manually rotated by a handle wheel 41 which can be locked and unlocked by a tension lever 42 and is fixed by pillow blocks 53 and 58. The first stage rail 32 is synchronized by the coupling rod 44. These driving shafts are manually rotated by the handle wheel 41 and are fixed by the tension lever 42.

Figure 13D:
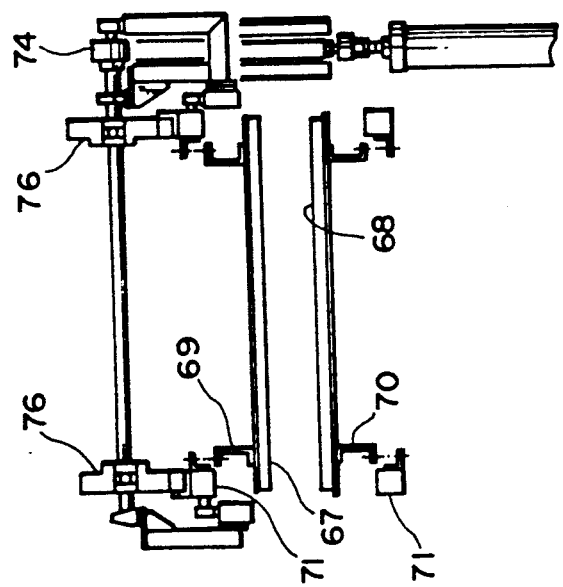
FIG. 13 (a) is a plan view of a heating device of the manufacturing apparatus according to the present invention.
Figure 13E:
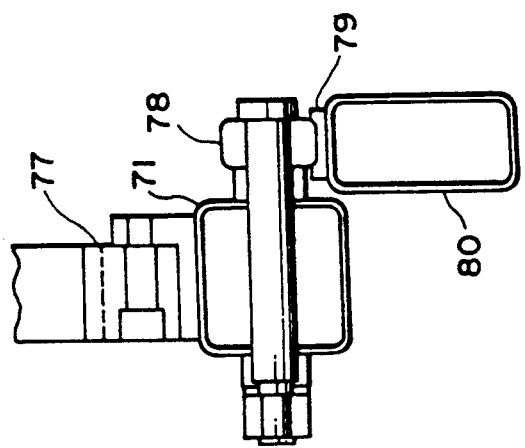
Figure 13F:
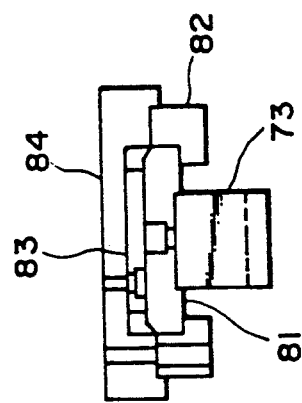
Figure 18A:
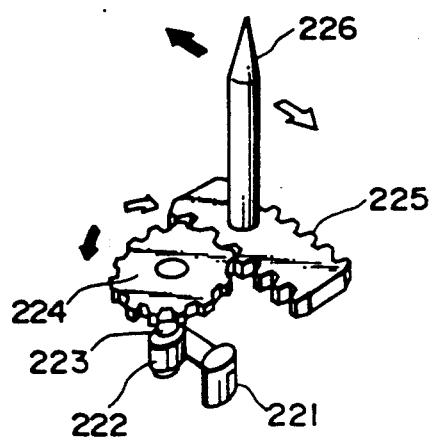
FIG. 18 (a) is a perspective view of a spiral spring type mechanism for generating a retaining force of a fiber placing pin and for returning the fiber placing pin for continuous forming in the manufacturing apparatus according to the present invention.
Figure 18B:
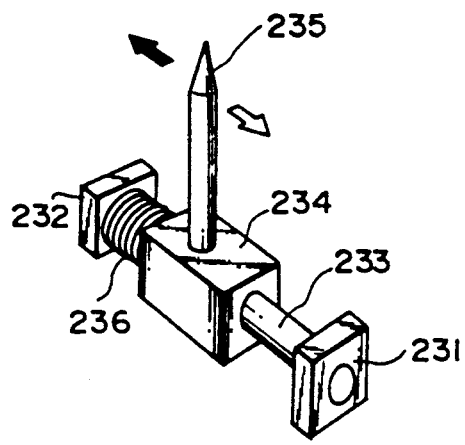
Figure 18C:
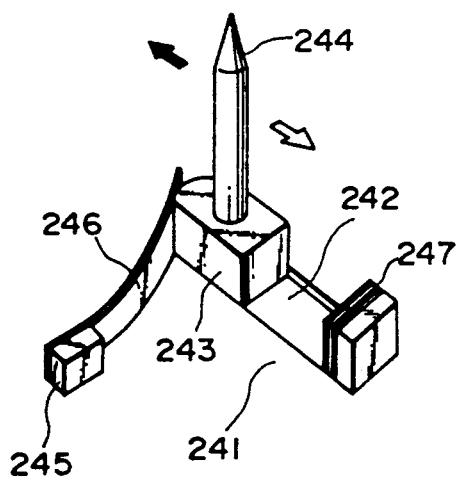
Figure 18D:
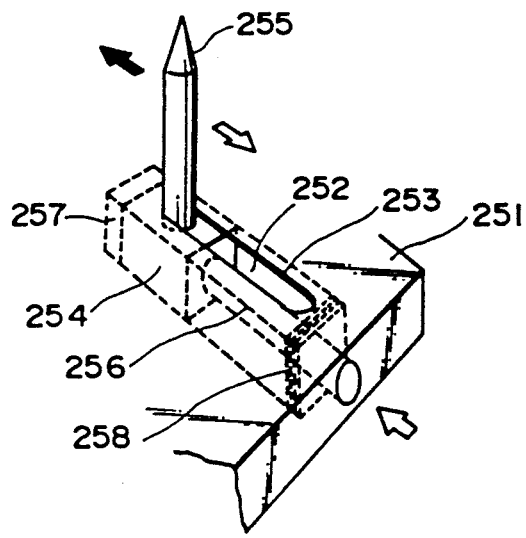

As shown in FIGS. 13 (a) to 13 (f), an upper heater 67 and a lower heater 68 are fixed to a heater frame 71 through an upper heater mounting frame 69 and a lower heater mounting frame 70. The heater frame 71 has wheels 78 which can move along the surface of a rail 79 on a rail frame 80. The heater frame 71 also has a second driving rack 77 so that the upper and lower heaters 67 and 68 can be moved through a first driving pinion 74, a driving pinion shaft 75 and second driving pinions 76 by operating a driving cylinder 72. First and second shock absorbers 85 and 86 are provided at the operating ends of the heater frame 71 so as to absorb shocks when the frame 71 is operated at a high speed. A first driving rack 73 slides along a rack support 84 through a rack mounting plate 81 and a slide liner 83 while being guided by a plate guide 82.

As shown in FIGS. 14 (a) to 15 (b), an upper plate 91 and a lower plate 92 installed on a floor through a base mount 103 are coupled with each other by four tie bars 93 and tie bar nuts 94. An upper slide and a lower slide 96 are respectively moved up and down along the individual tie bars 93 by upper slide cylinders 97 and lower slide cylinders 99 through upper slide cylinder joints 98 and lower slide cylinder joints 100. A mold base 102 is moved up and down by a main cylinder 101 independently of the lower slide 96. The position at which the upper slide 95 is lowered is determined by four stopper rods 108. Shock when the upper slide 95 is lowered is absorbed by a rubber stopper bushing 110 fixed by a bushing presser 109. The position to which the upper slide 95 is lowered is finely adjusted by the rotation of a nut 111. A slide locking mechanism is provided on the upper slide 95. The slide locking mechanism transmits the load reaction from the lower slide 96 and the mold base 102 not to the upper slide cylinder 97 but directly to the upper slide 95, and thereby alleviates the load applied to the upper slide cylinder 97. The locking bar 118 coupled to a bar plate 120 guided by a plate presser 119 is moved back and forth by an upper slide locking cylinder 107 fixed by a trunnion support 113 through a first slide bar 116 guided by a first bar guide 114, a second slide bar 117 guided by second bar guides 115, a main bar 112 and a bar joint 123. The upper slide 95 incorporates a part ejecting mechanism. An ejector plate 106 is moved up and down by an ejector cylinder 104 through an ejector cylinder joint 105 so as to operate the parts piercing pins mounted in the mold.

As shown in FIGS. 16 (a) to 16 (c), the parts removed from the mold by the aforementioned device is conveyed out of the heating/forming zone C (see FIGS. 8 and 9). More specifically, a receiving plate 131 mounted on a slide frame 132 is operated through a predetermined stroke by a rodless cylinder 134 through slide guides 133 to convey the part from the heating/forming zone.

The operation of the manufacturing apparatus for the sheets of a thermoplastic resin high-performance fiber reinforced composite material will be described in detail below.

(1) In the sheet loading device, the front cover of the sheet loading device is opened and the sheet loading car 17 is drawn to this side. After a required number of sheets 19 are loaded on the guide position, the sheet loading device 17 is pushed into its original position.

(2) In the sheet lifting device, the sheets set on the sheet loading device are lifted to the conveying level $L_2$ one by one. p0 (3) In the sheet handling device, the sheet 19 lifted by the sheet lifting device is clamped (after clamping, the sucking mechanism of the sheet lifting device is turned off) and then conveyed to the heating/forming zone C. The clamping position can be adjusted according to the size of the sheet 19 and the positional relation between the sheet 19 and the mold. The clamping operation contains swing motion so that the clamping mechanism does not interfere with the sheet 19 when the sheet is lifted.

(4) In the heating device, the upper and lower heaters 67 and 68 are provided within the heater frame 71. The positional relation between the sheet 19 and the upper and lower heaters 67 and 68 can be adjusted by bolts. The heater frame 71 is driven through the rack-/pinion/rack mechanism by the operation of the cylinder. The shock absorbing mechanisms are provided at the ends of the stroke.

(5) In the forming device, the typical flow of the operation will be described below with reference to FIG. 17.

As shown in FIG. 17, the upper slide 8 is moved up and down by the cylinder 3. During forming, the locking mechanism is operated so as to allow the reaction of the lower slide cylinder 8 and the main cylinder 9 to be supported by the upper frame 1 through the locking bar 118, the locking rod 121 and the locking guide 122. Concurrently with the termination of the heating and retraction of the heaters, the upper and lower slides 2 and 5 are moved up and down, and the sheet 19 is thereby clamped by the upper and lower frames 1 and 4 respectively mounted on the upper and lower slides 2 and 5. At that time, the locking mechanism is operated. Thereafter, the mold base 7 on which the mold is mounted is moved up to form the sheet. After the product is cooled, the mold 6 is lowered, and then the upper and lower slides 2 and 5 are opened.

(6) In the extracting device, after the conveying device for conveying the sheet 19 to the heating/forming zone and for clamping the sheet 19 immediately before the sheet is formed is retracted, the product extracting device advances and conveys the product removed from the mold by the product ejector incorporated in the upper slide 2 out of the heating/forming zone.

The aforementioned steps are repeated to continuously produce the products.

In the present invention, the apparatus for forming the thermoplastic ACM sheets (sheets of a high-performance fiber reinforced composite material which employs as a matrix a thermoplastic resin matrix and in which the reinforcing fiber is oriented) have been described. However, this apparatus may also be used to form the conventional FRTP sheet (stampable sheet). Compared with the conventional apparatus, in this apparatus, the time from the ending of the heating to the forming is short, and drop of the sheet temperature is less. Consequently, energy conservation during sheet heating is possible, and temperature condition can be stabilized during forming. As a result, the quality of the products is stabilized and reliability is improved.

A fiber placement control method will be described below.

As shown in FIG. 18 (a), in the spiral spring type mechanism for generating the placing force of a fiber placing pin and for returning the fiber placing pin for continuous forming, the distal end of a leaf spring 222 fixed to a fixing member 221 is wound around a rotary shaft 223 of a gear 224. The gear 224 is in mesh with a rack 225 from which a fiber placing pin 226 protrudes.

As shown in FIG. 18 (b), in the coil spring type mechanism for generating the placing force of a fiber placing pin and for returning the fiber placing pin for continuous forming, a guide shaft 233 extends between fixing members 231 and 232 disposed in opposed relation and a movable plate 234 from which a fiber placing pin 235 protrudes is mounted on the guide shaft 233. A coil spring 236 is provided between the fixing member 232 and the movable plate 234.

As shown in FIG. 18 (c), in the plate spring type mechanism for generating the placing force of a fiber placing pin and for returning the fiber placing pin for continuous forming, a movable plate 243 from which a fiber placing pin 244 protrudes is provided in a guide groove 242 formed in a base 241. A free end of a leaf spring 246 is in contact with one end of the movable plate 243, and a magnet 247 is disposed on the other end of the guide groove 242.

As shown in FIG. 18 (d), in the pneumatic mechanism for generating the placing force of a fiber placing pin and for returning the fiber placing pin for continuous forming, a slide chamber 252 is formed in a base 251, and a movable plate 254 from which a fiber placing pin 255 protrudes is mounted within the chamber 252. A guide groove 253 for guiding the fiber placing pin 255 is formed in the upper portion of the slide chamber 252. An air pipe 256 passes through the movable plate 254, and an air reservoir 257 is formed at the rear end of the chamber 252. Reference numeral 258 denotes a magnet.

As shown in FIG. 6 (d), when the cylinders 3 and 8 are driven and the sheet 11 is thereby clamped by the upper and lower frames 1 and 4, the fiber placing pin protrudes from the surface of the frames for clamping the sheet 11 and pierces into the sheet of the thermoplastic resin high-performance fiber reinforced composite material. In that state, the mold 6 is moved up at an optimum speed for deep drawing, as shown in FIG. 6 (e). At that time, the sheet starts flowing in the direction indicated by black arrows in FIGS. 18 (a) to 18 (d) but a fiber placing force is generated by the mechanism shown in either of FIGS. 18 (a) to 18 (d) in the direction indicated by white arrows.

From the surface of the frame for clamping the sheet during forming, only the distal end of the fiber placing pin protrudes, and the aforementioned placing force generating portion is incorporated in the frame or mounting plate on which the frame is mounted. The fiber placing pin is provided on both or either of the upper and lower frames.

The fiber placing force can be remote controlled during forming by using a small size servo motor.

The fiber placing position can be remote controlled during forming by using a two-shaft servo motor.

Figure 19A:
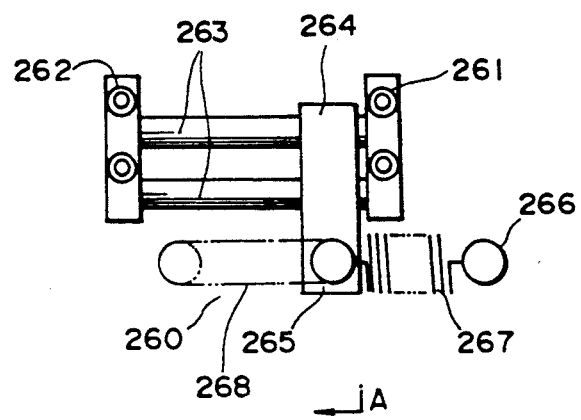
FIG. 19 (a) is a plan view of a first example of a mechanism for generating a retaining force of a fiber placing pin and for returning the fiber placing pin for continuous forming.
Figure 19B:
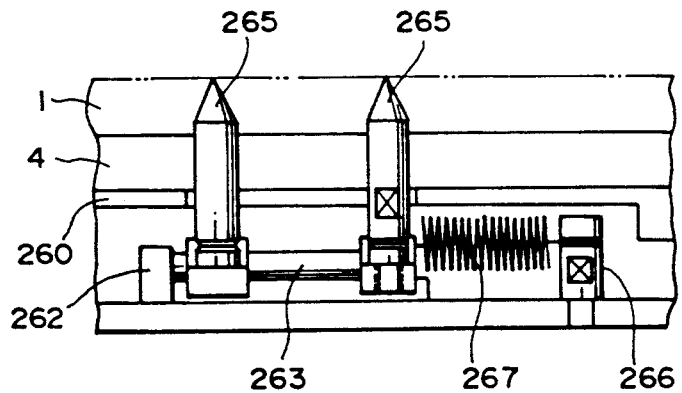
Figure 19C:
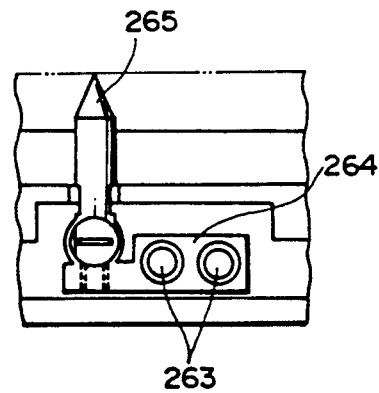

As shown in FIGS. 19 (a) and 19 (b), a fiber placing pin 265 mounted on the movable plate 264 is pulled through a guide shaft 263 by a coil spring 267 whose one end is fixed to fixing members 261, 262 and 266 and whose the other end is mounted on the movable plate 264.

When the mold 6 is moved up at the optimum speed for deep drawing, as shown in FIG. 6 (e), the sheet gripped between the upper and lower frames 1 and 4 which serve as the wrinkle preventing plates initiates flowing. That is, the fiber placing pin 265 shown in FIGS. 19 (a) and 19 (b) starts moving to the left along a guide groove 268 formed in a base 260. However, tension of the coil spring 267 acts and the sheet is thereby retained.

In FIGS. 20 (a) and 20 (b), reference numeral 270 denotes an upright frame plate; 271, a base plate; 272, a slide guide portion; 273, a guide groove; 274, a movable plate; 275, a fiber placing pin; 276, a wire attached at one end to the movable plate 274; 279, a spring fixing plate for fixing the other end of the coil spring 278; 280, a bolt for fixing the spring fixing plate 279; and 281, an L-shaped fixing member into which the bolt 280 is screwed and which is fixed to the upright frame plate 270 by a bolt 282.

The coil spring 278 having one end fixed to wire 276 is used to generate the positioning force of the fiber placing pin 275. That is, the coil spring 278 is utilized as the reaction source, and the movable plate 274 on which the fiber placing pin 275 is mounted is retained from the outside of the frame 4 through the wire 276. Movement of the movable plate 274 is guided by the slide guide portion 272 provided in the base plate 271. The stroke of the fiber placing pin 275 is determined by mechanically positioning the operating end of the movable plate 274.

With the aforementioned structure, reaction is generated in the fiber placing pin in the direction indicated by the white arrows (see FIG. 18) pneumatically or using the force of a spiral spring, coil spring or plate spring so as to retain the pin inserting portion of the sheet during forming and thereby control the fiber orientation. Furthermore, since the fiber placing pin is automatically returned to its original position when the part is extracted, continuous forming is possible. The fiber placing force can be remote controlled during forming by using a small size servo motor. Furthermore, the fiber retaining position can be remote controlled during forming by using a two-shaft servo motor.

Figure 21A:
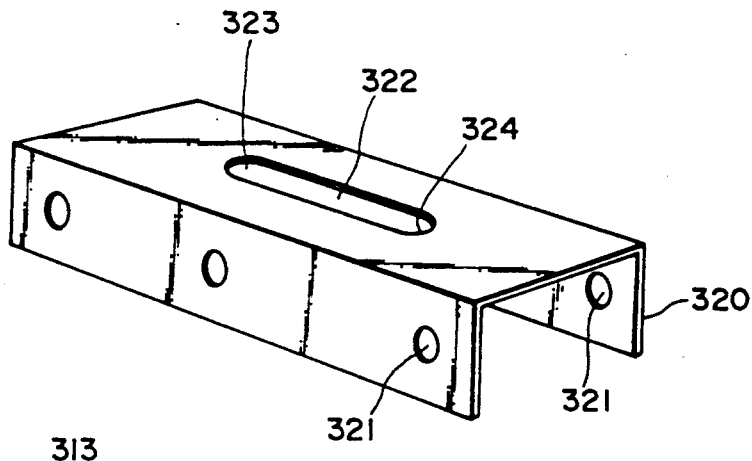
FIG. 21 (a) is a perspective view of a second cover of a third example of a mechanism for generating a retaining force of a fiber placing pin and for returning the fiber placing pin for continuous forming.
Figure 21B:
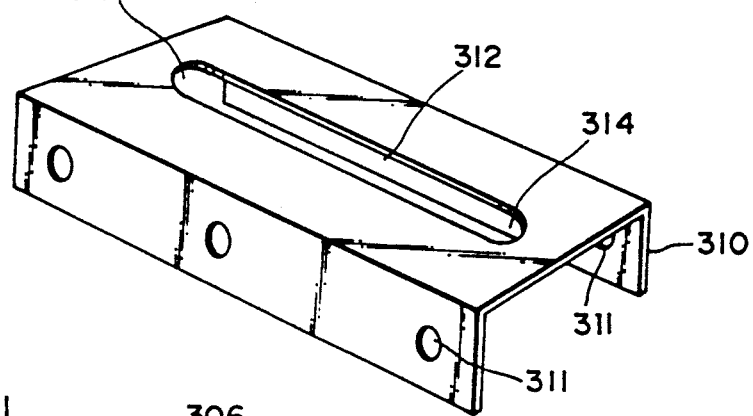
Figure 21C:
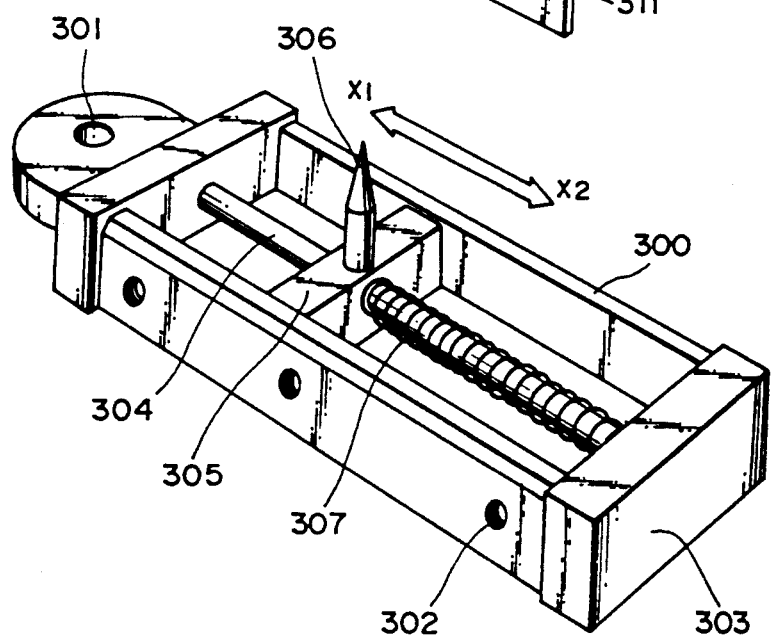

In FIGS. 21 (a) to 21 (c), reference numeral 300 denotes a body (guide); 301, a fixing end; 302, screw holes formed in the two side surfaces of the body 300; 303, end portions of the body; 304, a guide shaft extending between the end portions 303; a movable plate 305 mounted on the guide shaft 304; 306, a fiber placing pin protruding from the movable plate 305; 307, a compression coil spring mounted between the movable plate 205 and the end portion 303 for moving the fiber placing pin 306; 310, a first cover; 311, holes formed in the two side surfaces of the cover 310 and aligned to the screw holes 302 in the body 300 so as to fix the first cover 310 to the body 300 by screws (not shown); 312, a guide groove formed in the upper surface of the first cover 310 for guiding the fiber placing pin 306; 313, position $x_1$; and 314, position $x_2$.

Reference numeral 320 denotes a second cover; 321, holes formed in the two side surfaces of the cover 320 and aligned to the holes 302 in the body 300 so as to fix the second cover 320 to the body 300 by screws (not shown); 322, a guide groove formed in the upper surface of the second cover 310 for guiding the fiber placing pin 306; 323, position $x_1$; and 324, position $x_2$.

As shown in FIGS. 21 (a) to 21 (c), the fiber placing pin 306 slides along the guide shaft 304, and is pressed toward the $x_1$ position 313 or 323 by the compression coil spring 307. The fiber placing pin 306 is movable between the $x_1$ position 313 or 323 and $x_2$ position 314 or 324. The moving distance of the fiber placing pin 306 can be adjusted by the position or length of the guide groove 312 or 322 formed in the cover.

Figure 24A:
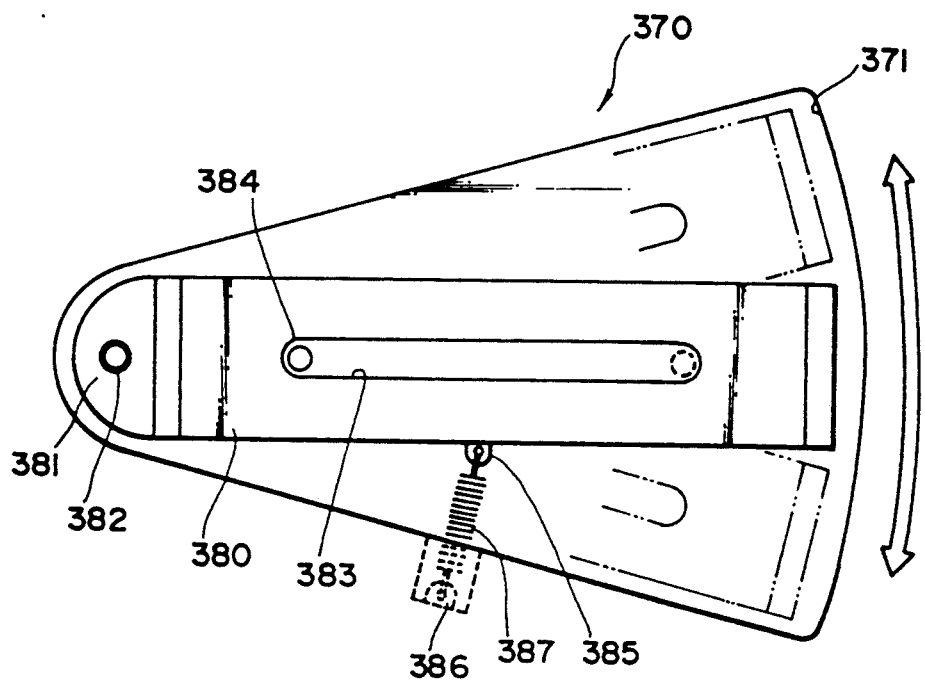
FIG. 24 (a) is a plan view of a sixth example of a mechanism for generating a retaining force of a fiber placing pin and for returning the fiber placing pin for continuous forming.
Figure 24B:
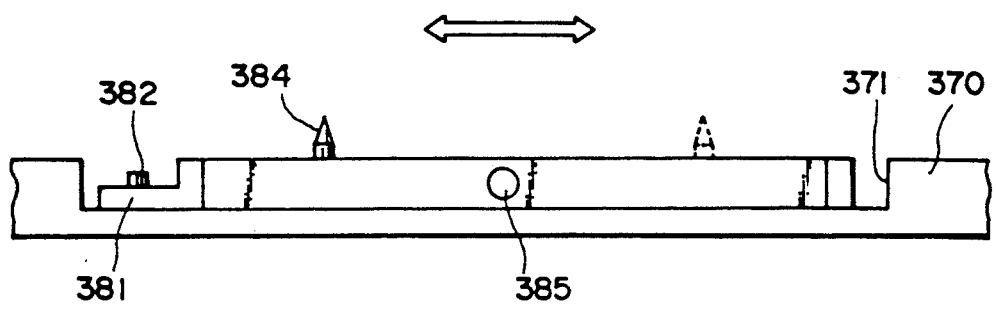

The mechanism shown in FIG. 21 is mounted on the mold by fixing the fixing end 301 of the body 300 to the mold by means of a bolt (see FIG. 24). In this way, the degree of freedom of rotation on the plane can be increased. If frame grooves having a complicated form are formed as the pin guides in place of the covers 310 and 320, free movement of the mechanism may be made possible.

Figure 22A:
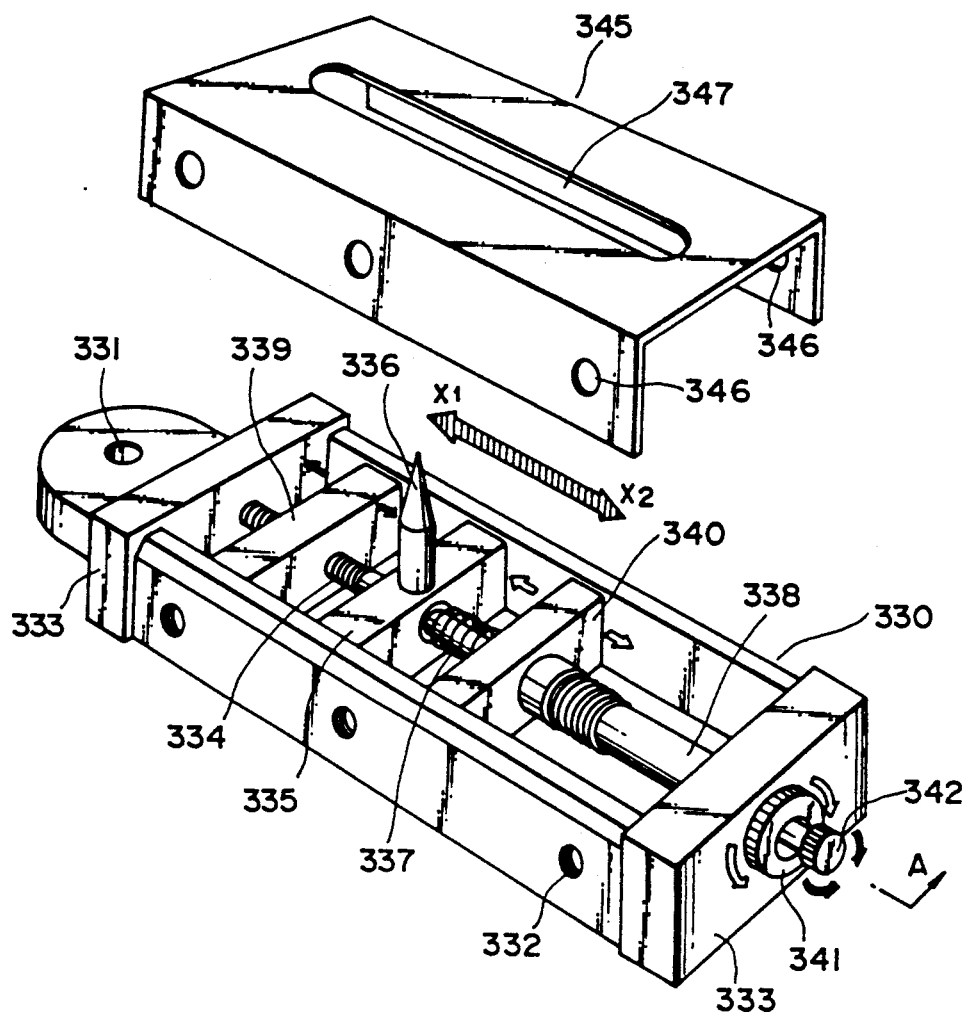
FIG. 22 (a) is an exploded perspective view of a fourth example of a mechanism for generating a retaining force of a fiber placing pin and for returning the fiber placing pin for continuous forming.
Figure 22B:
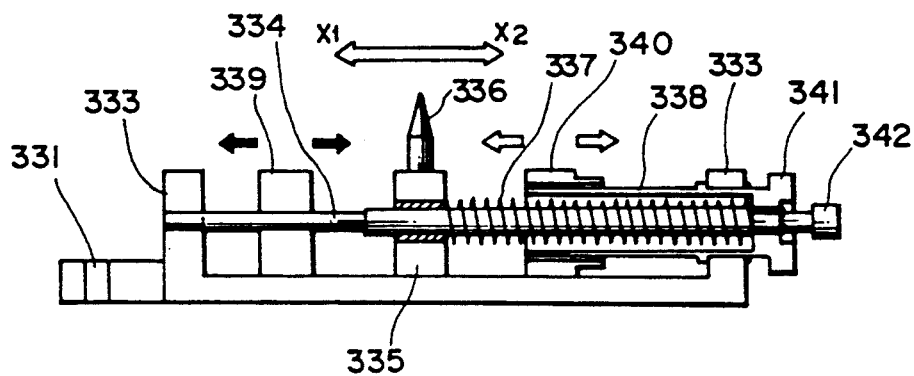

In FIGS. 22 (a) and 22 (b), reference numeral 330 denotes a body (guide); 331, a fixing end of the body 330; 332, screw holes formed in the two side surfaces of the body 330; 333, end surfaces; 334, an inner shaft; 335, a movable plate; 336, a fiber placing pin protruding from the movable plate 335; 337, a compression coil spring for moving the pin 336; 338, an outer cylinder; 339, $x_1$ position; 340, $x_2$ position; 341, a $x_2$ position adjusting knob; 342, a $x_1$ position adjusting knob; 345, a cover; 346, a hole formed in the two side surfaces of the cover 345 and aligned to the screw holes 332 so as to fix the cover 345 to the body 330 by means of screws (not shown); and 347, a guide groove for guiding the fiber placing pin 336.

As shown in FIG. 22, the position of the fiber placing pin 336 can be freely adjusted by operating the $x_1$ position adjusting knob 342 and/or the $x_2$ position adjusting knob 341. The $x_1$ position adjusting knob 342 and the $x_2$ position adjusting knob 341 are provided coaxially. The other structure is the same as that shown in FIG. 21.

Figure 23A:
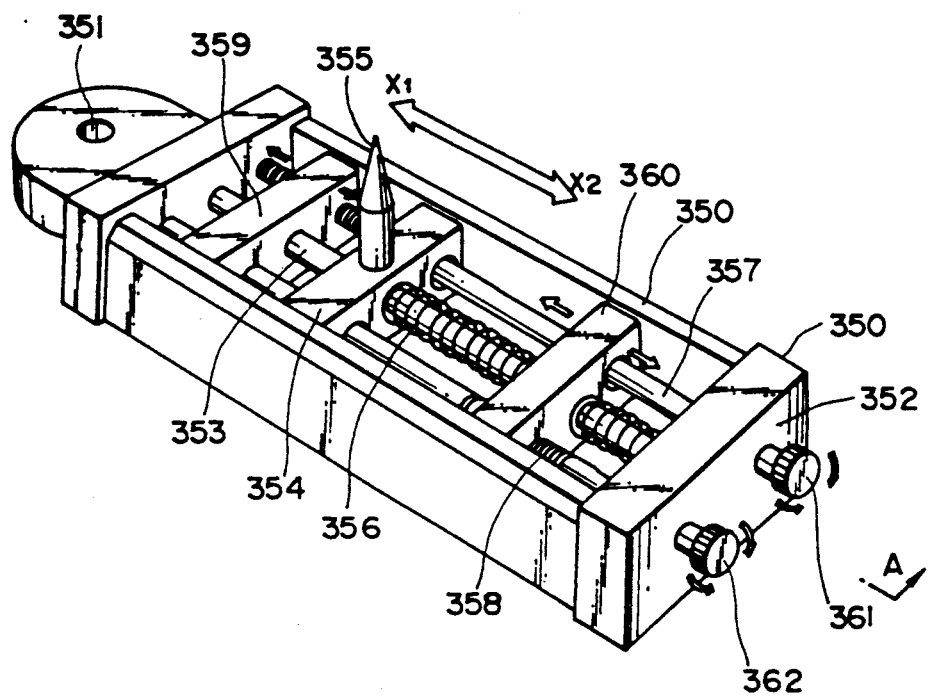
FIG. 23 (a) is a perspective view of a fifth example of a mechanism for generating a retaining force of a fiber placing pin and for returning the fiber placing pin for continuous forming.
Figure 23B:
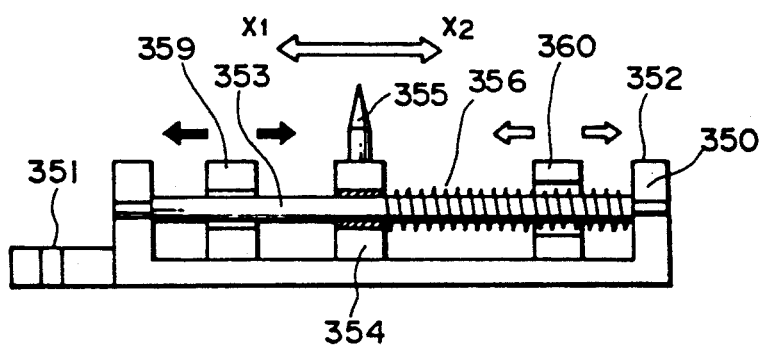

In FIGS. 23 (a) and 23 (b), reference numeral 350 denotes a body (guide); 351, a fixing end of the body 350; 352, an end surface; 353, a guide shaft; 354, a movable plate; 355, a fiber placing pin; 356, a compression coil spring for moving the pin; 357, a $x_1$ position adjusting screw shaft; 358, a $x_2$ position adjusting screw shaft; 359, a $x_1$ position; 360, a $x_2$ position; 361, a $x_1$ position adjusting knob; and 362, a $x_2$ position adjusting knob.

As shown in FIG. 23, the position and moving distance of the fiber placing pin 355 are adjusted by turning the $x_1$ position adjusting screw shaft 357 and the $x_2$ position adjusting screw shaft 358 by means of the $x_1$ position adjusting knob 361 and the $x_2$ position adjusting knob 362. Other structure is the same as that shown in FIG. 22. Illustration of a cover is omitted.

In FIGS. 24 (a) to 24 (c), reference numeral 370 denotes a frame; 371, a fan-shaped recess formed in the frame 370; 390, a body (guide); 381, a fixing end of the body 390; 382, a fixing shaft; 383, a guide groove formed in the upper surface of the body 380; 384, a fiber placing pin; 385, a spring mounting portion provided on the side surface of the body 380; 386, a spring fixing portion provided on the frame 370; and 387, a spring extending between the spring mounting portion 385 of the body 380 and the spring fixing portion 386.

As shown in FIG. 24, the body 380 having the fiber placing pin 384 is set within the fan-shaped recess formed in the frame 370. The body 380 can be rotated about the fixing shaft 382.

With the aforementioned structure, the fiber placing pin performs linear motion against the reaction of the coil spring with the fixing end as the support and thereby pulls the fiber during forming while performing rotational motion about the fixing end.

That is, the fiber placing pin can perform not only the linear motion but also the rotational motion about the fixing end. Also, the stroke (movable range) of the fiber placing pin can be freely adjusted by replacing the cover or by means of the adjusting knob.

Figure 25:
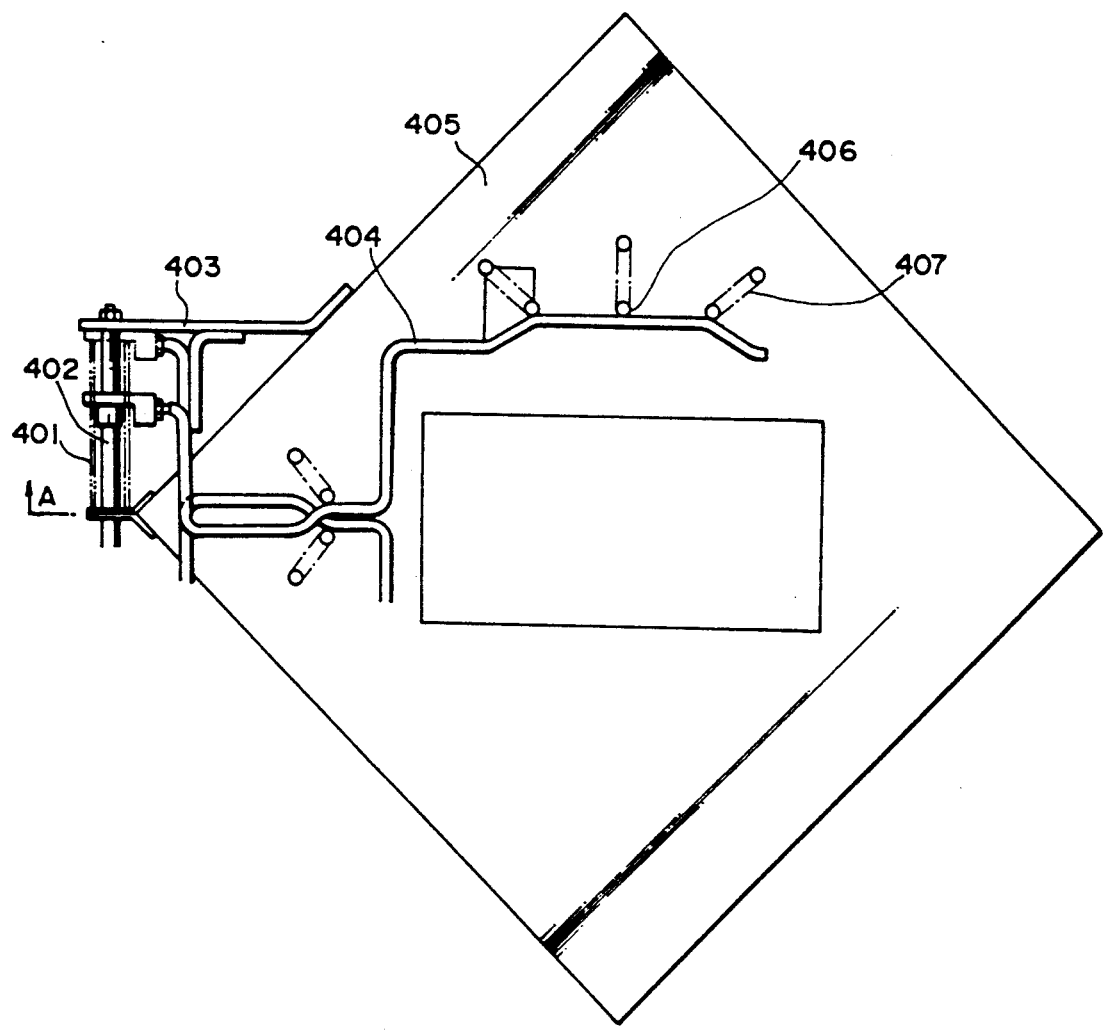
FIG. 25 shows a mechanism for retaining the fiber placing pins.

In FIGS. 25 and 26, reference numeral 401 denotes a spring; 402, a guide shaft; 403, a guide fixing plate; 404, a cam rod; 405, a frame (wrinkle preventing plate: upper plate); 406, fiber placing pins (wrinkle preventing pins); 407, guide grooves for the fiber placing pins 406; 408, a heater and cam rod mounting plate; and 409, movable plates.

As shown in FIGS. 25 and 26, the guide grooves 407 are formed in the surface of the frame 405 so that the fiber placing pins 406 can be moved therealong. After forming, the fiber placing pins 406 are returned to their original positions through the cam rod 404 by the urging force of the spring 401. The cam rod 404 slides along the guide shaft 402 and then abuts against the guide fixing plate 403. The individual fiber placing pins 406 and the cam rod 404 are incorporated in the frame 406, as shown in FIG. 26.

Thus, the use of the cam rod 404 allows the individual fiber placing pins 406 to be reliably returned to their original positions. Furthermore, since the spring 401 is mounted outside of the frame 405, manufacture of the frame 405 is facilitated, and the thickness of the frame 405 can be reduced. This allows for energy conservation for the frame preheating system. Since many fiber placing pins 406 can be controlled at the same time, each fiber placing pin needs not to be provided with the driving portion. This allows the space for the driving portion to be reduced.

Figure 27:
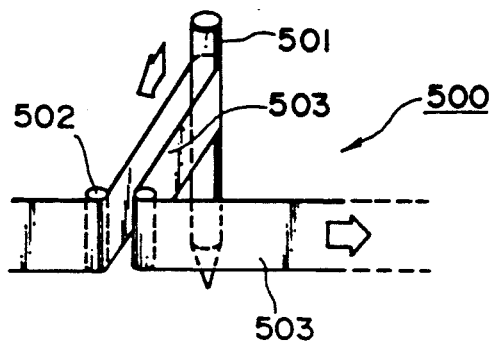
FIG. 27 is a perspective view of the essential parts of a seventh example of a mechanism for generating a retaining force of a fiber placing pin and for returning the fiber placing pin for continuous forming.
Figure 28:
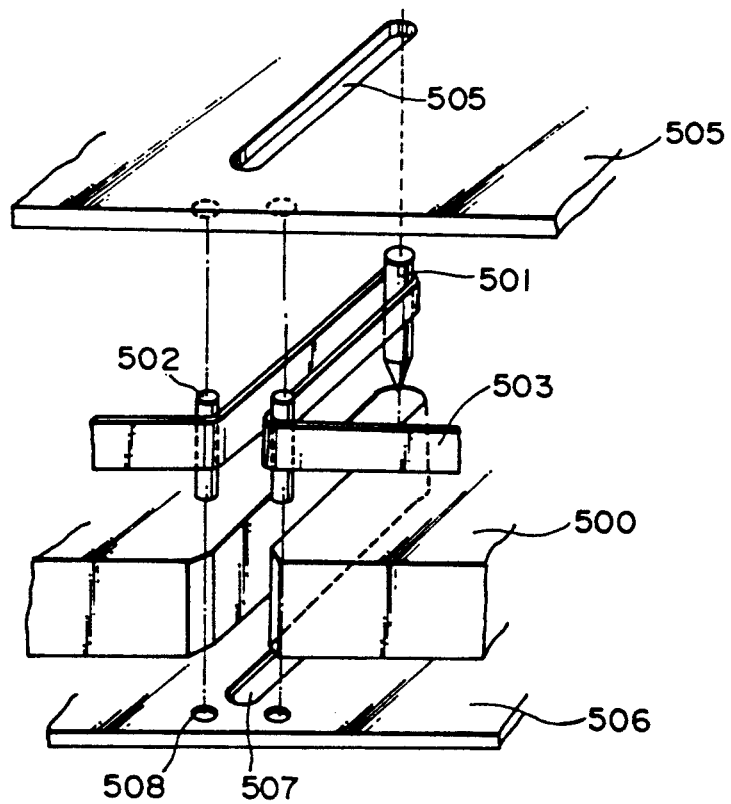
FIG. 28 is an exploded perspective view of the mechanism of FIG. 27.
Figure 29A:
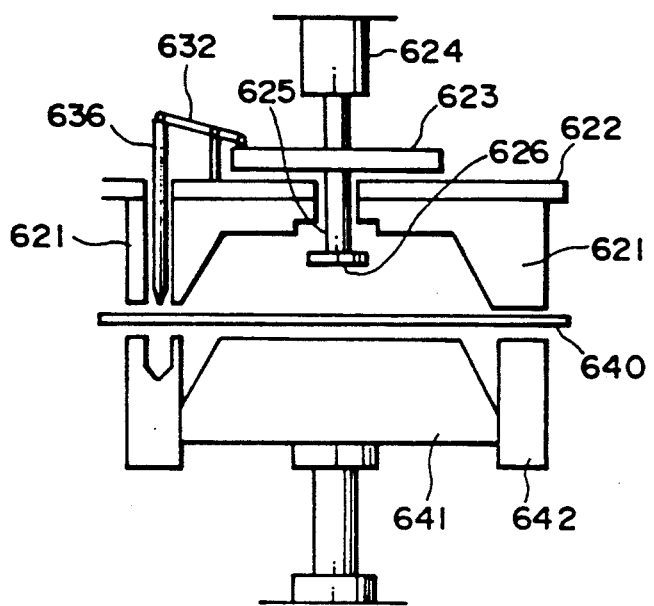
FIG. 29 (a) shows a first step of the reinforcing fiber flow control operation according to the present invention.
Figure 29B:
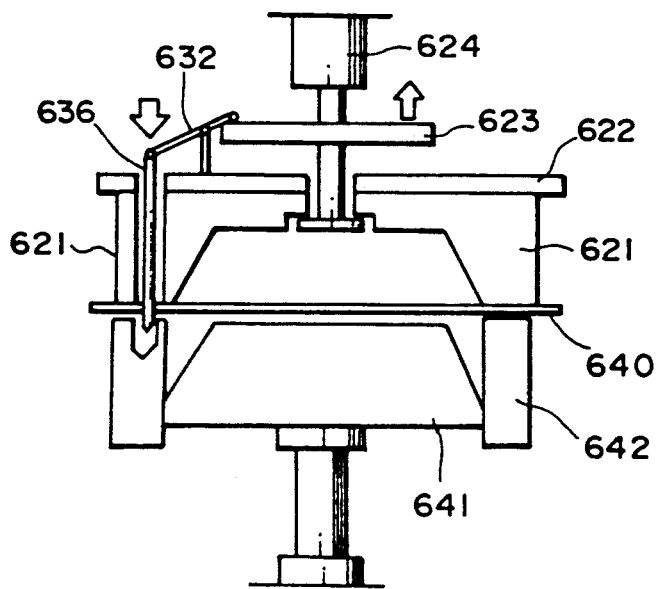
Figure 29C:
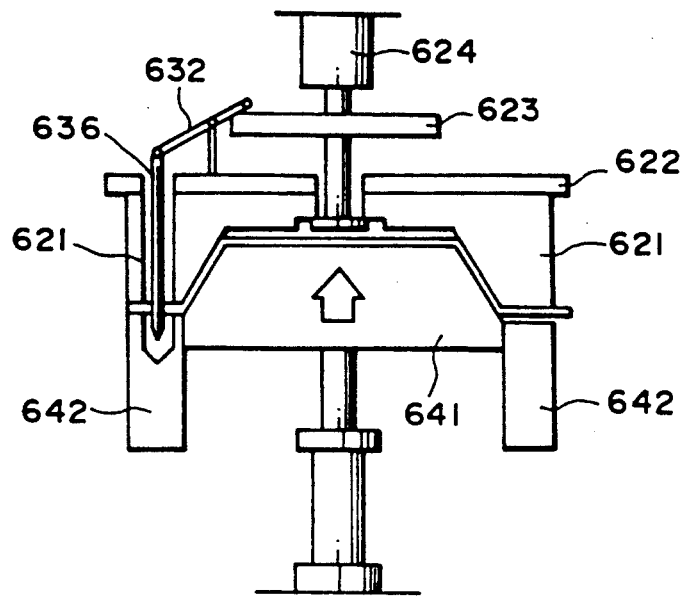
Figure 29D:
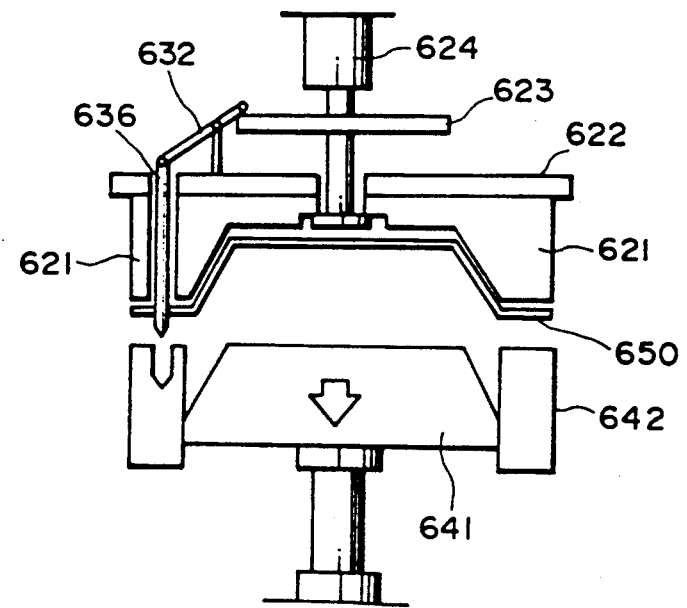
Figure 29E:
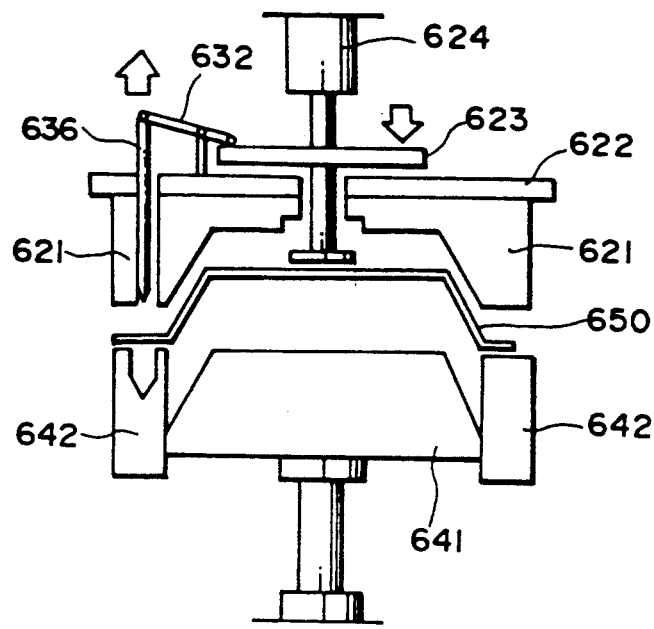
Figure 30:
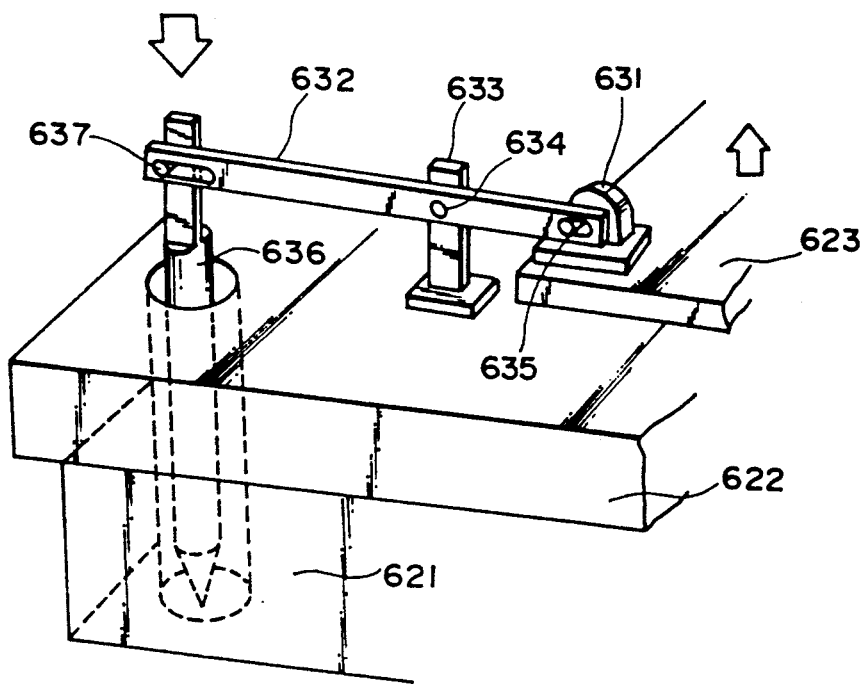
FIG. 30 is a perspective view of a mechanism for operating a pin protruding from the frame in the step of the reinforcing fiber flow control operation.

In FIGS. 27 and 28, reference numeral 500 denotes a mold; 501, a fiber placing pin; 502, a rotational roller; 503, a steel tape; 504, an upper pin guide plate; 505, a guide groove formed in the upper pin guide plate; 506, a lower pin guide plate; 507, a guide groove formed in the lower pin guide plate; and 508, supporting holes for the rotational rollers 502.

As shown in FIGS. 27 and 28, a fixed amount of load is applied to the steel tape 503 by an air cylinder or the like. The steel tape 503 is wound around a plurality of fiber placing pins 501 (here only one fiber placing pin is shown) using the rotational rollers 502 as the bending lines and is caused to slide in the central direction (the direction indicated by arrows in FIG. 27) of the rotational rollers 502 disposed in opposed relation to each fiber placing pin. The sliding force can be adjusted by changing the capacity of the air cylinder for applying tension to the end portion of the steel tape 503.

The mechanism arranged in the manner described above is incorporated in the mold, as shown in FIG. 28. More specifically, the fiber placing pin 501 slides along the guide grooves 505 and 507 in the upper and lower pin guide plates 504 and 506 mounted on the two surfaces of the mold (frame) 500. The rotational rollers 502 are supported in the support holes 508 formed in the guide plates and rotate due to the friction between the roller and the steel tape 503 to transmit the tape tension to the fiber placing pins 501 effectively.

The operation of this mechanism will be described below.

The surface of the frame corresponds to the lower pin guide plate 506.

Before forming, the fiber placing pin 501 is set to its outer position of the guide groove 507 having a predetermined length and formed at a predetermined position. During forming, the fiber placing pin moves as the fiber is deformed, and the retaining force corresponding to the capacity of the cylinder is thereby transmitted to the fiber through the steel tape 503 during sliding. After the pin reaches the end of its stroke, the fiber located close to the fiber placing pin 501 locally breaks and the retaining force is applied to the fiber in the direction of orientation thereof. After forming is completed and the part is cooled to a predetermined temperature, the part is removed, and this returns the fiber placing pin to its original position and is prepared for a subsequent process due to the reaction of the steel tape to which tension is applied by the cylinder.

With the aforementioned arrangement, reaction is applied to the fiber placing pin in the direction indicated by the arrows by the cylinder through the rotational rollers and steel tape to retain the portion of the sheet located close to the pin during forming. Consequently, control of the fiber orientation is made possible during forming. Furthermore, after forming is completed, removal of the part automatically returns the wrinkle preventing pin to its original position. This allows for continuous forming.

A sufficient amount of placing force required for control of fiber flow can be generated due to the cylinder drive. Furthermore, since tension is transmitted through the steel tape, the space required within the frame is small, and design of the frame is limited less.

In FIGS. 29 (a) to 29 (e) and 30, reference numeral 621 denotes an upper frame; 622, an upper slide; 623, an eject base plate; 624, an eject cylinder; 625, a rod; 626, an eject plate; 631, a bearing provided on the eject base plate 626; 632, a bar; 633, a support member for the bar 632; 634, a pin shaft for pivotaly supporting the bar 632; 635, a pin shaft pivotaly provided on the right end of the bar 632; 636, a fiber placing pin; and 637, a pin shaft for connecting the bar 632 to the pin 636.

In the above figures, the eject plate 626 for removing a part 650 from the upper frame 621 which constitutes the mold is provided in the upper frame 621. The eject plate 626 is driven to remove the part 650 by the reciprocative motion of the eject cylinder 624 through the eject base plate 623 and the rod 625. A required number of fiber placing pins 636 are provided in the upper frame 621. One end of each of the fiber placing pin 636 is coupled to the eject base plate 623 through the bar 632 supported by the support member 633 on the upper slide 622. Hence, the fiber placing pin moves in the direction reverse to the direction in which the eject base plate 623 is moved.

More specifically, when a sheet 640 is set, the eject cylinder 624 is at its lowest position, and the fiber placing pin 636 is thus located within the upper frame 621, as shown in FIG. 29 (a).

Next, after the sheet 640 is clamped by the upper and lower frames 621 and 642, the eject cylinder 624 rises, and the fiber placing pin 636 thereby passes through the sheet 640 and then the distal end of the pin enters the lower frame 642, as shown in FIG. 29 (b).

Thereafter, a mold 641 rises, and the sheet is thereby formed, as shown in FIG. 29 (c). During forming, the fiber is deformed, and the portion of the fiber located close to the fiber placing pin locally breaks. At the same time, the retaining force is applied to the sheet in the direction in which the fiber is oriented.

After forming is completed and the part is cooled for a predetermined period of time, the lower frame 642 falls, as shown in FIG. 29 (d). At that time, the fiber placing pin 636 remains piercing into the part 650.

Next, the eject cylinder 624 falls, and the part 650 is thereby removed from the frame, as shown in FIG. 29 (e). At that time, the fiber placing pin 636 rises and leaves the part 650.

The fiber placing pin may be provided within the lower frame in such a manner that it is mechanically synchronized with the operation of the mold.

Figure 31A:
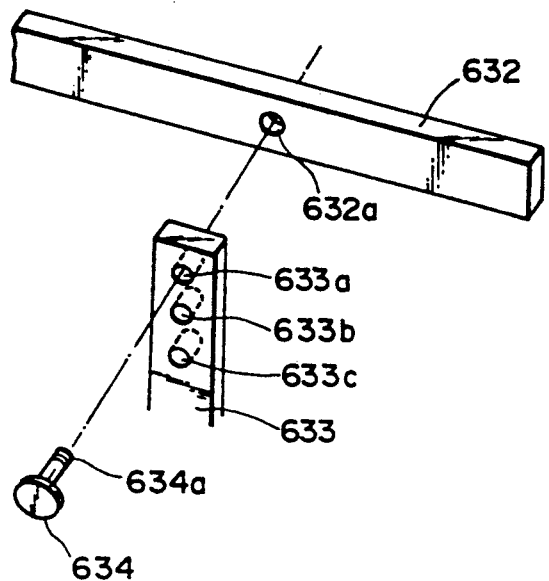
FIG. 31 (a) is an exploded perspective view of a portion for adjusting the fiber placing pin supporting position.
Figure 31B:
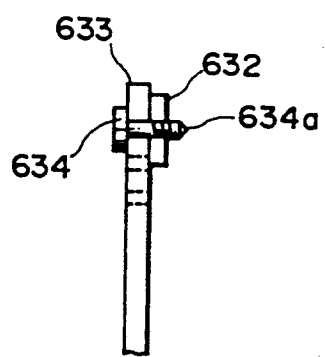

In FIGS. 31 (a) and 31 (b), a plurality of support holes 633a to 633c are formed in the support member 633 for supporting the pin shaft 634. The amount of protrusion of the fiber placing pin 636 can be adjusted by the selection of the support hole. For example, when the uppermost support hole 633a is selected and is aligned with a screwed hole 632a of the bar 632, the pin shaft 634 is inserted into the support hole 633a, and then an externally threaded portion 634a formed on the distal end of the pin shaft 634 is engaged with the screwed hole 632a of the bar 632. At that time, a small gap is provided between the bar 632 and the support member 633 so that the bar 632 can be supported by the pin shaft 634 in such a manner as to be rotatable about the support hole 633a of the support member 633.

The support position of the fiber placing pin may be adjusted using a servo cylinder.

Furthermore, the cross-sectional form of the fiber placing pin which pierces into the sheet can be freely selected by exchanging the fiber placing pin. Hence, the sheet is not excessively damaged, and the optimum cross-sectional diameter required for retaining the sheet an be selected.

The sheet clamping device used in the present invention will be described below.

The sheet clamping device according to the present invention has the tension applying function to perform clamping and pulling of the sheet at the same time. The sheet clamping device also has a fiber placement control mechanism. In other words, sheet clamping and sheet pulling are performed at the same time.

First, a sheet bending type sheet clamping device will be described.

In FIG. 32, reference numeral 721 denotes an oscillating type actuator; 722, a spline shaft rotated by the oscillating type actuator 721; 723, a rotary member spline coupled to the spline shaft 722; 723a, an oscillating plate fixed to the rotary member 723; 724; a lower clamping plate; and 724a, a pillar fixed to the lower clamping plate 724 and protruding from the lower clamping plate 724 downwardly. The distal end of the pillar 724a is loosely fitted into a hole formed in the oscillating plate 723a. A removal preventing head 724b is formed at the end of the distal end portion of the pillar 724a. A compression spring 725 is disposed between the upper surface of the oscillating plate 723a and the undersurface of the lower clamping plate 724. A slide preventing rubber plate 726 is provided on the upper surface of the lower clamping plate 724. A rail 727 is fixed, and an upper clamping plate 728 formed of a bar is fixed to this rail 727. The distal end of the upper clamping plate 728 is bent downward to form an L-shaped end portion 728a. A slide preventing rubber plate 729 is attached to the undersurface of the upper clamping plate 728. Reference numeral 730 denotes a sheet. Fiber placing pins 724c protruding from the lower clamping plate 724 pass through the slide preventing rubber plate 726.

As shown in FIG. 33, the oscillating type actuator 721 has in a body 721a thereof a double vane shaft 721b and a damper 721c. The oscillating actuator 721 rotates the spline shaft 722 by a limited angle to elastically move the lower clamping plate 724 up and down through the oscillating plate 723a and the compression spring 725.

Only part of the sheet clamping device is shown in FIG. 33. Although not shown, the side and rear portions of the sheet clamping device have the similar configuration.

In this example, a sheet is clamped when the lower clamping plate 724 having the slide preventing rubber plate 726 is moved up with respect to the fixed upper clamping plate 728 having the L-shaped end portion 728a by a combination of the oscillating plate 723a and the compression spring 725 which is driven by the rotation of the oscillating type actuator 721. At that time, the sheet 730 is bent pulled by the L-shaped end portion 728a.

More specifically, in this sheet clamping method, both sheet clamping and sheet pulling can be performed at the same time by rotating the oscillating type actuator 721 alone. At the initial stage of the sheet clamping, the thick sheet may not be bent. However, as the resilient force of the resin reduces due to heating of the sheet, the sheet is bent, and tension is thereby generated in the sheet to prevent hanging of the sheet.

Furthermore, fiber retention during forming is possible due to clamping force, and fiber placing pins can be incorporated in the clamper.

A roller type sheet clamping device will be described below.

Figure 34:
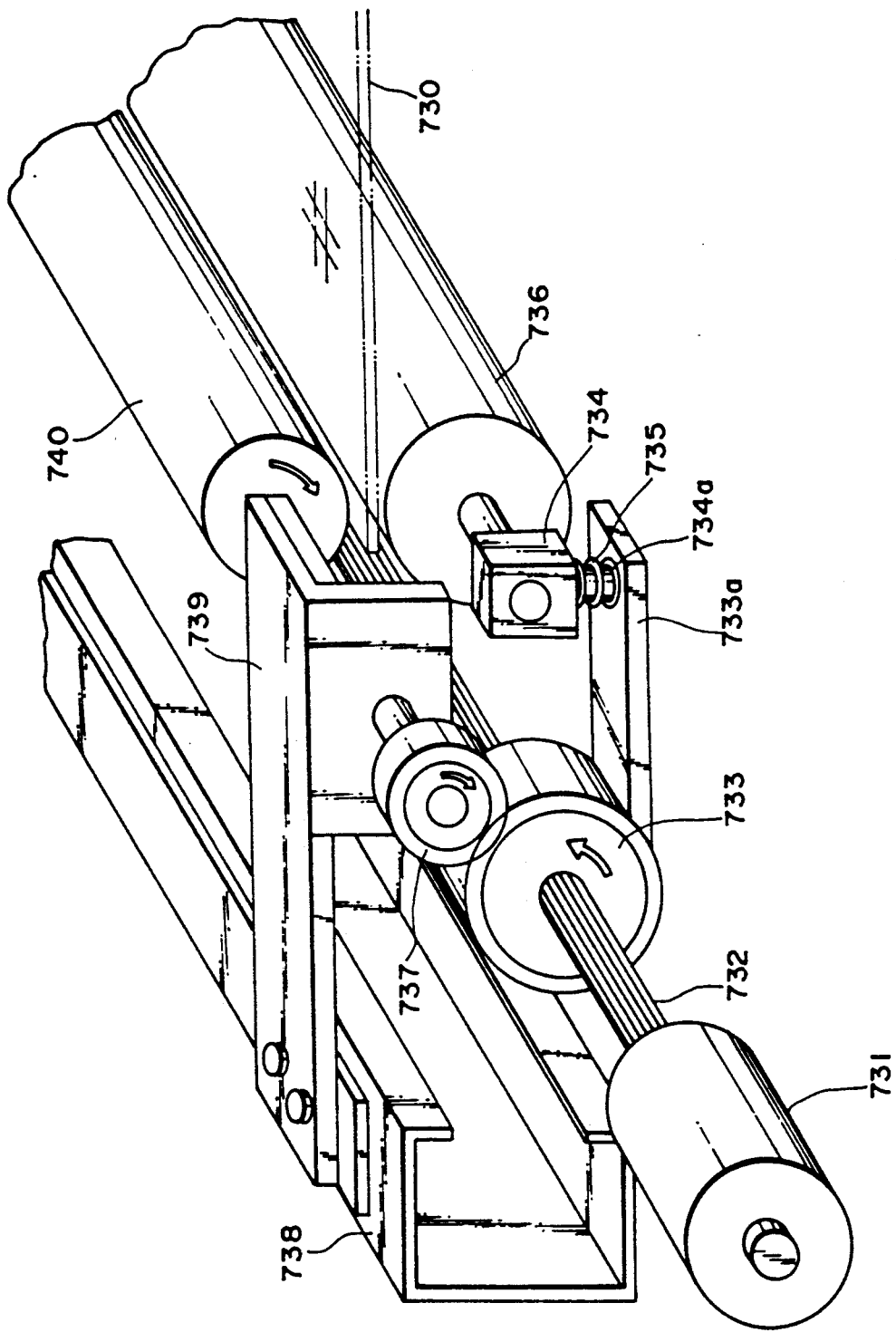
FIG. 34 is a perspective view of part of a second example of the sheet clamping device according to the present invention.

In FIG. 34, reference numeral 731 denotes an oscillating actuator of the same type as that used in the above-described first sheet clamping device; 732, a spline shaft rotated by the oscillating type actuator 731; 733, a first gear spline coupled to the spline shaft 732; 737, a second gear meshed with the first gear 733; 733a, an oscillating plate fixed to the first gear 733; 734, a support member having a support pillar 734a on the undersurface thereof, the support pillar 734a being loosely fitted into a hole formed in the oscillating plate 733a, a distal end of the support pillar 734a having a removal preventing head portion (not shown); 735, a compression spring disposed between the upper surface of the oscillating plate 733 and the undersurface of the support member 734; 736, a lower roller supported by the support member 734; 738, a fixed rail; 739, a support arm fixed to the rail 738; and 740, an upper roller coupled to and rotated by the second gear 737, the upper roller 740 being supported by the support arm 739.

FIG. 34 shows only part of the sheet clamping device. Although not shown, the side and rear portions of the sheet clamping device have the similar configuration.

As shown in FIG. 34, sheet clamping is performed by rotating the oscillating type actuator 731 and thereby by moving the lower roller 736 with respect to the upper roller 740 through the spline shaft 732, the first gear 733, the oscillating plate 733a, the compression spring 735 and the support member 734. At that time, rotation of the oscillating type actuator 731 is transmitted through the second gear 737 to the upper roller 740 to rotate the upper roller 740 synchronously with elevation of the lower roller 736. That is, the upper roller 740 is coupled to the oscillating actuator 731 through the first and second gears 733 and 737 pair, and rotates in the direction in which the sheet 730 is pulled in as the sheet is clamped. Hence, when the oscillating type actuator 731 further rotates from the position at which the lower roller 736 and the upper roller 740 grip the sheet 730, the lower roller 736 is held at its position by the compression spring 735 while the upper roller 740 is rotated. Consequently, the sheet 740 is pulled in and an adequate amount of tension is thereby generated.

In other words, in this clamping method, sheet clamping and sheet pulling can be performed at the same time only by rotating the oscillating type actuator 731. Tension is applied to the sheet by rotating the roller through the gear pair in a state where the sheet is held between the rollers. Consequently, slide does not occur easily between the sheet and the roller, and tension can thus be reliably applied to the sheet. Furthermore, fiber retention due to clamping force during forming is possible.

Figure 35:
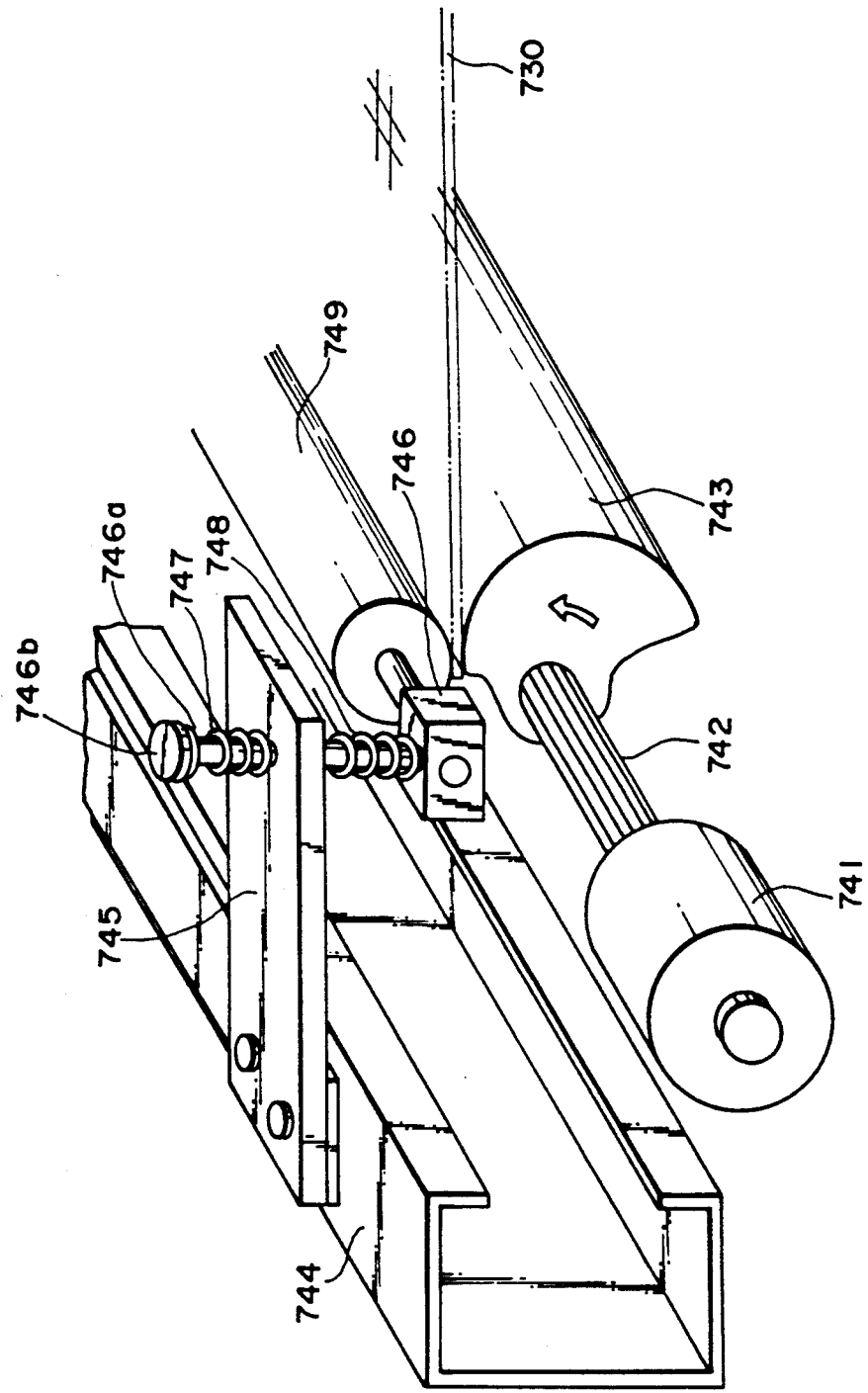
FIG. 35 is a perspective view of part of a third example of the sheet clamping device according to the present invention.

In FIG. 35, reference numeral 741 denotes an oscillating type actuator of the same type as that used in the above-described first sheet clamping device; 742, a spline shaft rotated by the oscillating actuator 741; 743, a semi-columnar lower roller spline coupled to the spline shaft 742; 744, a fixed rail; 745, an arm-shaped support plate fixed to the rail 744; 746, a support member having a support pillar 746a loosely fitted into a hole formed in the arm-shaped support plate 745 and extending upwardly and a removal preventing head portion 746b provided at the distal end of the support pillar 746a; 747, a first compression spring disposed between the upper surface of the arm-shaped support plate 745 and the removal preventing head portion 746b; 748, a second compression spring disposed between the undersurface of the arm-shaped support plate 745 and the upper surface of the support plate 746; and 749, an upper roller supported by the support member 746.

FIG. 35 shows only part of the sheet clamping device. Although not shown, the side and rear portions thereof have the similar configuration.

As shown in FIG. 35, sheet clamping is performed by rotating the oscillating type actuator 741 and thereby rotating the semi-columnar lower roller through the spline shaft 742.

The outer surface of the semi-columnar lower roller 743 is shaped in a spiral fashion such that the distance between the center of rotation and the contact point with the sheet increases as the oscillating type actuator 741 rotates. While the sheet 730 is pulled in, the sheet clamping force is increased, and an adequate tension is generated. Shift of the sheet contact point is absorbed by moving the upper roller 749 up and down by the compression springs 747 and 748.

More specifically, the semi-columnar lower roller 743 performs sheet clamping and pulling at the same time when the oscillating type actuator 741 is rotated.

Clamping force can be adjusted by changing the rotational angle of the oscillating type actuator and hence the length between the center of rotation of the actuator and the sheet contact point. Consequently, the fiber retaining force can be easily controlled during forming.

Figure 36:
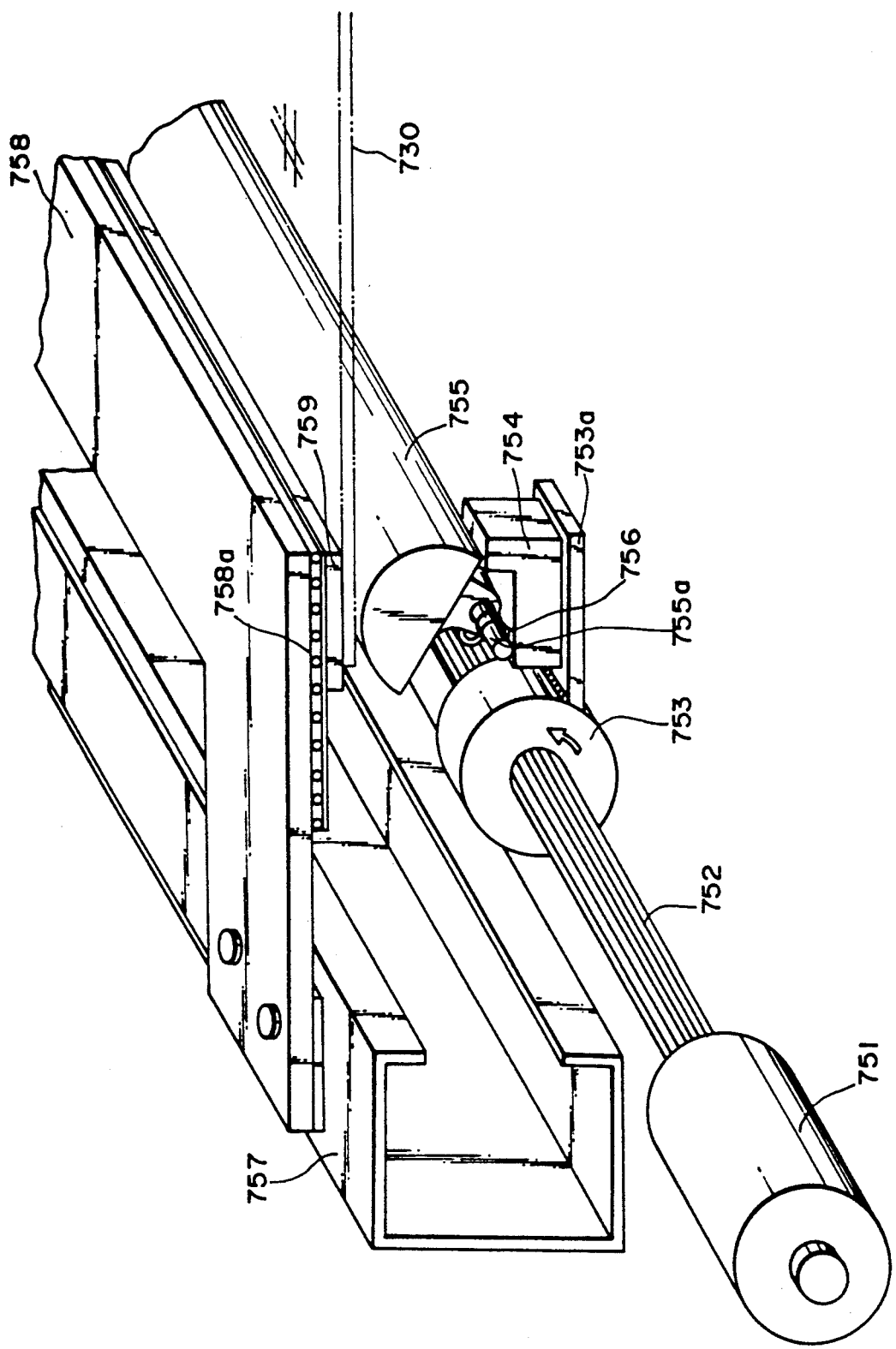
FIG. 36 is a perspective view of part of a fourth example of the sheet clamping device according to the present invention.

In FIG. 36, reference numeral 751 denotes an oscillating type actuator of the same type as that used in the above-described first sheet clamping device; 752, a spline shaft rotated by the oscillating type actuator 751; 753, a rotary member spline coupled to the spline shaft 752; 753a, an oscillating plate fixed to the rotary member 753; 754, a support member fixed to the oscillating plate 753a; 755, a semi-columnar lower roller having a shaft 755a on which a torsion coil spring 756 is provided so as to urge the semi-columnar lower roller 755 and thereby make the right end thereof into contact with the upper end of the support member 754 when the oscillating actuator 751 is off; 757, a rail; 758, an upper clamping plate fixed to the rail 757; 758a, a roller bearing disposed on the undersurface of the upper clamping plate 758; and 759, a slide preventing rubber plate provided on the portion of the undersurface of the upper clamping plate 758 which makes contact with the sheet 730.

FIG. 36 shows only part of the sheet clamping device. Although not shown, the side and rear portions thereof have the similar configuration.

As shown in FIG. 36, sheet clamping is performed when rotation of the transmitted to the semi-columnar lower roller 755 through the spline shaft 752, the rotary member 753, the oscillating plate 753a, and then the support member 754. The semi-columnar lower roller 755 is returned to its initial position by the torsion coil spring 756 when the sheet clamping operation is off. The semi-columnar lower roller 755 rotates in the direction in which the sheet 730 is pulled in due to a shift between the support and the point of application when the oscillating type actuator 751 is rotated and the sheet clamping is thereby initiated. Since the roller bearing 758a is provided on the upper clamping plate 758 above the sheet 730, the sheet 730 is not caught when it is pulled in.

According to this semi-columnar roller type sheet clamping device, sheet clamping and pulling can be performed at the same time only by rotating the oscillating type actuator 751. Clamping force can be adjusted by changing the semi-columnar form of the roller.

Figure 37:
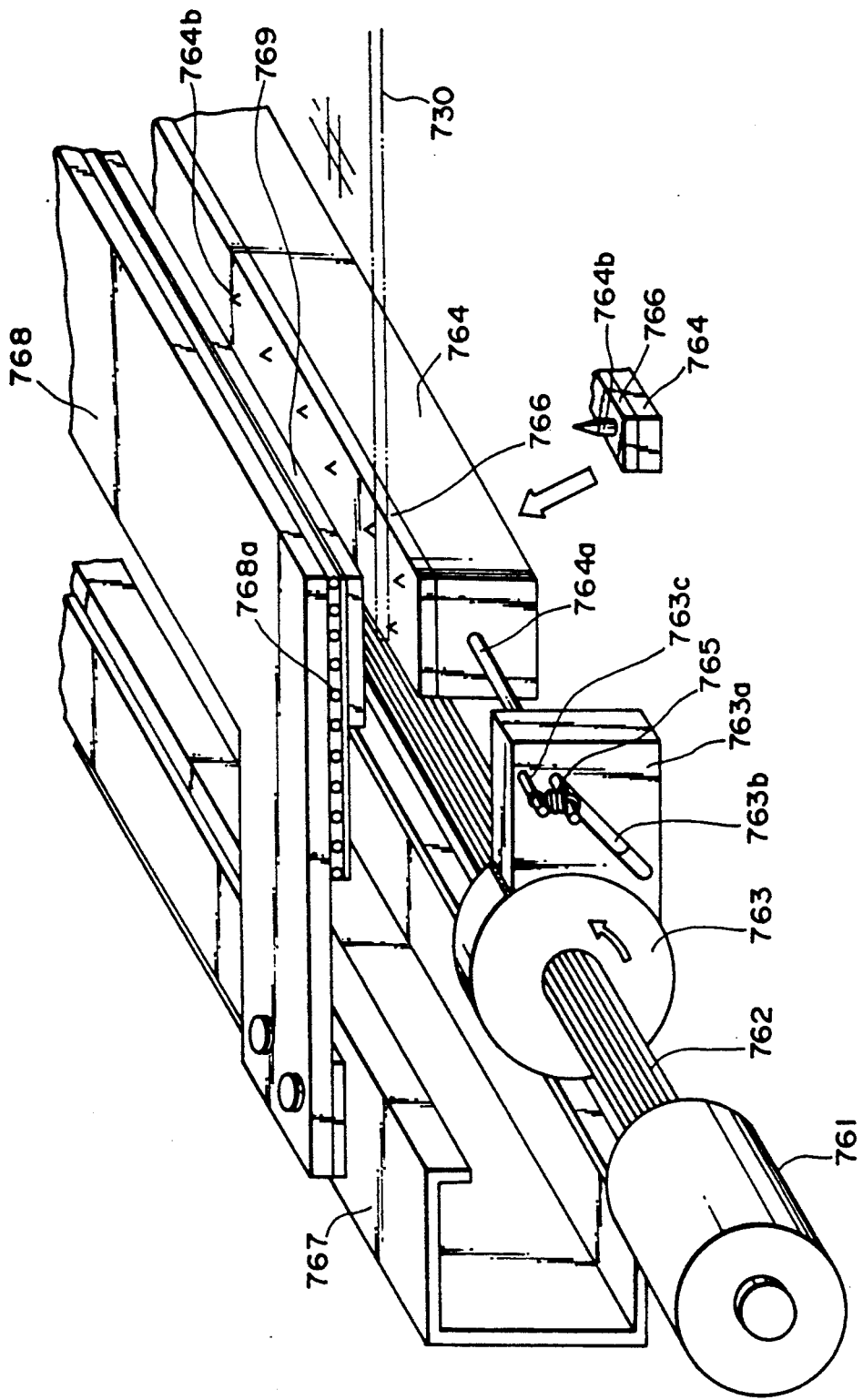
FIG. 37 is a perspective view of part of a fifth example of the sheet clamping device according to the present invention.

In FIG. 37, reference numeral 761 denotes an oscillating actuator of the same type as that used in the aforementioned first sheet clamping device; 762, a spline shaft rotated by the oscillating actuator 761; 763, a rotary member spline coupled to the spline shaft 762; 763a, an oscillating plate fixed to the rotary member 763 and having an inclined groove 763b and a support pin 763c; 764, a lower clamping member having a shaft 764a which passes through the inclined groove 763b; 765, a tension spring disposed between the support pin 763c and the shaft 764a; 766, a slide preventing rubber plate provided on the upper surface of the lower clamping member 764; 767, a rail, 768, an upper clamping plate; 768a, a roller bearing provided on the undersurface of the upper clamping plate 768; and a slide preventing rubber plate 769 provided on the portion of the undersurface of the roller bearing 768a which faces the sheet 730.

FIG. 37 shows only part of the sheet clamping device. Other parts thereof which are not shown have the similar configuration.

As shown in FIG. 37, sheet clamping is conducted when rotation of the oscillating actuator 761 is transmitted to the lower clamping member 764 through the spline shaft 762, the rotary member 763, the oscillating plate 763a, the inclined groove 763b, and then the shaft 764a and the lower clamping member 764 is thereby raised with respect to the fixed upper clamping plate 768. That is, the slide preventing rubber plate 766 is located at its original position by the tension spring 765 when the sheet clamping is off. When sheet clamping is initiated by rotating the oscillating actuator 761, the slide preventing rubber plate 766 moves in the direction in which the sheet 730 is pulled in due to the action of the inclined groove 763b which serves as a cam.

Since the upper surface of the sheet 730 is in contact with the upper clamping plate 768 having the slide preventing rubber plate 769 through the roller bearing 768a, the sheet 730 is smoothly pulled in.

In this example, the lower clamping member 764 having the slide preventing rubber plate 766 is provided with a fiber placing pin 764b.

According to this first cam type clamping method, sheet clamping and pulling can be performed at the same time only by rotating the oscillating type actuator 761. Since the portion of the clamper which makes contact with the sheet is flat, the sheet does not easily slide against the clamper and tension can thus be applied to the sheet reliably.

Figure 38:
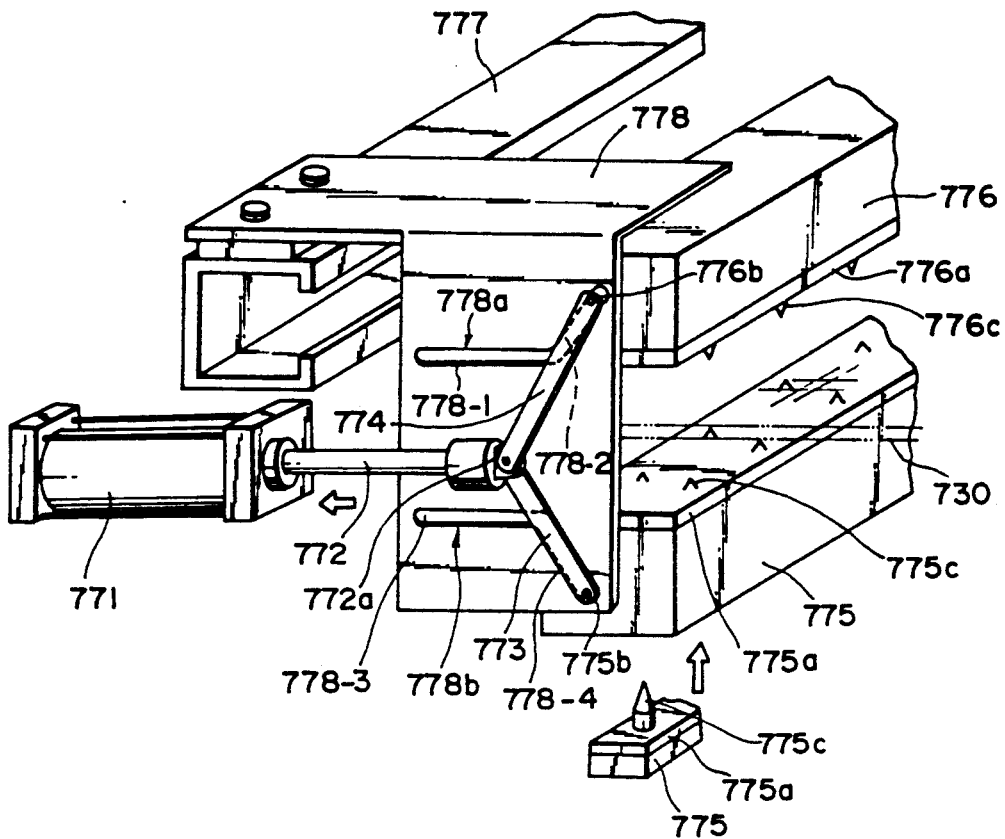
FIG. 38 is a perspective view of part of a sixth example of the sheet clamping device according to the present invention.
Figure 39:
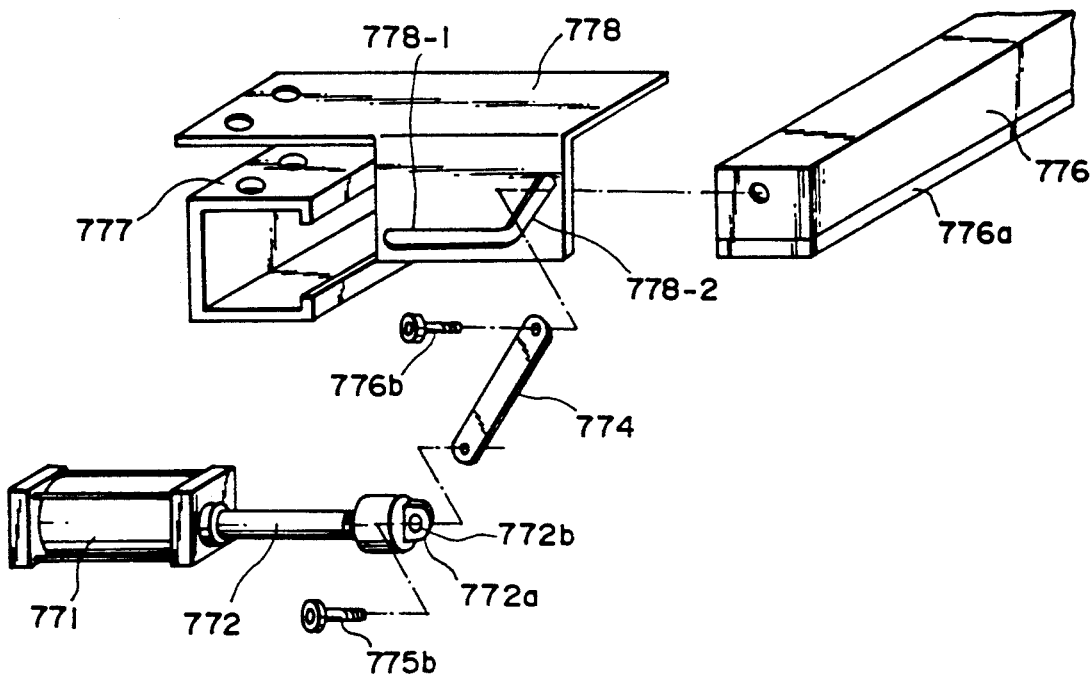
FIG. 39 is an exploded perspective view of an upper clamping portion of the sheet clamping device of FIG. 38.

In FIG. 38, reference numeral 771 denotes a cylinder; 772, a driving shaft of the cylinder 771; 772a, a distal end portion of the driving shaft 772; 772b, a hole formed at the distal end portion 772a for pivotaly supporting a pair of arms; 773 and 774, a pair of arms pivotaly supported at the distal end portion of the driving shaft 772; 775, a lower clamping member having a slide preventing rubber plate 775a on the upper surface thereof and connected to the distal end of the arm 773 by means of a pivot member 775b; 776, an upper clamping member having a slide preventing rubber plate 776a on the undersurface thereof and connected to the distal end of the arm 774 by means of a pivot member 776b; 777, a rail; and 778, a support plate fixed to the rail 777 and having a first engagement groove 778a consisting of a horizontal portion 778-1 and an inclined portion 778-2 as well as a second engagement groove 778b consisting of a horizontal portion 778-3 and an inclined portion 778-4, the pair of arms 773 and 774 being respectively engaged with the first and second engagement grooves 778a and 778b. FIG. 38 shows only part of the sheet clamping device. Other portions thereof (not shown) have the similar configuration.

The sheet 730 is clamped by the upper and lower clamping members 776 and 775 from above and below by the stroke of the cylinder 771. More specifically, when the cylinder 771 is driven, the driving shaft 772 is moved to the left, moving the pivot members 775b and 776b provided on the distal end portions of the pair of arms along the inclined portion 778-2 of the first engagement groove 778a and the inclined portion 778-4 of the second engagement groove 778b, respectively. Consequently, the gap between the upper clamping member 776 having the slide preventing rubber plate 776a and the lower clamping member 775 having the slide preventing rubber plate 775a is gradually narrowed. The sheet is completely clamped by the time the pivot members 775b and 776b reach the horizontal portions 778-1 and 778-3. After clamping, the driving shaft 772 of the cylinder 771 is further moved to the left, moving the clamping members 775 and 776 to the left and thereby pulling the sheet 730.

In this example, provision of fiber placing pins 775c and 776c in the clamping members 775 and 776 having the slide preventing rubber plates 775a and 776a is desired.

According to this second cam type clamping method, since sheet clamping and sheet pulling are performed at the same time by the stroke of the cylinder alone, since the sheet can be clamped from above. Furthermore, the portion of the clamper which makes contact with the sheet is flat, slide between the sheet and the clamper does not readily occur, and tension can be reliably applied to the sheet.

Figure 40:
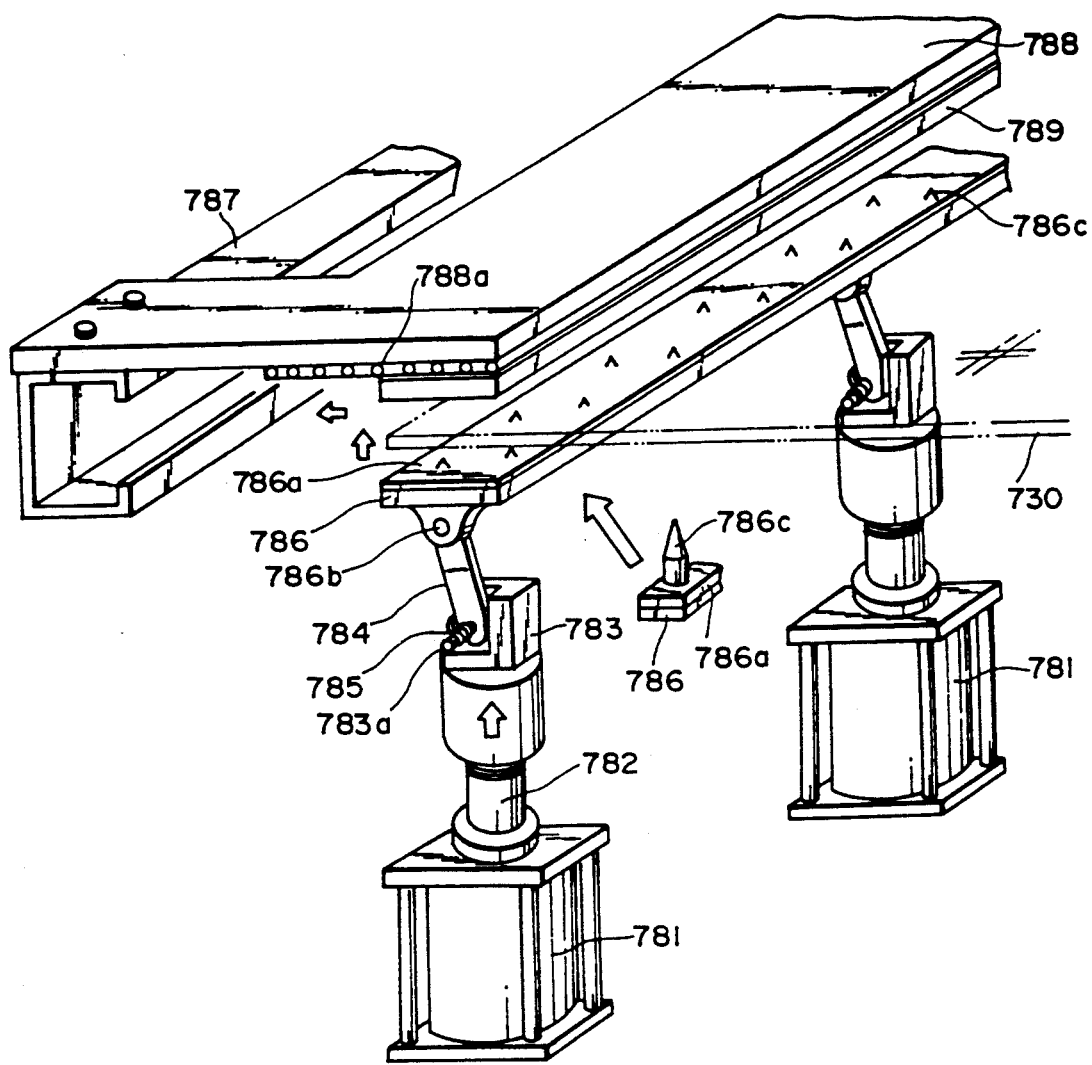
FIG. 40 is a perspective view of part of a seventh example of the sheet clamping device according to the present invention.

In FIG. 40, reference numeral 781 denotes cylinders; 782, driving shafts of the cylinders; 783, support bases fixed to the distal ends of the driving shafts; 784, pivot arms; 785, torsion coil springs each of which is wound around a support shaft 783a and which is locked at one end to the support base 783 and at the other end to the pivot arm 784; 786, a lower clamping plate pivotaly supported to the distal end of each of the pivot arms 784 by means of a shaft 786b; 787, a rail; 788, an upper clamping plate fixed to the rail 787; 788a, a roll bearing provided on the undersurface of the upper clamping plate 788; 789, a slide preventing rubber plate provided on the portion of the undersurface of the upper clamping plate which faces the sheet; 786a, a slide preventing rubber plate provided on the upper surface of the lower clamping plate 786; and 786c, a fiber placing pin formed in the lower clamping plate 786.

The sheet 730 is clamped when the lower clamping plate 786 having the slide preventing rubber plate 786a is raised through the pivot arms 784 by the stroke of the cylinders 781. After the sheet 730 is clamped, when the cylinder 781 is further moved, the lower clamping plate 786 having the slide preventing rubber plate 786a moves the sheet 730 to the left, i.e., in the direction in which the sheet is pulled, due to a shift between the support and point of application of the pivot arm 784.

Each of the pivot arms 784 is located at its original position where the support and the point of application thereof are offset by the torsion coil spring 785 when sheet clamping is off, as shown in FIG. 40.

In this example, the lower clamping plate 786 having the slide preventing rubber plate 776a is provided with the fiber placing pin 786c.

According to this link type clamping method, sheet clamping and sheet pulling can be performed at the same time only by the stroke of the cylinders 781. Since the sheet is directly pressed from below by the operation of the cylinders 781, it can be reliably clamped.

Only part of the sheet clamping device is shown in FIG. 40. Other portions thereof which are not shown have the similar configuration.

Figure 41:
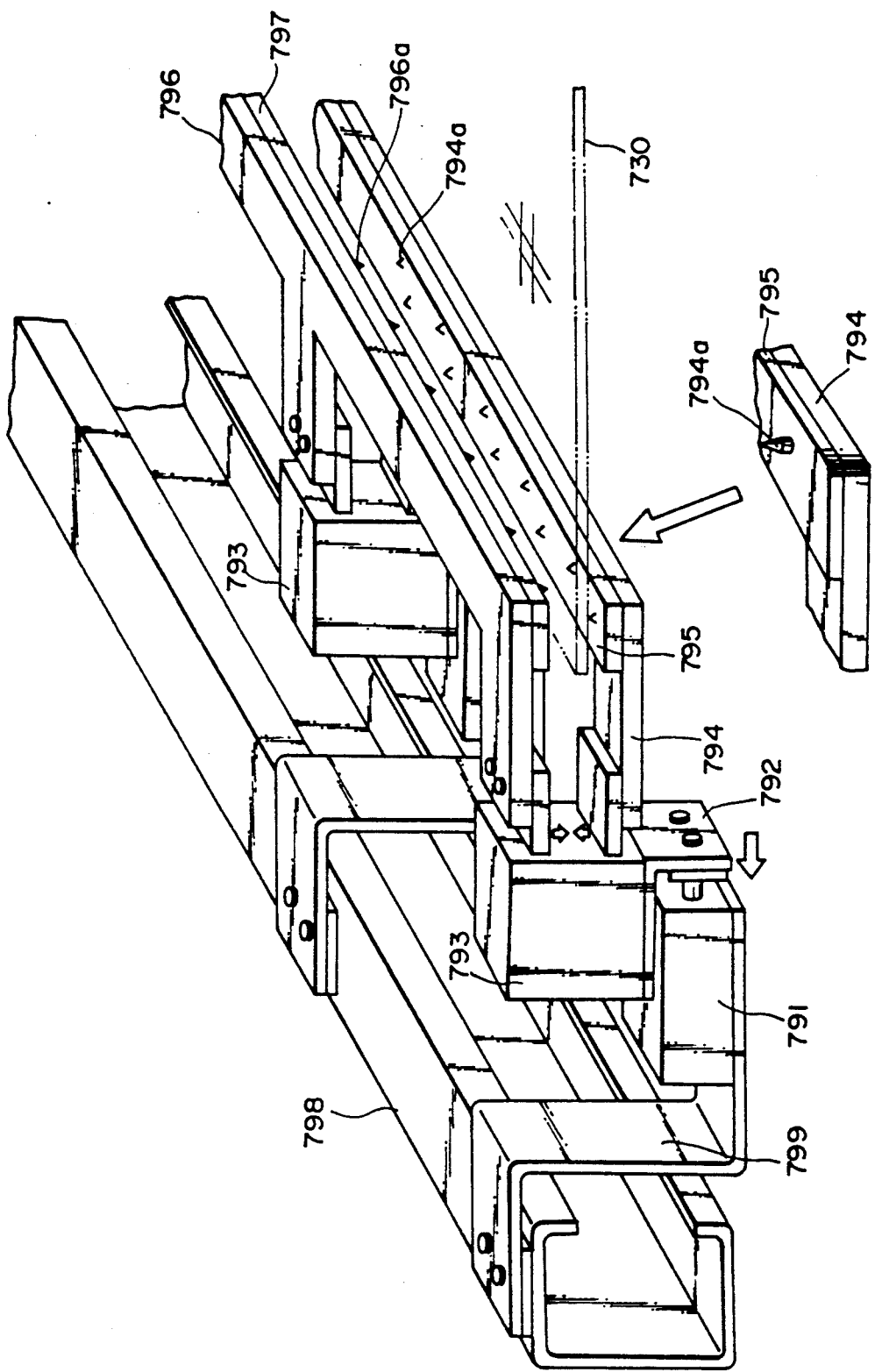
FIG. 41 is a perspective view of part of an eighth example of the sheet clamping device according to the present invention.

In FIG. 41, reference numeral 791 denotes cylinders; 792, driving members driven by the cylinders 791; 793, chucks; 794, a lower clamping plate coupled to the chucks 793; 795, a slide preventing rubber plate provided on the upper surface of the lower clamping plate 794; 796, an upper clamping plate coupled to the chucks 793; 797, a slide preventing rubber plate provided on the undersurface of the upper clamping plate; 798, a rail; and 799, a fixing plate fixed to the rail 798 for fixing the cylinders 791.

Figure 42A:
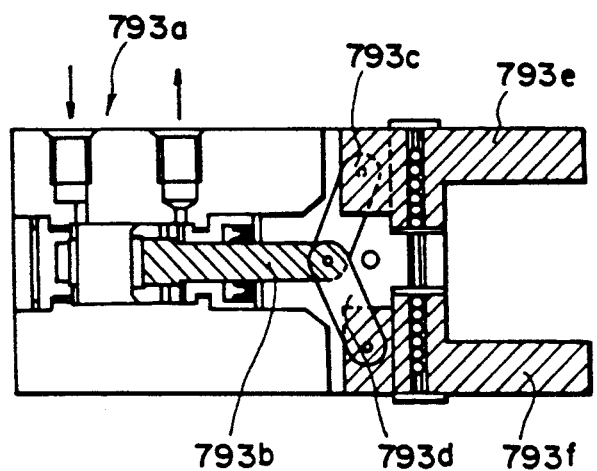
FIG. 42 (a) is a cross-sectional view of a chuck of the sheet clamping device of FIG. 41 which is opened.
Figure 42B:
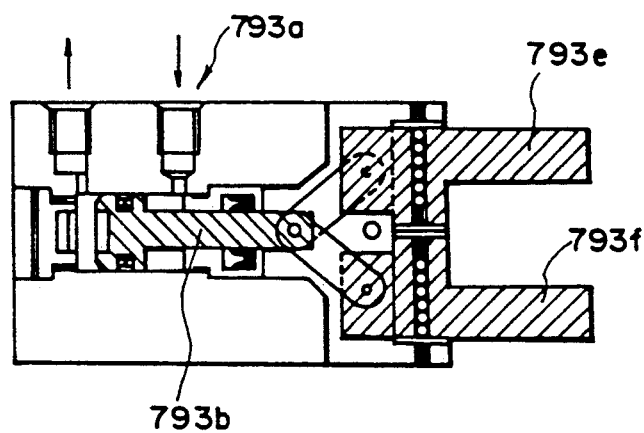

As shown in FIGS. 42a and 42b, the chuck 793 has cylinder portions 793a, a driving rod 793b, a pair of rods 793c and 793d pivotaly supported to the distal end portion of the rod 793c, an upper arm 793e pivotaly supported to the distal end of the rod 793c, and a lower arm 793f pivotaly supported on the distal end of the rod 793d.

As shown in FIG. 42 (a), when the driving rod 793b is located to the right, the upper and lower arms 793e and 793f are separated from each other and are thus opened. As shown in FIG. 42 (b), when the driving rod 793b is moved to the left, the upper and lower arms 793e and 793f are moved toward each other and closed.

As shown in FIG. 41, sheet clamping is performed by the clamping plates 794 and 796 having the slide preventing rubber plates 795 and 797 by operating the chucks 793.

The sheet 730 is pulled by operating the cylinders 791 and thereby moving the driving members 792 and the chucks 793 fixed thereto to the left.

In this example, fiber placing pins 794a and 796a are respectively provided in the clamping plates 794 and 796 having the slide preventing rubber plates 795 and 797.

According to this sheet clamping method, since sheet clamping and sheet pulling can be performed separately, pulling of the sheet can be timed adequately, thus increasing the degree of freedom of control.

Furthermore, sheet clamping is performed by the chucks, and sheet pulling is conducted by the cylinders. Since the chucks move perpendicular to the sheet, the fiber placing pins can pierce into the sheet reliably. Furthermore, the fiber retained by the pin during forming can be moved in any direction by adjusting the tension of the cylinders, i.e., the action of a sliding pin can be accomplished.

FIG. 41 shows only part of the sheet clamping device. Other portions thereof which are not shown have the similar configuration.

Figure 43:
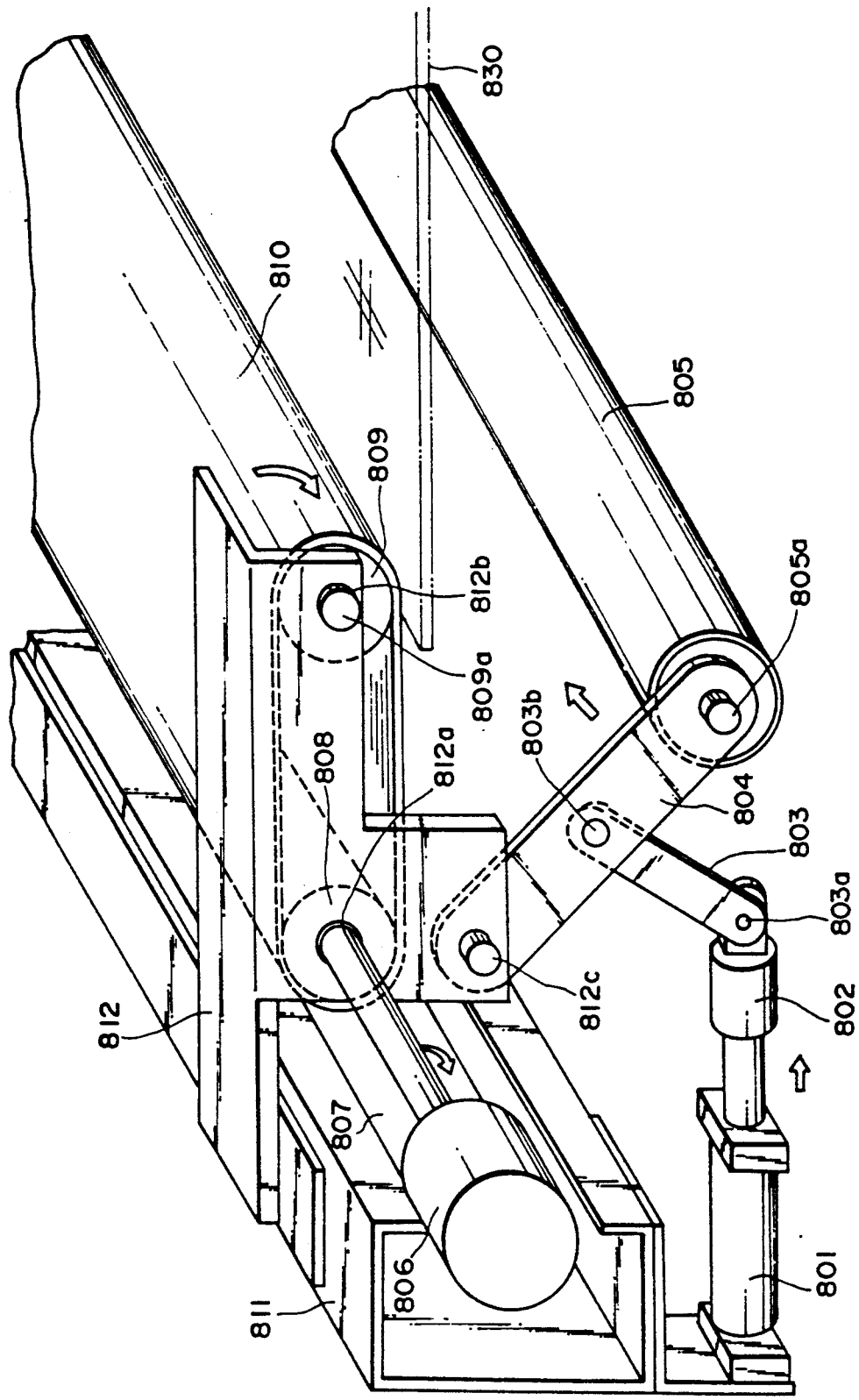
FIG. 43 is a perspective view of part of a ninth example of the sheet clamping device according to the present invention.

In FIG. 43, reference numeral 801 denotes a cylinder; 802, a driving rod driven by the cylinder 801; 803, a coupling arm pivotaly mounted on the distal end portion of the driving rod 803 by means of a shaft 803a; 804, a coupling rod whose central portion is coupled to the coupling arm 803 by means of a shaft 803b; 805, a lower rod pivotaly supported to the distal end portion of the coupling rod 804 by means of a shaft 805a; 806, an oscillating actuator; 807, a driving shaft driven by the oscillating type actuator 806; 808, a driving roller rotated by the driving shaft 807; 809, an upper roller which is a driven roller and which has a rotary shaft 809a; 810, a conveyer extending between the driving roller 808 and the upper roller 809; 811, a rail; and 812, a support plate fixed to the rail 811 and having a hole 812a for supporting the rotary shaft 809a and a support shaft 812c for supporting the proximal end of the coupling rod 804.

As shown in FIG. 43, sheet clamping is performed by the lower roller 805 and the conveyor 810 when the cylinder 801 is operated. Pulling of the sheet 830 is performed by rotating the conveyor 810 clockwise by the rotation of the oscillating type actuator 806 and thereby moving the sheet 830 gripped to the left.

In FIG. 43, only part of the sheet clamping device is shown. Other portions thereof which are not shown have the similar configuration.

Figure 44:
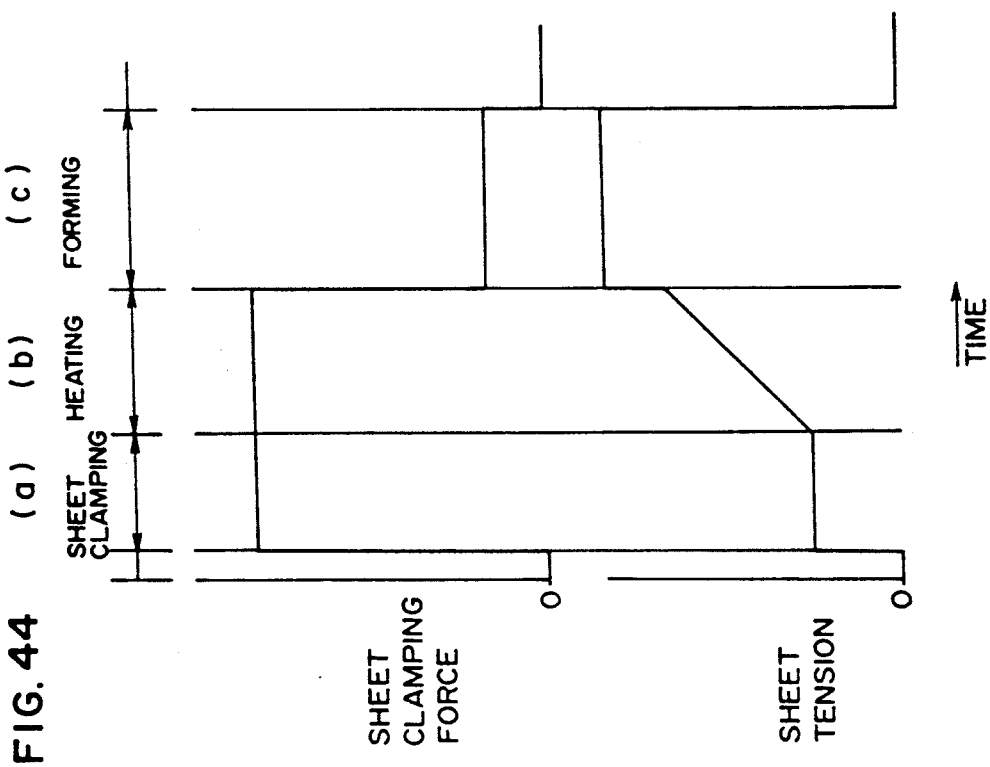
FIG. 44 is a timing chart showing the sheet pulling timing control for the sheet clamping device according to the present invention.

FIG. 44 is the timing chart of the sheet pulling operation conducted in the above examples. More specifically, when the sheet is clamped (a), a small amount of tension is applied to the sheet. When the sheet hangs due to heating (b), the amount of tension is increased so as to prevent hanging. If a large amount of tension is applied at the initial stage, slide may occur between the sheet and the clamper. During forming (c), the fiber placing pins pierce the sheet. Hence, sheet clamping force required to prevent the fiber placing pins from coming off is applied, and tension corresponding to the force of drawing the sheet is applied to the sheet.

According to the above-described conveyor type clamping method, sheet clamping is conducted by the cylinder 801, and sheet tension is applied by the oscillating type actuator 806. Consequently, clamping force can be easily controlled by changing the pressure of the cylinder 801.

According to the sheet clamping method in which the sheet pulling timing is controlled, sheet pulling timing can be controlled, preventing slide of sheet and making control of fiber retaining force possible.

Figure 45:
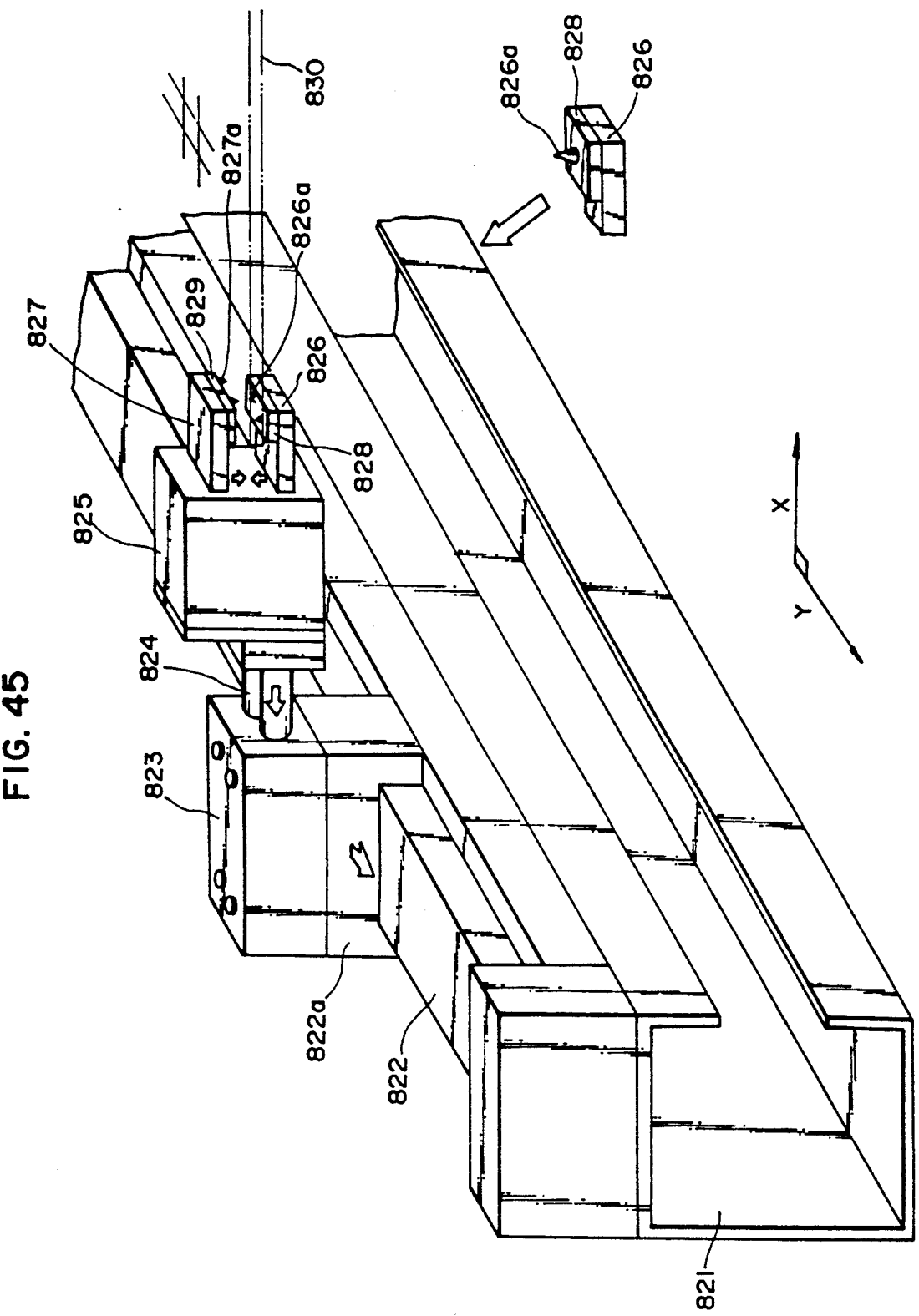
FIG. 45 is a perspective view of part of a tenth example of the sheet clamping device according to the present invention.

In FIG. 45, sheet tension applying direction can be changed between X-axis direction and Y-axis direction.

In FIG. 45, reference numeral 821 denotes a rail; 833, a cam follower guide type rodless cylinder fixed to the rail 821; 822a, a slide table of the rodless cylinder 822 which can adjust sheet tension in the Y-axis direction; 823, a cylinder driven by the rodless cylinder 822 which can adjust sheet tension in the X-axis direction; 824, a driving rod driven by the cylinder 823; 825, a chuck coupled to the distal end of the driving rod 824; 826, a lower clamping member of the chuck 825; 827, an upper clamping member of the chuck 825; 828, a slide preventing rubber plate provided on the upper surface of the lower clamping member 826; and 829, a slide preventing rubber plate provided on the undersurface of the upper clamping member 827.

Sheet clamping is conducted by the lower clamping member 826 having the slide preventing rubber plate 828 and the upper clamping member 827 having the slide preventing rubber plate 829.

The sheet 830 is pulled by the cylinder 823 and the rodless cylinder 822 in both X- and Y-axes directions.

In this example, fiber placing pins 826a and 827a are respectively provided on the clamping members 826 and 827 in such a manner that they pass through the slide preventing rubber plates 828 and 829.

In FIG. 45, only part of the sheet clamping device is shown. Other portions thereof which are not shown have the similar configuration.

In the aforementioned sheet clamping method, the direction in which tension is applied to the sheet can be selected using the two cylinders. Consequently, the direction in which the fiber is retained during forming can be readily set. This allows for both fixed and slide type fiber retention controls.

Figure 46:
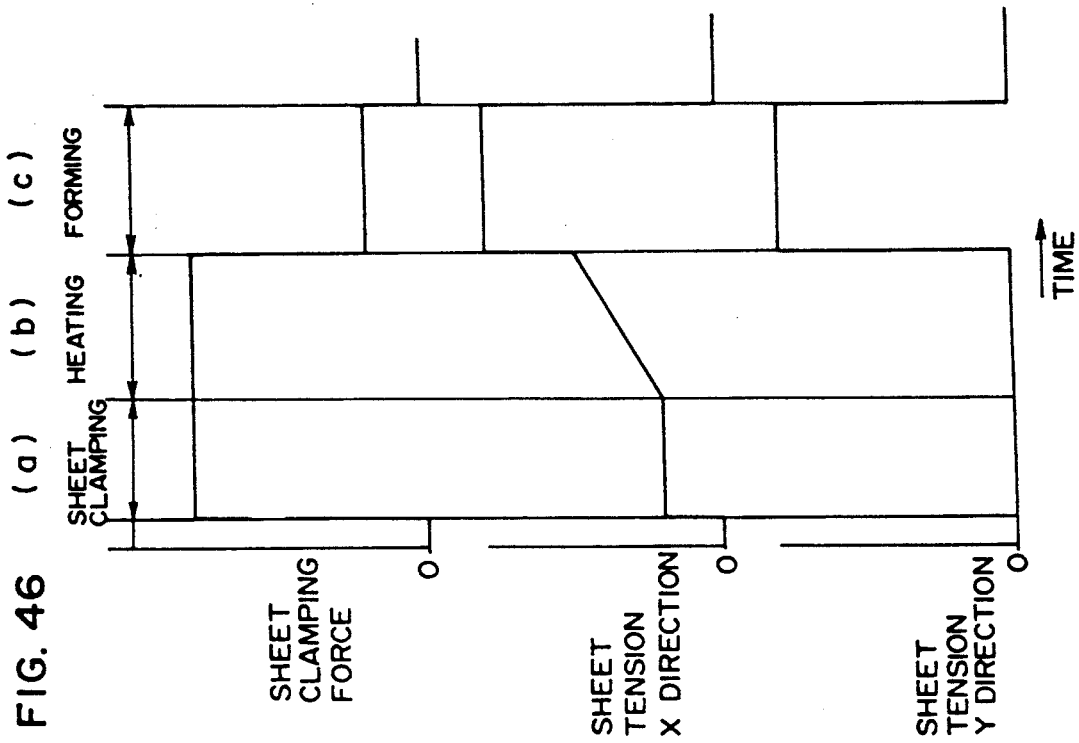
FIG. 46 is a timing chart in which sheet pulling timing is controlled separately during heating and forming and in X- and Y- axes directions.

In this example, as shown in FIG. 46, sheet pulling is controlled in the X- and Y-axes separately during the sheet heating (b) and sheet forming (c). More specifically, sheet pulling is conducted in the same manner as that shown in FIG. 44 from after the sheet is clamped to completion of the heating. During forming, some types of sheets may be pulled slantingly. In that case, the force corresponding to the force of drawing in the sheet is generated in X and Y axes directions. At that time, sheet tension in the X-axis direction is first increased during heating, and then sheet tension in the Y-axis direction is increased during forming.

Since fiber is pulled in different directions during heating and forming in some types of products, in the above sheet clamping method in which sheet pulling direction is controlled separately during heating and forming, sheet pulling direction can be separately set during heating and forming.

Furthermore, during heating, the sheet is pulled by a force large enough to prevent hanging of the sheet and thereby prevent slide between the sheet and clamper. During forming, the force required to retain the fiber is set. Consequently, the optimum sheet tension can be set at individual manufacturing steps.

As will be understood from the foregoing description, according to the present invention, the time from completion of heating to initiation of forming is short, and sheet temperature drop is less. Consequently, energy conservation during sheet heating is possible. Furthermore, since the temperature condition during forming is stable, quality of the products can be stabilized and reliability thereof can be enhanced. The individual components of the forming apparatus according to the present invention have the following advantages:

(1) In the sheet loading device, to achieve relative position reproducibility between the sheet and the mold, the sheets must be placed at a fixed position. However, the operator must extend his or her body into the device when he or she places sheets having a large size (for example, 500 mm or above) to a predetermined position. This deteriorates workability, and it takes time to conduct guide adjustment. In the sheet loading device according to the present invention, this problem can be overcome by provision of a car which can enter and come out of the sheet loading device. Furthermore, since the car is located at a fixed position by the positioning mechanism, the sheets can be reliably set to the predetermined position.

(2) In the sheet lifting device, biotechnologically desired sheet conveying and forming level is about 1400 mm in terms of excellent monitoring during forming. Desired sheet loading level is about 900 mm. In this sheet lifting device according to the present invention, sheets can be moved between these adequate levels. Consequently, supply of sheets from the loading car can be performed on the shortest route without interfering the conveying operation of the handling device.

(3) In the sheet handling device, the conveying rail has a multiple stage rail structure which can be expanded and contracted, and the clamping length corresponding to the sheet width can be readily adjusted by adjusting the interval between the first stage rails. Desired portions of the sheet edge can be clamped by a clamping mechanism which can be set to a desired position on the clamping rotary shaft. Furthermore, because of the multiple stage rail structure, when the conveying device is waited (at the sheet clamping position), there is no guide portion of the conveying mechanism in the heating/forming zone, facilitating adjustment and preparation operations of the mold. The conveying and clamping mechanism is disposed on the opposite side to the heating/forming zone, and is thus not affected by heating (the highest temperature is 600° C.) conducted in the heating/forming zone.

(4) In the heating device, to prevent sheet temperature drop between completion of the heating and initiation of the forming, the heater must be retracted at a high speed. Consequently, the heater is not driven directly by the cylinder but driven through a speed-increasing mechanism (for example, the heater is retracted by a speed which is between 500 mm/sec and 100 mm/sec). Furthermore, provision of the shock absorbing mechanism allows shocks at the stopping end to be prevented. Heater and sheet interval can be adjusted, and sheet heating characteristics can be controlled. The heating device waiting zone and heating/forming zone are protected by a heat-preventing cover to prevent radiation of the heater's heating energy and thereby reduce temperature drop between completion of heating and initiation of forming.

(5) In the forming device, since the loading reaction during forming is supported through the locking mechanism by the upper plate, the capacity of the upper cylinder can be reduced to about one tenth of the conventional one (generally speaking, a hydraulic cylinder can be replaced by a pneumatic cylinder). The upper slide must fall quickly after the heater is retracted. If the upper slide is hydraulically driven in order to achieve quick movement, a large size accumulator or valve is required, thus increasing the overall size of the device. Furthermore, since the upper and lower slides are separately moved up and down at the same time after the heater is retracted, the time required for clamping the sheet can be reduced.

(6) In the product extracting device, since the heating/forming zone is at the high temperature, the rodless cylinder is used as the driving mechanism so that product extraction can not be affected by the high temperature. Consequently, highly reliably products can be extracted.

(7) According to the present invention, necessary portions of the sheet are retained by the fiber placing pins during forming at the frame portion for clamping the sheet so that the trellis deformation angle of the fiber cannot be increased to the predetermined angle or above during forming, and the fiber placing pins are quickly returned to their original positions after forming is completed. Consequently, reliably continuous forming can be performed without generating wrinkles in the sheet. Practically, this provision of the fiber placing pins has the following advantages:

(8) When the portion of the sheet into which the pin is inserted is retained during forming by generating a reaction in the fiber placing pin using a spiral spring, a coil spring, a plate spring, a electric servo motor or pneumatically, fiber orientation can be controlled during forming. Furthermore, since the fiber placing pin is automatically returned to its original position after forming is completed, continuous forming is made possible.

(9) When the guide body having a fixed end around which the guide body can turn and a means of applying a retaining force to the fiber placing pin and for returning the pin is provided on the surface of the frame, the fiber placing pin can not only be moved linearly during forming to pull the fiber while resisting against the reaction of the coil spring but also be rotated about the fixed end, making a complicated movement possible.

Hence, the fiber placing pin can not only be moved on a straight line but also be rotated about the fixed end. Furthermore, the stroke of the fiber placing pin can be freely set by exchanging the cover or by adjusting the adjustment shaft.

(10) A large number of fiber placing pins are disposed on the surface of the frame, and these fiber placing pins are controlled at the same time by the control mechanism. Consequently, the individual fiber placing pins can be reliably returned to their original positions at the same time. As a result, provision of a driving portion at each of the fiber placing pins is not necessary, and the space for the driving portion can thus be reduced.

(11) According to the present invention, when three-dimensional parts are continuously formed by heating and stamping from the sheets of the high-performance fiber reinforced composite material which employs as a matrix a thermoplastic resin and in which the reinforcing fiber is oriented, the fiber placing pins are protruded from the opposed frames during forming to restrain the fiber flow, and amount and time at which the pins are protruded are controlled so as to attain fiber orientation suited to the final shape of the part. Consequently, the sheet of the composite material can be appropriately retained.

Furthermore, in the apparatus for continuously forming three-dimensional parts by heating and stamping from the sheets of the high-performance fiber reinforced composite material which employs as a matrix a thermoplastic resin and in which the reinforcing fiber is oriented, a reinforcing fiber flow control device is provided. This control device clamps the sheet of the high-performance fiber reinforced composite material by the frame and pierces the fiber placing pins into the sheet of the composite material clamped by the frame synchronously with the drive of the product ejector having an eject plate which can enter and come out of the frame so as to retain the sheet reliably. This control device required no special driving mechanism nor control machine and has a simple structure.

(12) According to the present invention, when three-dimensional products are continuously formed by heating and stamping from the sheets of the high-performance fiber reinforced composite material which employs as a matrix a thermoplastic resin and in which the reinforcing fiber is oriented, the sheets can be retained at an adequate position during conveying and heating/forming by providing a sheet handing device for conveying the sheet into the heating/forming zone. Consequently, quality of the products can be enhanced.

When sheet clamping and sheet pulling are performed at the same time, the number of control factors can be reduced. Practically, (1) In the sheet bending type method (see FIG. 32), sheet clamping and sheet pulling can be performed at the same time only by rotating the oscillating type actuator. At the initial stage of sheet clamping, the sheet may not be bent because it is thick. However, as the resilient force of the resin reduces due to heating, the sheet is bent and tension is thereby generated in the sheet, preventing the sheet from being hung.

(2) In the roller type method (see FIG. 34), sheet clamping and sheet pulling can be performed at the same time only by rotating the oscillating type actuator. Tension is applied to the sheet by rotating the roller by means of the gear pair while holding the sheet between the rollers. Consequently, slide does not occur easily between the sheet and the rollers, and tension can thus be applied to the sheet reliably.

(3) In the first roller type method in which the outer surface of the roller is semi-columnar (see FIG. 35), sheet clamping and sheet pulling can be performed at the same time only by rotating the oscillating actuator. Clamping force can be adjusted by the rotational angle of the oscillating actuator by changing the distance between the center of rotation of the oscillating actuator and the sheet contact point. Thus, the fiber retaining force can be easily controlled during forming.

(4) In the second roller type method which employs the semi-columnar roller (see FIG. 36), sheet clamping and sheet pulling can be performed at the same time only by rotating the oscillating type actuator. Clamping force can be adjusted by changing the shape of the semi column.

(5) In the first cam type method (see FIG. 37), sheet clamping and sheet pulling can be performed at the same time only by rotating the oscillating actuator. Since the sheet contact portion of the clamper is flat with respect to the sheet, slide between the sheet and the clamper does not occur easily, and tension can thus be applied reliably.

(6) In the second cam type method (see FIG. 38), since sheet clamping and sheet pulling can be performed at the same time only by stroking the cylinder, the sheet can be caught from above and blow. Since the sheet contact portion of the clamper is flat with respect to the sheet, slide between the sheet and the clamper does not occur easily, and tension can thus be applied reliably.

(7) In the link type method (see FIG. 40), sheet clamping and sheet pulling can be performed at the same time by stroking the cylinder. Since the sheet is directly pressed from below by stroking the cylinder, reliable sheet clamping is made possible.

(8) In the sheet clamping method in which sheet clamping and sheet pulling are performed separately (see FIG. 41), since sheet clamping and sheet pulling are performed separately, control of the timing in which the sheet is pulled is facilitated, and the degree of freedom of control is increased.

Sheet clamping is performed by the chuck, and tension is applied to the sheet by the rodless cylinder. Since the chuck moves perpendicular to the sheet, when the sheet clamper incorporates the fiber placing pins, the pins can reliably pierce into the sheet. Furthermore, when the fiber is retained during forming, it can be moved in a desired direction by adjusting tension applied by the cylinder, i.e., the function of sliding pins can be accomplished.

(9) In the conveyor type method (see FIG. 43), sheet clamping is performed by the cylinder, and tension is applied to the sheet by the oscillating actuator. Clamping force can be readily controlled by changing the pressure of the cylinder.

(10) In the sheet clamping method in which direction of application of tension can be freely set (see FIG. 45), since the direction of application of tension can be set among X- and Y-axes directions by using the two cylinders, the direction in which the fiber is retained during forming can be easily changed, and both fixed and slide type fiber retaining controls are made possible.

(11) In the sheet clamping method in which timing in which the sheet is pulled is controlled (see FIG. 44), the timing in which the sheet is pulled can be controlled, and slide of the sheet can thus be prevented while control of the retaining force during retaining is made possible.

(12) In the sheet clamping method in which the direction of application of tension to the sheet differs in the heating and forming (see FIG. 46), since direction in which the fiber is pulled during heating may differ from the direction in which the fiber is pulled during forming depending on the type of parts, the direction in which tension is applied to the sheet can be set separately for heating and forming. This allows all types of parts to be pulled adequately.

Furthermore, a force large enough to prevent hanging of the sheet is applied during heating to prevent slide between the sheet and the clamper. During forming, a force large enough to retain the fiber is applied. Consequently, the optimum tension can be applied to the sheet in the individual steps.

(13) When the fiber placing pins are incorporated in the sheet clamping mechanism, the structure of the frame can be simplified. Furthermore, amount and direction of the fiber retaining force can be controlled in the sheet clamping device.

What is claimed is:

1. An apparatus for manufacturing three-dimensional parts from sheets of a thermoplastic resin fiber-reinforced composite material, said apparatus comprising:
   (a) supply means for positioning the sheet of the fiber-reinforced composite material;
   (b) sheet clamping means for clamping an end portion of the sheet;
   (c) conveying means for conveying the clamped sheet into a heating and forming zone;
   (d) heating means for heating the sheet to a predetermined temperature;
   (e) upper and lower slides and power driving means for pressing said slides together and pulling said slides apart;
   (f) power driven upper and lower frames, mounted respectively on said upper and lower slides, for clamping the sheet around its periphery;
   (g) an elongated guide body pivotally secured at one end to one of said slides;
   (h) a fiber positioning pin, slidably mounted in said guide body, for piercing the sheet clamped between said frames to position the reinforcing fibers;
   (i) forming means including a male mold member for deep drawing the clamped sheet to the extent of a stroke of the male mold member; and
   (j) retaining force applying means for moving said fiber positioning pin, in the plane of said clamped sheet, toward the periphery of said sheet so that the deformation angle caused by a trellis effect remains within a predetermined angle range during forming, and returning means for retracting said fiber positioning pin to its original position; and
   (k) ejecting means for extracting the three-dimensional part.

2. The apparatus for manufacturing three-dimensional parts according to claim 1, wherein said supply means includes a sheet loading unit having a car charging and discharging mechanism and a car positioning mechanism, said sheet loading unit allowing for manual loading of the sheets having different sizes.

3. The apparatus for manufacturing three-dimensional parts according to claim 1, wherein said supply means includes a sheet lifting unit for supplying the sheet on the shortest route from a loading car to the conveying device without interfering with the conveying operation.

4. The apparatus for manufacturing three-dimensional parts according to claim 1, wherein said supply means includes a sheet handling unit having multiple-stage telescoping rails, said sheet handling unit being capable of ready adjustment to the width of the sheet by adjusting the distance between the first stage rails.

5. The apparatus for manufacturing three-dimensional parts according to claim 1, further comprising a sheet handling unit having multiple-stage telescoping rails.

6. The apparatus for manufacturing three-dimensional parts according to claim 1, wherein said heating means includes a high-speed movable heating unit having a speed increasing mechanism and a shock absorbing mechanism.

7. The apparatus for manufacturing three-dimensional parts according to claim 1, wherein said forming means includes a frame body and a locking mechanism and wherein load stress during forming is borne by said frame body of said forming means through said locking mechanism.

8. The apparatus for manufacturing three-dimensional parts according to claim 1, wherein said retaining force applying means for applying the retaining force to the fiber positioning pin and said returning means for retracting said fiber positioning pin comprise a spiral spring wound around a gear which meshes with a movable rack on which the fiber positioning pin is mounted.

9. The apparatus for manufacturing three-dimensional parts according to claim 1, wherein said retaining force applying means comprises a coil spring which is in contact with a movable plate which is mounted on a guide shaft and on which the fiber positioning pin is mounted.

10. The apparatus for manufacturing three-dimensional parts according to claim 1, wherein said retaining force applying means comprises a plate spring having a free end in contact with a movable plate which is provided in a guide groove and on which the fiber positioning pin is mounted.

11. The apparatus for manufacturing three-dimensional parts according to claim 1, wherein said retaining force applying means comprises a movable plate, a slide chamber for guiding travel of said movable plate and a pneumatic operator for positioning said movable plate, said fiber positioning pin being fixed to said movable plate.

12. The apparatus for manufacturing three-dimensional parts according to claim 1, wherein said retaining force applying means comprises an electric servo motor.

13. The apparatus for manufacturing three-dimensional parts according to claim 1, wherein said retaining force applying means comprises a movable member on which the fiber positioning pin is mounted in said guide body, a shaft guide housing said movable member, a guide groove for guiding the fiber positioning pin, formed in the shaft guide, and a coil spring for biasing said movable member toward one end of said guide groove.

14. The apparatus for manufacturing three-dimensional parts according to claim 1, wherein said retaining force applying means comprises a guide groove formed in one of said frames for guiding a movable member on which the fiber positioning pin is mounted, and a driving mechanism having a coil spring for biasing said movable plate toward one end of said guide groove, said driving mechanism being disposed outside of said frame.

15. The apparatus for manufacturing three-dimensional parts according to claim 1, further comprising a guide for said fiber positioning pin, said guide having a rotatably fixed end and having said retaining force applying means provided on the surface of one of said frames.

16. The apparatus for manufacturing three-dimensional parts according to claim 1, further comprising a cover member secured to and covering said elongated guide body and having a guide groove which receives said fiber positioning pin and wherein the movement of said fiber positioning pin is a stroke of a length defined by the length of said guide groove.

17. The apparatus for manufacturing three-dimensional parts according to claim 1, further comprising adjusting means for setting the distance through which said fiber positioning pin moves, said adjusting means including coaxially disposed adjusting shafts.

18. The apparatus for manufacturing three-dimensional parts according to claim 1, further comprising adjusting means for setting the distance through which said fiber positioning pin moves, said adjusting means including parallel adjusting shafts.

19. The apparatus for manufacturing three-dimensional parts according to claim 1, wherein a plurality of fiber positioning pins are provided on the surface of the frame, and further comprising a control mechanism for concurrent control of said movement of said fiber positioning pins.

20. The apparatus for manufacturing three-dimensional parts according to claim 19, wherein said control mechanism comprises a cam rod which concurrently makes contact with and moves all of said fiber positioning pins.

21. The apparatus for manufacturing three-dimensional parts according to claim 19, wherein said control mechanism comprises a steel tape which concurrently makes contact with all of said fiber positioning pins and which is fluidically driven.

22. The apparatus for manufacturing three-dimensional parts according to claim 1, wherein said ejecting device includes an ejecting plate and means for moving said ejecting plate into and out of said frames and for extending said fiber positioning pin to pierce the sheet clamped by the frames synchronously with the movement of said ejecting device.

23. The apparatus for manufacturing three-dimensional parts according to claim 22, wherein said ejecting device further includes means for adjusting the extent to which the fiber positioning pin is extended.

24. The apparatus for manufacturing three-dimensional parts according to claim 1, further comprising a tension applying mechanism for simultaneously clamping and stretching the sheet.

25. The apparatus for manufacturing three-dimensional parts according to claim 1, further comprising a tension applying mechanism for clamping and pulling the sheet separately, and a fiber placement control mechanism.

26. The apparatus for manufacturing three-dimensional parts according to claim 1, further comprising a tension applying mechanism for applying tension to the sheet and means for adjusting the direction in which said tension is applied.

27. The apparatus for manufacturing three-dimensional parts according to claim 1, further comprising a tension applying mechanism for applying tension to the sheet and for setting the duration of said tension.

28. The apparatus for manufacturing three-dimensional parts according to claim 1, further comprising a tension applying mechanism for applying tension to the sheet in different directions during heating and forming.

29. The apparatus for manufacturing three-dimensional parts according to claim 1, further comprising a tension applying mechanism for applying different tensions to the sheet during heating and forming.

* * * * *